United States Patent
Kato et al.

(10) Patent No.: US 8,633,966 B2
(45) Date of Patent: Jan. 21, 2014

(54) INFORMATION PROCESSING DEVICE, INFORMATION PROCESSING METHOD, PROGRAM, AND DATA STRUCTURE

(75) Inventors: Motoki Kato, Kanagawa (JP); Kazuo Yamamoto, Chiba (JP); Masayoshi Mizuno, Tokyo (JP); Shigeho Ogawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 444 days.

(21) Appl. No.: 12/749,987

(22) Filed: Mar. 30, 2010

(65) Prior Publication Data

US 2010/0253765 A1    Oct. 7, 2010

(30) Foreign Application Priority Data

Apr. 7, 2009  (JP) .................................. 2009-093161

(51) Int. Cl.
*H04N 13/00* (2006.01)
*H04N 5/775* (2006.01)
*H04N 9/80* (2006.01)

(52) U.S. Cl.
USPC .............................. 348/42; 386/230; 386/248

(58) Field of Classification Search
USPC .................................. 348/42; 386/52, 230, 248
See application file for complete search history.

(56) References Cited

U.S. PATENT DOCUMENTS

| 8,184,961 B2 * | 5/2012 | Oshima et al. | 386/355 |
| 2008/0292287 A1 * | 11/2008 | Oshima et al. | 386/126 |
| 2009/0142041 A1 * | 6/2009 | Nagasawa et al. | 386/124 |
| 2013/0084055 A1 * | 4/2013 | Ando et al. | 386/248 |

FOREIGN PATENT DOCUMENTS

| JP | 11-191895 | 7/1999 |
| JP | 11-195287 | 7/1999 |
| JP | 2006-140618 | 6/2006 |
| WO | 2010/089994 A1 | 8/2010 |

OTHER PUBLICATIONS

Office Action issued on Jul. 4, 2013 in Japanese Application No. 2009-093161.

* cited by examiner

*Primary Examiner* — David Czekaj
*Assistant Examiner* — Tsion B Owens
(74) *Attorney, Agent, or Firm* — Oblon, Spivak, McClelland, Maier & Neustadt, L.L.P.

(57) ABSTRACT

There is provided an information processing device enabling a content of 3D image to be appropriately reproduced from a recording medium. A virtual extent read out from a recording medium recorded with interleaved data obtained by dividing each of a base stream and an enhanced stream into extents Ext1 and Ext2, and arranging the Ext1 and Ext2 in an interleaved manner so that the Ext1 and Ext2 are adjacent to each other, and a file entry of a 2D reproduction file in which the Ext1 is stored in a reproducing order, and a 3D type 1 reproduction file in which the virtual extent is stored in a reproducing order, with a set of Ext1 and Ext2, which are adjacent to each other in the interleaved data, as the virtual extent, is divided into the Ext1 and Ext2 using the file entry of the 2D reproduction file.

11 Claims, 70 Drawing Sheets

FIG.11
2D REPRODUCTION FILE
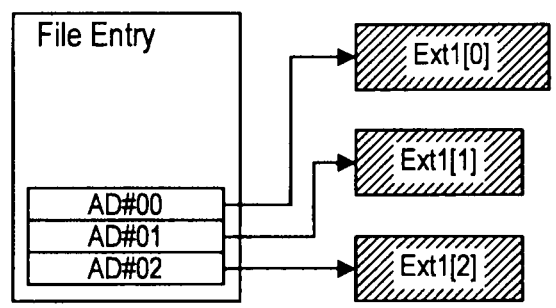
3D TYPE 1
REPRODUCTION FILE
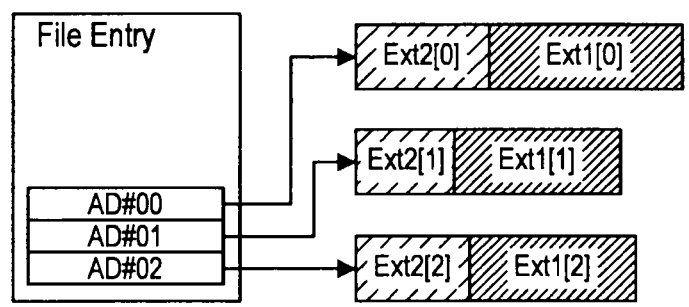

FIG.20
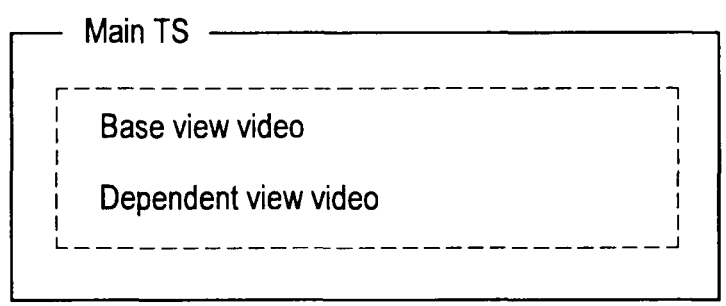
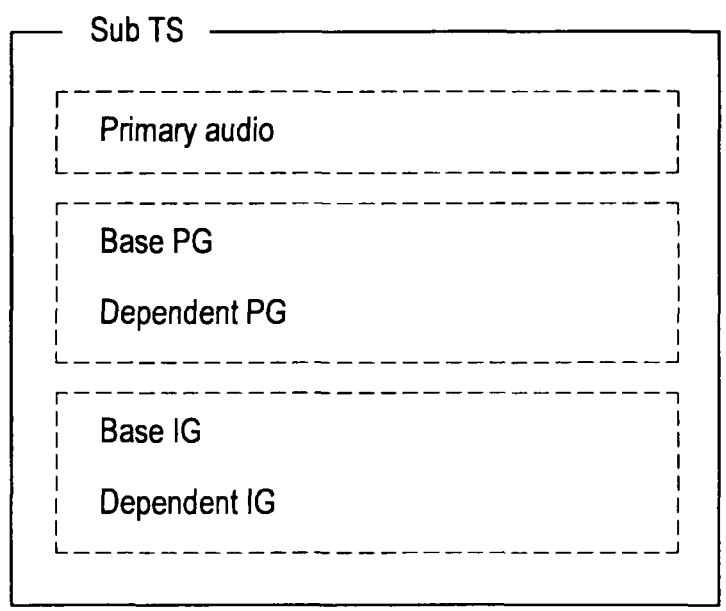

FIG.21
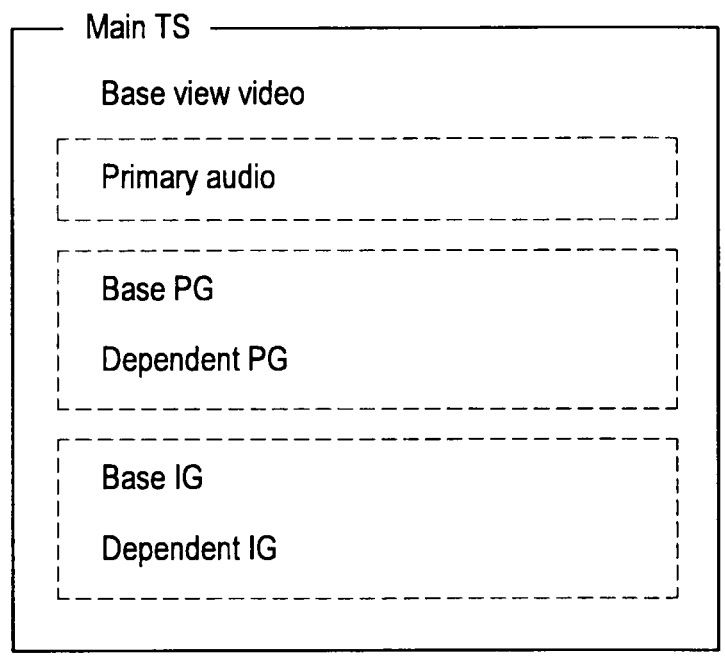
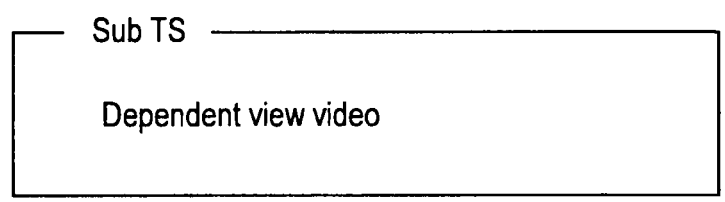

FIG.25

| Syntax | No. of bits | Mnemonic |
|---|---|---|
| xxxxx. mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList ( ) | | |
|     for (i=0; i<N1; i++) { | | |
|         padding_word | 16 | bslbf |
|     } | | |
|     PlayList ( ) | | |
|     for (i=0; i<N2; i++) { | | |
|         padding_word | 16 | bslbf |
|     } | | |
|     PlayListMark ( ) | | |
|     for (i=0; i<N3; i++) { | | |
|         padding_word | 16 | bslbf |
|     } | | |
|     ExtensionData ( ) | | |
|     for (i=0; i<N4; i++) { | | |
|         padding_word | 16 | bslbf |
|     } | | |
| } | | |

FIG.26

PlayList_Syntax

| Syntax | No. of bits | Mnemonic |
|---|---|---|
| PlayList ( ) { | | |
|     length | 32 | uimsbf |
|     reserved_for_future_use | 16 | bslbf |
|     number_of_PlayItems | 16 | uimsbf |
|     number_of_SubPaths | 16 | uimsbf |
|     for (PlayItem_id=0;<br>        PlayItem_id<number_of_PlayItems;<br>        PlayItem_id++) { | | |
|         PlayItem ( ) | | |
|     } | | |
|     for (SubPath_id=0;<br>        SubPath_id<number_of_SubPaths;<br>        SubPath_id++) { | | |
|         SubPath ( ) | | |
|     } | | |
| } | | |

FIG.27

SubPath_Syntax

| Syntax | No. of bits | Mnemonic |
|---|---|---|
| SubPath ( ) { | | |
| length | 32 | uimsbf |
| reserved_for_future_use | 8 | bslbf |
| SubPath_type | 8 | uimsbf |
| reserved_for_future_use | 15 | uimsbf |
| is_repeat_SubPath | 1 | bslbf |
| reserved_for_future_use | 8 | bslbf |
| number_of_SubPlayItems | 8 | uimsbf |
| for (i=0; i < number_of_SubPlayItems; i++) { | | |
| SubPlayItem ( i ) | | |
| } | | |
| } | | |

FIG.28

SubPlayItem( i ) - Syntax

| Syntax | No. of bits | Mnemonic |
|---|---|---|
| SubPlayItem( i ) { | | |
|    length | 16 | uimsbf |
|    Clip_Information_file_name [0]     //subclip_entry_id=0 | 8*5 | bslbf |
|    Clip_codec_identifier [0] | 8*4 | bslbf |
|    reserved_for_future_use | 31 | bslbf |
|    is_multi_Clip_entries | 1 | bslbf |
|    ref_to_STC_id [0] | 8 | uimsbf |
|    SubPlayItem_IN_time | 32 | uimsbf |
|    SubPlayItem_OUT_time | 32 | uimsbf |
|    sync_PlayItem_id | 16 | uimsbf |
|    sync_start_PTS_of_PlayItem | 32 | uimsbf |
|    if (is_multi_Clip_entries==1b) { | | |
|       reserved_for_future_use | 8 | bslbf |
|       num_of_Clip_entries | 8 | uimsbf |
|       for (subclip_entry_id=1; //Note:Entries after subclip_entry_id=0 subclip_entry_id<num_of_Clip_entries; subclip_entry_id++) { | | |
|          Clip_Information_file_name [subclip_entry_id] | 8*5 | bslbf |
|          Clip_codec_identifier [subclip_entry_id] | 8*4 | bslbf |
|          ref_to_STC_id [subclip_entry_id] | 8 | uimsbf |
|          reserved_for_future_use | 8 | bslbf |
|       } | | |
|    } | | |
| } | | |

FIG.29

PlayItem - Syntax

| Syntax | No. of bits | Mnemonic |
|---|---|---|
| PlayItem( ) { | | |
|     length | 16 | uimsbf |
|     Clip_Information_file_name [0] | 8*5 | bslbf |
|     Clip_codec_identifier [0] | 8*4 | bslbf |
|     reserved_for_future_use | 11 | bslbf |
|     is_multi_angle | 1 | bslbf |
|     connection_condition | 4 | uimsbf |
|     ref_to_STC_id [0] | 8 | uimsbf |
|     IN_time | 32 | uimsbf |
|     OUT_time | 32 | uimsbf |
|     U0_mask_table ( ) | | |
|     PlayItem_random_access_mode | 8 | uimsbf |
|     still_mode | 8 | uimsbf |
|     if (still_mode==0x1) { | | |
|         still_time | 16 | uimsbf |
|     } else { | | |
|         reserved | 16 | bslbf |
|     } | | |
|     if (is_multi_angle==1b) { | | |
|         number_of_angles | 8 | uimsbf |
|         reserved_for_future_use | 7 | bslbf |
|         is_seamless_angle_change | 1 | uimsbf |
|         for (angle_id=1; //Note; angles after angle_id=1 | | |
|             angle_id<number_of_angles; angle_id++) { | | |
|                 Clip_Information_file_name [angle_id] | 8*5 | bslbf |
|                 Clip_codec_identifier [angle_id] | 8*4 | bslbf |
|                 ref_to_STC_id [angle_id] | 8 | uimsbf |
|                 reserved_for_future_use | 16 | bslbf |
|         } | | |
|     } | | |
|     STN_table ( ) | | |
| } | | |

FIG.30

STN-table ( )

| Syntax | No. of bits | Mnemonic |
|---|---|---|
| STN_table ( ) { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry ( ) | | |
|         stream_attribute ( ) | | |
|     } | | |
|     for (audio_stream_id=0;<br>        audio_stream_id < number_of_audio_stream_entries;<br>        audio_stream_id++) { | | |
|         stream_entry ( ) | | |
|         stream_attributes ( ) | | |
|     } | | |
|     for (audio_stream_id2=0;<br>        audio_stream_id2 < number_of_audio_stream2_entries;<br>        audio_stream_id2++) { | | |
|         stream_entry ( ) | | |
|         stream_attributes ( ) | | |
|     } | | |
|     for (PG_textST_stream_id=0;<br>        PG_textST_stream_id < number_of_PG_textST_stream_entries;<br>        PG_textST_stream_id++) { | | |
|         stream_entry ( ) | | |
|         stream_attribute ( ) | | |
|     } | | |
|     for (IG_stream_id=0;<br>        IG_stream_id < number_of_IG_stream_entries;<br>        IG_stream_id++) { | | |
|         stream_entry ( ) | | |
|         stream_attribute ( ) | | |
|     } | | |
| } | | |

FIG.31

```
1:  3D_PlayList {
2:    number_of_PlayItems
3:    for (i=0; i < number_of_PlayItems; i++) {
4:      PlayItem () {
5:        ref_to_B_clpi_file_name // digit type OF FIVE DIGITS EXCLUDING EXTENSION OF m2ts file INCLUDING Base-view(B-view)video
6:        type
7:        STN_table ()
8:      }
9:    number_of_SubPaths
10:   for (i=0; i < number_of_SubPaths; i++) {
11:     SubPath () [i] {
12:       SubPath_type
13:       ref_to_clpi_file_name
14:     }
15:   }
16:   interleaved_file_info () {
17:     if (type== "D1-D2-B are interleaved") {
18:       ref_to_D1-B_interleaved_file_name
19:       ref_to_D2-B_interleaved_file_name
20:       ref_to_D1_clpi_file_name
21:       ref_to_D2_clpi_file_name
22:     }
23:     else if (type== "D1-B are interleaved") {
24:       ref_to_D1-B_interleaved_file_name
25:       ref_to_D1_clpi_file_name
26:     }
27:     else if (type== "D2-B are interleaved") {
28:       ref_to_D2-B_interleaved_file_name
29:       ref_to_D2_clpi_file_name
30:     }
31:   }
32: }
```

FIG.32

| type | Meaning |
|------|---------|
| 0 | Not interleaved. A single m2ts that includes B-view and may includes D1 view and / or D2 view |
| 1 | D1-D2-B are interleaved. |
| 2 | D1-B are interleaved. |
| 3 | D2-B are interleaved. |

FIG.33

SubPath_type

| SubPath_type | Meaning |
|---|---|
| 0 | reserved |
| 1 | reserved |
| 2 | Out-of-mux and primary audio presentation path of the Browsable slideshow<br>(The audio presentation path using the SubPath is not synchronized with the main path using PlayItems in the PlayList.) |
| 3 | Out-of-mux and interactive graphics menu<br>(The interactive graphics menu using the SubPath is not synchronized with the main path using PlayItems in the PlayList.) |
| 4 | Out-of-mux and text subtitle presentation path<br>(The text subtitle presentation path using the SubPath is synchronized with the main path using PlayItems in the PlayList.) |
| 5 | Out-of-mux and AV synchronized type of one or more elementary streams path<br>(Primary audio/ PG/ IG/ Secondary audio path.)<br><br>Out-of-mux and AV synchronized type of picture-in-picture presentation path which contains one or more elementary stream paths.<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of picture-in-picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of picture-in-picture presentation path which contains one or more elementary stream paths.<br><br>(The elementary streams used by the path are multiplexed in the same Clip used by PlayItem. The path using the SubPath is synchronized with the main path using PlayItems in the PlayList.) |
| 8 | SUBPATH FOR REPRODUCING D1-view video |
| 9 | SUBPATH FOR REPRODUCING D2-view video |
| 10-255 | reserved |

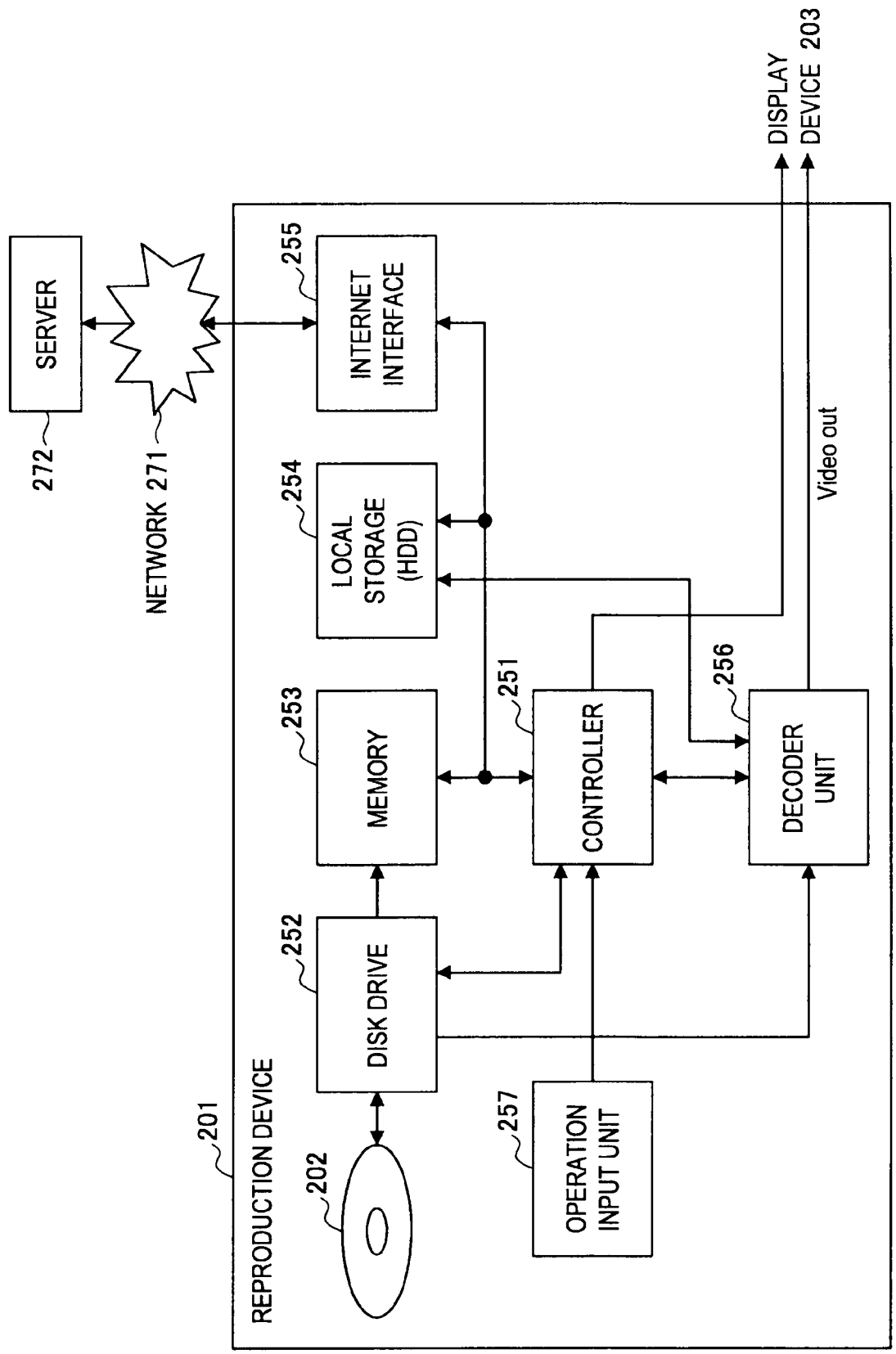

FIG.36

3D_PlayList

```
00000. mpls {
    PlayaItem ( ) {
        "00001" ; // 00001. clpi (ref_to_B_clpi_file_name)
        type = "D1-D2-B" are interleaved" ;
        STN_table ( )
    }
    SubPath ( ) [1] {
        SubPath_type = 9; "00002" ; // ref to 00002. clpi
    }
    SubPath ( ) [2] {
        SubPath_type = 8; "00003" ; // ref to 00003. clpi
    }
    interleaved_file_info ( ) {
        10000; // 10000. ilvt (ref_to_D1_B_interleaved_file_name)
        20000; // 20000. ilvt (ref_to_D2_B_interleaved_file_name)
        00003; // 00003. clpi (ref_to_D1_clpi_file_name)
        00002; // 00002. clpi (ref_to_D2_clpi_file_name)
    }
}
```

FIG.37

A
```
00001. clpi {
    number_of_source_packets1
    EP_map
    chunk_map ( )
}
```

B
```
00002. clpi {
    number_of_source_packets2
    EP_map
    chunk_map ( )
}
```

C
```
00003. clpi {
    number_of_source_packets3
    EP_map
    chunk_map ( )
}
```

FIG.40

```
chunk_map ( ) {
    number_of_chunks
    for (i=0 ; i<number_of_chunks; i++) {
        SPN_chunk_start [ i ]
    }
}
```

FIG.41

A
```
00001. clpi {
    number_of_source_packets1
    EP_map
    chunk_map ( ) {
        n,
        0, c1, c2, ... , cn
    }
}
```

B
```
00002. clpi {
    number_of_source_packets2
    EP_map
    chunk_map ( ) {
        n,
        0, b1, b2, ... , bn
    }
}
```

C
```
00003. clpi {
    number_of_source_packets3
    EP_map
    chunk_map ( ) {
        n,
        0, a1, a2, ... , an
    }
}
```

FIG.43

3D_PlayList

```
00000. mpls {
    PlayaItem ( ) {
        "00001" ; // 00001. clpi (ref_to_B_clpi_file_name)
        type = "D2-B" are interleaved" ;
        STN_table ( )
    }
    SubPath ( ) {
        SubPath_type = 9; "00002" ; // ref to 00002. clpi
    }
    interleaved_file_info ( ) {
        20000; // 20000. ilvt (ref_to_D2_B_interleaved_file_name)
        00002; // 00002. clpi (ref_to_D2_clpi_file_name)
    }
}
```

FIG.44

A
```
00001. clpi {
      EP_map
      chunk_map ( )
}
```

B
```
00002. clpi {
      EP_map
      chunk_map ( )
}
```

FIG.47

3D_PlayList

```
00000. mpls {
    PlayaItem ( ) {
        "00001" ; // 00001. clpi (ref_to_B_clpi_file_name)
        type = "D2-B" are interleaved" ;
        STN_table ( )
    }
    SubPath ( ) [ 1 ] {
        SubPath_type = 9; "00002" ; // ref to 00002. clpi
    }
    SubPath ( ) [ 2 ] {
        SubPath_type = 8; "00003" ; // ref to 00003. clpi
    }
    interleaved_file_info ( ) {
        20000; // 20000. ilvt (ref_to_D2_B_interleaved_file_name)
        00002; // 00002. clpi (ref_to_D2_clpi_file_name)
    }
}
```

FIG.48

A
```
00001. clpi {
    EP_map
    chunk_map ( )
}
```

B
```
00002. clpi {
    EP_map
    chunk_map ( )
}
```

FIG.51

| i | SPN_chunk_start [ i ] of 00001. clpi | SPN_chunk_start [ i ] of 00002. clpi | SPN_chunk_start [ i ] of 00003. clpi |
|---|---|---|---|
| 0 | 0 | 0 | 0 |
| 1 | c1 | b1 | a1 |
| 2 | c2 | b2 | a2 |
| ... | ... | ... | ... |
| n | cn | bn | an |

FIG.52

```
EP_map ( ) {
    number_of_EP_entries
    for (i=0 ; i<number_of_EP_entries; i++) {
        PTS_EP_start [ i ]
        SPN_EP_start [ i ]
    }
}
```

FIG.61

| 3D_Clip_type (2bit) | Meaning |
|---|---|
| 00 | 2D Clip |
| 01 | Base view video |
| 10 | D1 view video |
| 11 | D2 view video |

FIG.62

| 3D_App_type (2bit) | Meaning |
|---|---|
| 00 | 2D REPRODUCTION APPLICATION |
| 01 | B-D1 REPRODUCTION APPLICATION |
| 10 | B-D2 REPRODUCTION APPLICATION |
| 11 | B-D1 and B-D2 REPRODUCTION APPLICATION |

FIG.64

ClipInfo file

| zzzzz. clpi { | |
|---|---|
| ...snip... | |
| 3D_Clip_type | 2 |
| 3D_App_type | 2 |
| ...snip... | 92 |
| ExtensionData ( ) | |
| for (i=0; i<N6; i++) { | |
| padding_word | 16 |
| } | |
| } | |

FIG.65

ClipInfo file ExtensionData ( )

| 3DClipInfo ( ) { | |
|---|---|
| If (3D_Clip_type==01b) { | |
| If (3D_App_type==01b\|\|3D_App_type==11b) { | |
| D1_ClipInfo_file_name | 8*5 |
| B-D1_Interleave_Info_file_name | 8*5 |
| } | |
| If (3D_App_type==10b\|\|3D_App_type==11b) { | |
| D2_ClipInfo_file_name | 8*5 |
| B-D2_Interleave_Info_file_name | 8*5 |
| } | |
| num_of_Ext_file | 32 |
| for (i=0; i<num_of_Ext_file; i++) { | |
| Ext_start_address | 24 |
| Ext_size | 16 |
| } | |
| } | |

FIG.66

ClipInfo file ExtensionData ( )

| 3DClipInfo ( ) { | |
|---|---|
| If (3D_Clip_type==01b) { | |
| If (3D_App_type==01b\|\|3D_App_type==11b) { | |
| D1_ClipInfo_file_name | 8*5 |
| B-D1_Interleave_Info_file_name | 8*5 |
| } | |
| If (3D_App_type==10b\|\|3D_App_type==11b) { | |
| D2_ClipInfo_file_name | 8*5 |
| B-D2_Interleave_Info_file_name | 8*5 |
| } | |
| num_of_Ext_file | 32 |
| for (i=0; i<num_of_Ext_file; i++) { | |
| Ext_size | 16 |
| } | |
| } | |

FIG.69

Interleave ClipInfo file

| zzzzz. ilvt { | Mnemonic |
|---|---|
| 3D_App_type | 2 |
| if (3D_App_type==01b||3D_App_type==11b) { | |
| D1_ClipInfo_file_name | 8*5 |
| } | |
| if (3D_App_type==10b||3D_App_type==11b) { | |
| D2_ClipInfo_file_name | 8*5 |
| } | |
| } | |

INFORMATION PROCESSING DEVICE, INFORMATION PROCESSING METHOD, PROGRAM, AND DATA STRUCTURE

BACKGROUND OF THE INVENTION

1. Field of the Invention

The present invention relates to information processing devices, information processing methods, programs, and data structures, in particular, to an information processing device, an information processing method, a program and a data structure enabling a content of 3D (Dimension) image to be appropriately reproduced from a recording medium.

2. Description of the Related Art

For instance, a content of two-dimensional (2D) image is the main stream for contents of movies, and the like, but a content of three-dimensional (3D) image (graphic) that can be stereoscopically viewed is recently given attention.

There are various methods for the method of displaying the 3D image (hereinafter referred to as stereo image), where the amount of data of the 3D image becomes greater than the amount of data of the 2D image regardless of which method is used.

The content of high-resolution image such as the movie has large capacity, and thus a large capacity recording medium is desired to record such image content of large capacity as a 3D image of large amount of data.

Such large capacity recording medium includes a Blu-Ray (registered trademark) Disk (hereinafter also referred to as BD) such as a BD (Blu-Ray (registered trademark))-ROM (Read Only Memory).

A file management device in which re-recording in the recording medium so as to file only the editing target portion of the relevant signal is not performed even in the editing process of dividing or coupling the filed signal at an arbitrary position by specifying the recording position in the recording medium of the signal with a predetermined unit smaller than a sector and filing the same by a filing unit, so that the editing process can be performed only in the file management information thereby significantly simplifying the editing process is proposed (Japanese Patent Application Laid-Open No. 11-195287).

SUMMARY OF THE INVENTION

In the standard of the current BD, how to record the content of the 3D image in the BD or how to reproduce the content is not defined.

However, if an author performing the authoring of the content of the 3D image is responsible for the manner of recording and reproducing the content of the 3D image, the content of the 3D image may not be appropriately reproduced.

In light of the foregoing, it is desirable to enable the content of stereo image (3D image) to be appropriately reproduced from a recording medium such as the BD.

According to an embodiment of the present invention, there is provided an information processing device, including reproduction controller configured to obtain a dividing position for dividing a virtual extent of a virtual extent file read out from a recording medium recorded with, interleaved data obtained by dividing each of a base stream and an enhanced stream recorded in the recording medium into an extent that is a segment of a stream, and arranging the extents of the base stream and the enhanced stream in an interleaved manner so that the extent of the base stream and the extent of the enhanced stream are adjacent to each other, and a file entry of a base file in which the extent of the base stream is stored in a reproducing order, and a virtual extent file in which the virtual extent is stored in a reproducing order, with a set of the extent of the base stream and the extent of the enhanced stream, which are adjacent to each other in the interleaved data, as the virtual extent, into the extent of the base stream and the extent of the enhanced stream from the file entries of the base file and the virtual extent file, and dividing the virtual extent into the extent of the base stream and the extent of the enhanced stream by dividing at the dividing position. The base stream is a stream which may be used to display a 2D (Dimension) image, the enhanced stream is a stream used with the base stream to display a 3D image, positional information representing a position of the extent of the base stream on the recording medium is registered in the file entry of the base file, and positional information of the virtual extent is registered in the file entry of the virtual extent file.

According to a first embodiment of the present invention, there is provided an information processing device or program, including: reproduction controller configured to obtain a dividing position for dividing a virtual extent of a virtual extent file read out from a recording medium recorded with, interleaved data obtained by dividing each of a base stream and an enhanced stream recorded in the recording medium into an extent that is a segment of a stream, and arranging the extents of the base stream and the enhanced stream in an interleaved manner so that the extent of the base stream and the extent of the enhanced stream are adjacent to each other, and a file entry of a base file in which the extent of the base stream is stored in a reproducing order, and a virtual extent file in which the virtual extent is stored in a reproducing order, with a set of the extent of the base stream and the extent of the enhanced stream, which are adjacent to each other in the interleaved data, as the virtual extent; into the extent of the base stream and the extent of the enhanced stream from the file entries of the base file and the virtual extent file, and dividing the virtual extent into the extent of the base stream and the extent of the enhanced stream by dividing at the dividing position, wherein the base stream is a stream which may be used to display a 2D (Dimension) image, the enhanced stream is a stream used with the base stream to display a 3D image, positional information representing a position of the extent of the base stream on the recording medium is registered in the file entry of the base file, and positional information of the virtual extent is registered in the file entry of the virtual extent file.

According to the first embodiment described above, the recording medium is recorded with interleaved data, and the file entry of the base file and the virtual extent file. A dividing position for dividing the virtual extent of the virtual extent file read out from the recording medium into the extent of the base stream and the extent of the enhanced stream is obtained from the file entries of the base file and the virtual extent file, and the virtual extent is divided into the extent of the base stream and the extent of the enhanced stream by dividing the virtual extent at the dividing position.

The interleaved data is obtained by dividing the base stream and the enhanced stream each into the extent that is the segment of the stream, and arranging the extents of the base stream and the enhanced stream in an interleaved manner so that the extent of the base stream and the extent of the enhanced stream are adjacent to each other. The base file is a file in which the extent of the base stream is stored in the reproducing order, and the virtual extent file is a file in which the virtual extent is stored in the reproducing order, with a set of the extent of the base stream and the extent of the enhanced stream, which are adjacent to each other in the interleaved data, as the virtual extent. Furthermore, the base stream is a stream that can be used to display the 2D (Dimension) image, and the enhanced stream is a stream used with the base stream to display the 3D image, where the positional information representing the position of the extent of the base stream on the recording medium is registered in the file entry of the base file, and the positional information of the virtual extent is registered in the file entry of the virtual extent file.

According to an embodiment of the present invention, there is provided an information processing device, comprising interleaved data generator configured to generate interleaved data obtained by dividing each of a base stream and an enhanced stream recorded in a recording medium into an extent that is a segment of a stream, and arranging the extents of the base stream and the enhanced stream in an interleaved manner so that the extent of the base stream and the extent of the enhanced stream are adjacent to each other, a file entry generator configured to generate a file entry of a base file in which the extent of the base stream is stored in a reproducing order, and a virtual extent file in which a virtual extent is stored in a reproducing order, with a set of the extent of the base stream and the extent of the enhanced stream, which are adjacent to each other in the interleaved data, as the virtual extent; and a recording controller configured to perform a recording control of recording the interleaved data, as well as, the file entries of the base file and the virtual extent file in the recording medium. The base stream is a stream which may be used to display a 2D (Dimension) image, the enhanced stream is a stream used with the base stream to display a 3D image, positional information representing a position of the extent of the base stream on the recording medium is registered in the file entry of the base file; and positional information of the virtual extent is registered in the file entry of the virtual extent file.

According to a first embodiment of the present invention, there is provided an information processing method, including the steps of: generating interleaved data obtained by dividing each of a base stream and an enhanced stream recorded in a recording medium into an extent that is a segment of a stream, and arranging the extents of the base stream and the enhanced stream in an interleaved manner so that the extent of the base stream and the extent of the enhanced stream are adjacent to each other; generating a file entry of a base file in which the extent of the base stream is stored in a reproducing order, and a virtual extent file in which a virtual extent is stored in a reproducing order, with a set of the extent of the base stream and the extent of the enhanced stream, which are adjacent to each other in the interleaved data, as the virtual extent; and performing a recording control of recording the interleaved data, as well as, the file entries of the base file and the virtual extent file in the recording medium, wherein the base stream is a stream which may be used to display a 2D (Dimension) image, the enhanced stream is a stream used with the base stream to display a 3D image, positional information representing a position of the extent of the base stream on the recording medium is registered in the file entry of the base file, and positional information of the virtual extent is registered in the file entry of the virtual extent file.

According to the second embodiment described above, the interleaved data obtained by dividing the base stream and the enhanced stream recorded in the recording medium respectively into the extent that is the segment of the stream, and arranging the extents of the base stream and the enhanced stream in an interleaved manner so that the extent of the base stream and the extent of the enhanced stream are adjacent to each other is generated. The respective file entry of the base file in which the extent of the base stream is stored in the reproducing order, and the virtual extent file in which the virtual extent is stored in the reproducing order, with the set of the extent of the base stream and the extent of the enhanced stream, which are adjacent to each other in the interleaved data, as the virtual extent are generated. The interleaved data as well as the file entries of the base file and the virtual extent file are recorded in the recording medium. In this case, the base stream is a stream that can be used to display the 2D (Dimension) image, and the enhanced stream is a stream used with the base stream to display the 3D image, where the positional information representing the position of the extent of the base stream on the recording medium is registered in the file entry of the base file, and the positional information of the virtual extent is registered in the file entry of the virtual extent file.

According to the third embodiment described above, there is provided a data structure including interleaved data obtained by dividing each of a base stream and an enhanced stream recorded in a recording medium into an extent that is a segment of a stream, and arranging the extents of the base stream and the enhanced stream in an interleaved manner so that the extent of the base stream and the extent of the enhanced stream are adjacent to each other; and a file entry of, a base file in which the extent of the base stream is stored in a reproducing order, and a virtual extent file in which a virtual extent is stored in a reproducing order, with a set of the extent of the base stream and the extent of the enhanced stream, which are adjacent to each other in the interleaved data, as the virtual extent. The base stream is a stream which may be used to display a 2D (Dimension) image, the enhanced stream is a stream used with the base stream to display a 3D image, positional information representing a position of the extent of the base stream on the recording medium is registered in the file entry of the base file, and positional information of the virtual extent is registered in the file entry of the virtual extent file.

The data structure of the third embodiment includes the interleaved data and the file entry. The interleaved data is data obtained by dividing the base stream and the enhanced stream recorded in the recording medium respectively to the extent that is the segment of the stream, and arranging the extents of the base stream and the enhanced stream in an interleaved manner so that the extent of the base stream and the extent of the enhanced stream are adjacent to each other, and the file entry is a file entry of the base file in which the extent of the base stream is stored in the reproducing order, and the virtual extent file in which the virtual extent is stored in the reproducing order, with the set of the extent of the base stream and the extent of the enhanced stream, which are adjacent to each other in the interleaved data, as the virtual extent. The base stream is a stream that can be used to display the 2D (Dimension) image, and the enhanced stream is a stream used with the base stream to display the 3D image, where the positional information representing the position of the extent of the base stream on the recording medium is registered in the file entry of the base file, and the positional information of the virtual extent is registered in the file entry of the virtual extent file.

The information processing device may be an independent device or may be an internal block configuring one device.

The above-described program and the data of the data structure can be provided by being transmitted through the transmission medium or by being recorded in the recording medium.

According to the embodiment of the present invention described above, the contents of the stereo image (3D image) can be appropriately reproduced.

BRIEF DESCRIPTION OF THE DRAWINGS

FIG. 11 is a view describing the management of the file on the disk 10 by the file system;

FIG. 20 is a view showing another configuration example of the TS;

FIG. 21 is a view showing further configuration example of the TS;

FIG. 25 is a view showing the syntax of the PlayList file;

FIG. 26 is view showing the syntax of the PlayList( ) of FIG. 25;

FIG. 27 is a view showing the syntax of SubPath( ) of FIG. 26;

FIG. 28 is a view showing the syntax of the SubPlayItem(i) of FIG. 27;

FIG. 29 is a view showing the syntax of the PlayItem( ) of FIG. 26;

FIG. 30 is a view showing the syntax of the STN_table( ) of FIG. 29;

FIG. 31 is a view showing a specific example of the 3D_PlayList;

FIG. 32 is a view showing the meaning of type;

FIG. 33 is a view showing the meaning of SubPath_type;

FIG. 34 is a block diagram showing a configuration example of the reproduction device;

FIG. 36 is a view showing an example of the 3D_PlayList;

FIG. 37 is a view showing the syntax of the clpi file;

FIG. 40 is a view showing an example of the syntax of the chunk_map( );

FIG. 41 is a view showing a specific example of the chunk_map( );

FIG. 43 is a view showing another example of the 3D_PlayList;

FIG. 44 is a view showing the syntax of the clpi file;

FIG. 47 is a view showing another example of the 3D_PlayList;

FIG. 48 is a view showing the syntax of the clpi file;

FIG. 51 is a view collectively showing the content of the chunk_map( ) of FIG. 41;

FIG. 52 is a view showing the syntax of the EP_map( );

FIG. 61 is a view showing the meaning of 3D_Clip_type;

FIG. 62 is a view showing the meaning of 3D_App_type;

FIG. 64 is a view showing the syntax of the clpi file;

FIG. 65 is a view showing a specific example of a description in the ExtensionData( ) of the clpi file;

FIG. 66 is a view showing another specific example of a description in the ExtensionData( ) of the clpi file;

FIG. 69 is a view showing the syntax of the Interleave ClipInfo file;

DETAILED DESCRIPTION OF THE EMBODIMENTS

Figure 1:
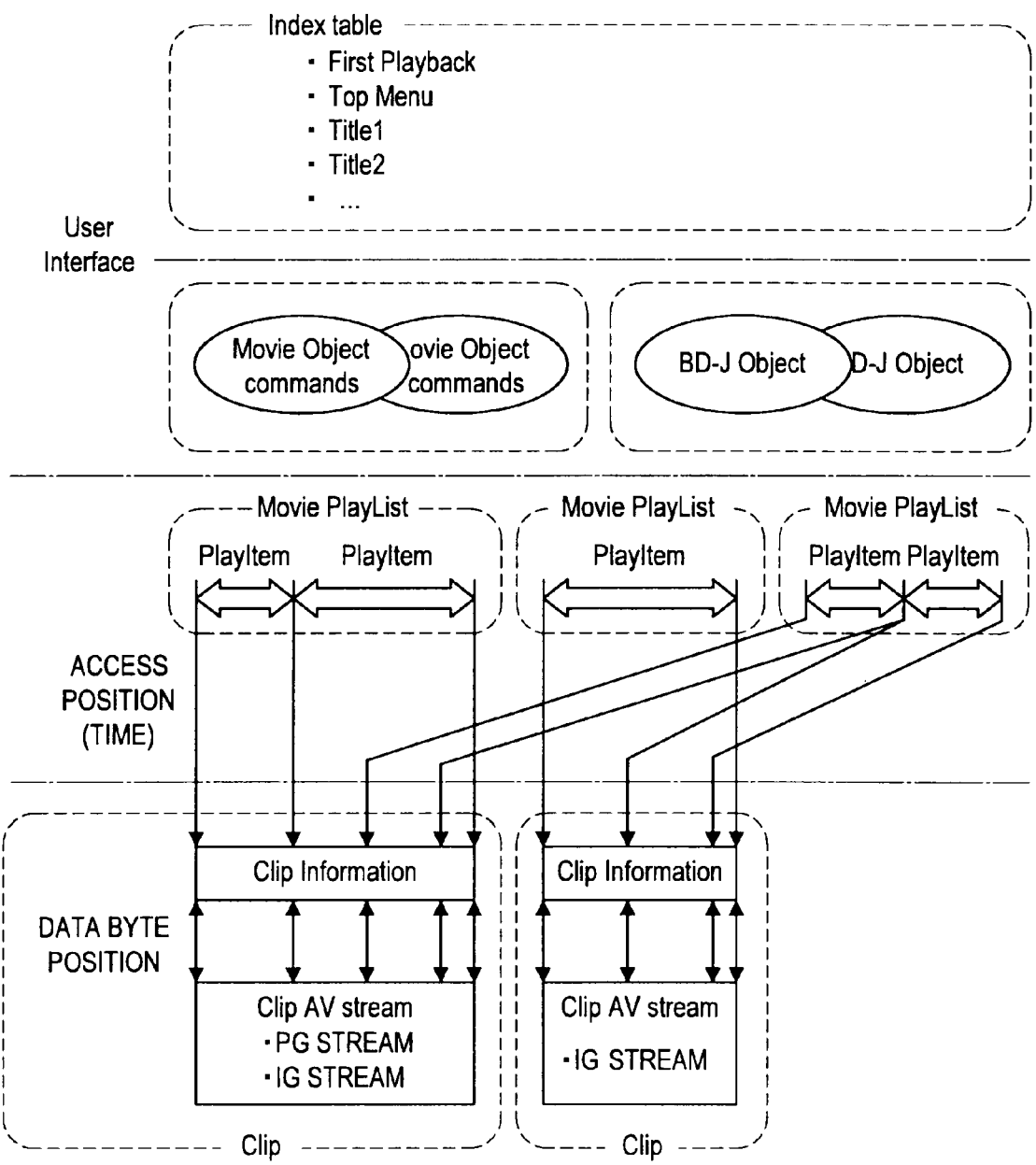
FIG. 1 is a view describing an outline of a BDMV format.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<First Embodiment>

Embodiments of the present invention will be described below using a case in which the present invention is applied to the BD by way of example.

[Management Structure of BD]

First, with respect to the current BD, a management structure (hereinafter also referred to as BDMV format) of AV (Audio/Video) data etc. serving as the content recorded in the BD-ROM, which is a read only type BD, defined in "Blu-ray Disk Read-Only Format Ver1.0 part3 Audio Visual Specifications" will be described.

In the BD standard, a bit stream encoded by an encoding method such as MPEG (Moving Picture Experts Group) video and MPEG audio and multiplexed according to the MPEG2 system is called a clip AV stream (or AV stream). The clip AV stream is recorded in the BD as a file by a file system defined in "Blu-ray Disk Read-Only Format part 2", which is one of the BD standards. The file of the clip AV stream is called a clip AV stream file (or AV stream file).

The clip AV stream file is a management unit on the file system, and information etc. for reproducing the clip AV stream file (clip AV stream thereof) is recorded in the BD as a database. Such database is defined in "Blu-ray Disk Read-Only Format part 3", which is one of the BD standards.

FIG. 1 is a view describing an outline of the BDMV format.

The BDMV format is configured by four layers.

The layer of lowermost level is the layer to which the clip AV stream belongs, and is hereinafter also appropriately referred to as clip layer.

The layer one above the clip layer is a layer, to which a play list (Movie PlayList) belongs, for specifying the reproducing location with respect to the clip AV stream, and is hereinafter also referred to as a play list layer.

The layer one above the play list layer is a layer to which a movie object and the like, including a command for specifying the reproducing order etc. with respect to the play list, belongs, and is hereinafter also referred to as an object layer.

The layer (uppermost level layer) one above the object layer is a layer to which an index table for managing the title etc. stored in the BD belongs, and is hereinafter also referred to as an index layer.

The clip layer, the play list layer, the object layer, and the index layer will be further described.

The clip AV stream, clip information, and the like belong to the clip layer.

The clip AV stream is a stream in which the video data, the audio data, and the like serving as data of the content is converted to a form of TS (MPEG2 TS (Transport Stream)).

The clip information is information related to the clip AV stream, and is recorded in the BD as a file.

The clip AV stream includes stream of graphics such as captions and menus, as necessary.

The stream of the caption (graphics thereof) is called a presentation graphics (PG) stream, and the stream of the menu (graphics thereof) is called an Interactive Graphics (IG) stream.

A set of the clip AV stream file, and the file (clip information file) of the corresponding clip information (clip information related to the clip AV stream of the clip AV stream file) is called a clip.

The clip is one object configured by the clip AV stream and the clip information.

A plurality of positions including the first and last position (time) of when the content corresponding to the clip AV stream configuring the clip is developed on the time axis can be set to the access point. The access point is mainly specified by the play list of the layer of higher level in time stamp.

The clip information configuring the clip includes an address (logical address) of the position of the clip AV stream represented by the access point specified in time stamp by the play list.

The play list (Movie PlayList) belongs to the play list layer.

The play list is configured by a play item (PlayItem) including an AV stream file for performing reproduction, and a reproduction start point (IN point) for specifying the reproducing location of the AV stream file as well as a reproduction end point (OUT point).

Therefore, the play list is configured by a collection of play items.

The reproduction of the play item means reproduction of an interval of the clip AV stream specified by the IN point and the OUT point contained in the play item.

A movie object and a BD-J object (Blu-ray (registered trademark) Disk Java (registered trademark) object) belong to the object layer.

The movie object includes terminal information causing an HDMV (High Definition Movie) navigation command program (navigation command) to be cooperated with the movie object.

The navigation command is a command for controlling the reproduction of the play list. The terminal information includes information allowing an interactive operation of the user with respect to the BD player for reproducing the BD. In the BD player, user operations such as call-out of the menu and title search are controlled based on the terminal information.

The BD-J object is a Java (registered trademark) program, where a more sophisticated (refined) interactive function than the navigation command can be provided to the user by the BD-J object (BD-J title or BD-J application).

The index table belongs to the index layer.

The index table is a table of the top level defining the title of the BD-ROM disk.

The entry (field) of the index table corresponds to the title, where each entry is linked to the object (movie object, BD-J object) of the title (HDMV title, BD-J title) corresponding to such entry.

Figure 2:
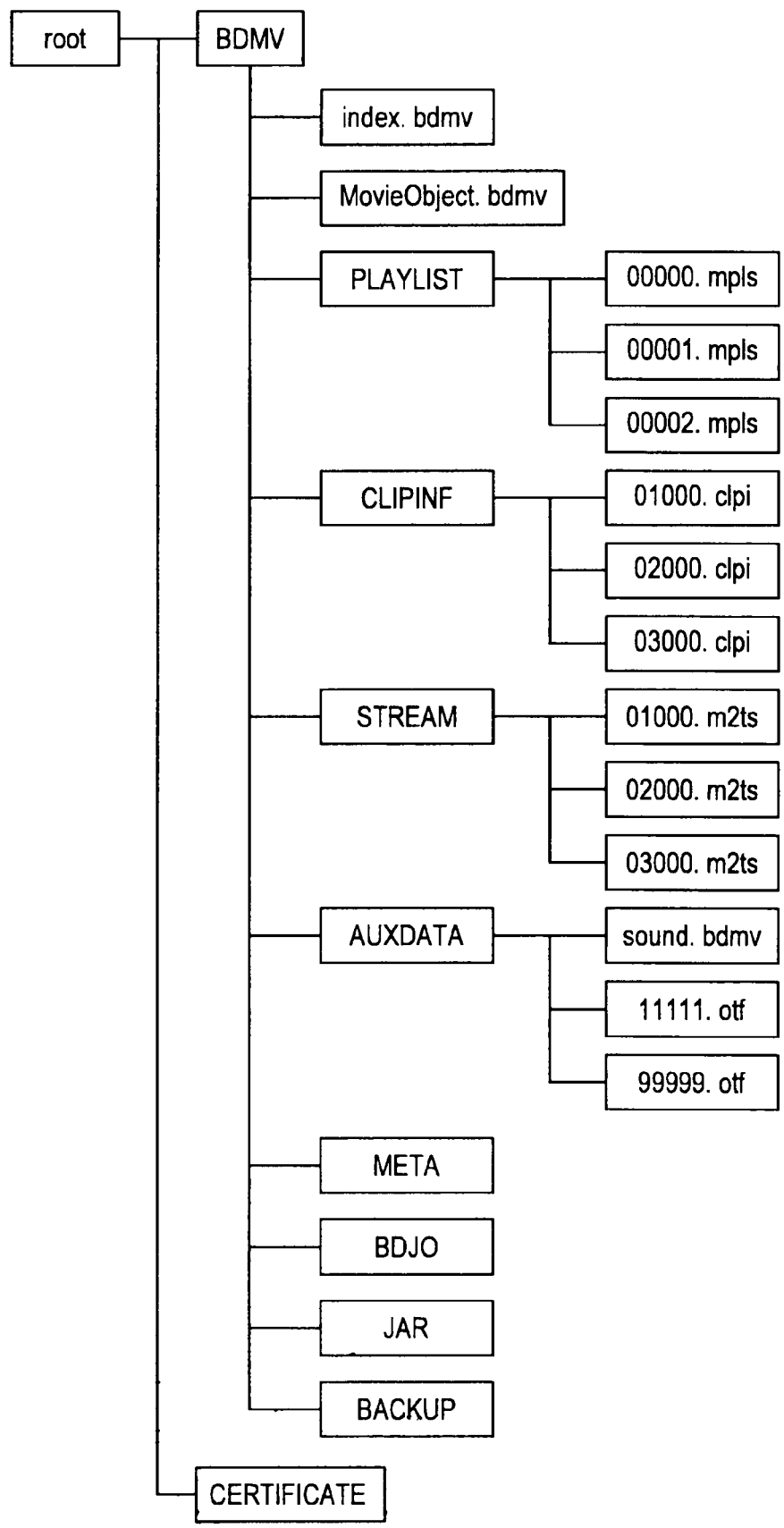
FIG. 2 is a view describing a management structure of a file of a BD.

FIG. 2 is a view describing a management structure of the file of the BD defined in "Blu-ray Disk Read-Only Format part 3".

In the BD, the file is hierarchically managed by a directory structure.

In FIG. 2, the file (include directory) below the directory refers to the file immediately below the relevant directory, and the file contained in the directory refers to the file immediately below the directory and the file below the so-called sub-directory of the relevant directory.

The directory of the uppermost hierarchy of the BD is the root directory, and the directory "BDMV" and the directory "CERTIFICATE" exist immediately below the root directory.

Information (file) related to copyright is stored in the directory "CERTIFICATE".

The file of the BDMV format described in FIG. 1 is stored in the directory "BDMV".

Two files, file "index.bdmv" and "MovieObject.bdmv" are stored immediately below the directory "BDMV". The files (exclude directory) other than the files "index.bdmv" and "MovieObject.bdmv" may not be stored immediately below the directory "BDMV".

The file "index.bdmv" includes the index table described in FIG. 1 serving as information related to the menu for reproducing the BD.

The BD player reproduces an initial menu (screen thereof) containing items of contents such as reproduce all contents of the BD, reproduce only a specific chapter, perform repeated reproduction, and display a predetermined menu based on the file "index.bdmv".

The movie object executed when each item is selected can be set to the file "index.bdmv", where the BD player executes the command of the Movie Object set in the file "index.bdmv" when one item is selected from the initial menu screen by the user.

The file "MovieObject.bdmv" is a file containing information of the Movie Object. The Movie Object includes a command for controlling the reproduction of the PlayList recorded in the BD, and for example, the BD player reproduces the content (title) recorded in the BD by selecting and executing one command from the Movie Object recorded in the BD.

The directories "PLAYLIST", "CLIPINF", "STREAM", "AUXDATA", "META", "BDJO", "JAR", and "BACKUP" are arranged immediately below the directory "BDMV".

The database of the play list is stored in the directory "PLAYLIST". In other words, the file "xxxxx.mpls" of the play list is stored in the directory "PLAYLIST". The file name including a five-digit number "xxxxx" and an extension "mpls" is used for the file name of the file "xxxxx.mpls" of the play list.

The database of the clip is stored in the directory "CLIPINF". In other words, the clip information file "xxxxx.clpi" with respect to each clip AV stream file is stored in the directory "CLIPINF". The file name including a five-digit number "xxxxx" and an extension "clpi" is used for the file name of the clip information file "xxxxx.clpi".

The clip AV stream file "xxxxxx.m2ts" is stored in the directory "STREAM". The TS is stored in the clip AV stream file "xxxxxx.m2ts". The file name including a six-digit number "xxxxxx" and an extension "m2ts" is used for the file name of the clip AV stream file "xxxxxx.m2ts".

A same file name, excluding the extension, is used for the clip information file "xxxxx.clpi" and the clip AV stream file "xxxxxx.m2ts" configuring a certain clip. Thus, the clip information file "xxxxx.clpi" and the clip AV stream file "xxxxxx.m2ts" configuring a certain clip can be easily specified.

The directory "AUXDATA" stores a sound file, font file, font index file, bitmap file, and the like used in the menu display, and the like.

In FIG. 2, the file "sound.bdmv" and the file having an extension of "otf" are stored in the directory "AUXDATA".

A predetermined sound data (audio data) is stored in the file "sound.bdmv". As the file name of the file "sound.bdmv", "sound.bdmv" is fixedly used.

The data of the font used in display of captions, and the BD-J object (application) is stored in the file having the extension "otf". A five-digit number is used for the portion other than the extension of the file name of the file having the extension "otf".

The file of the metadata is stored in the directory "META". The file of the BD-J object is stored in the directory "BDJO" and the directory "JAR". The backup of the file recorded in the BD is stored in the directory "BACKUP".

[Configuration Example of Reproduction Device Applied with the Present Invention]

Figure 3:
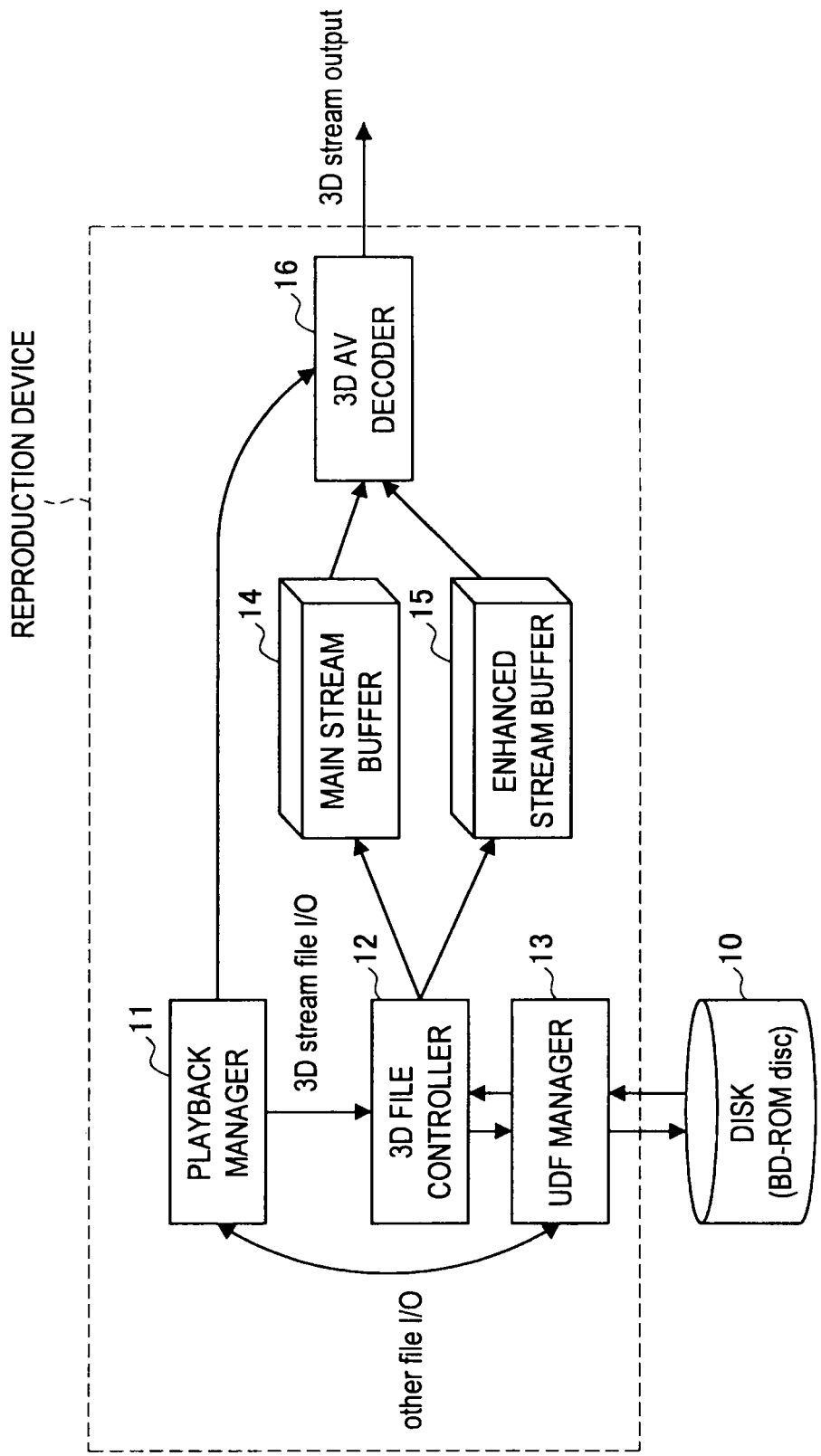
FIG. 3 is a block diagram showing a configuration example of one embodiment of a reproduction device applied with an information processing device according to the embodiment of the present invention.

FIG. 3 is a block diagram showing a configuration example of one embodiment of the reproduction device applied with the present invention.

The reproduction device of FIG. 3 may be a BD player capable of reproducing the content of the 3D image in addition to the content of the 2D image, and performs reproduction of a disk 10 attached thereto.

In other words, the disk 10 is, for example, a BD recorded with files of management structure shown in FIG. 2, similar to the current BD recorded with the content of the 2D image. The disk 10 is also recorded with files for reproducing the content of the 3D image, as hereinafter described.

Therefore, the disk 10 can be reproduced on a legacy player, and can also be reproduced on a BD player (hereinafter also referred to as 3D compatible player) such as the reproduction device of FIG. 3 capable of reproducing the content of the 3D image.

The legacy player is a BD player that is compatible only to the current BD recorded with the content of the 2D image, and that may not reproduce the content of the 3D image.

In the legacy player, the content of the 2D image can be reproduced from the disk 10, but the content of the 3D image may not be reproduced from the disk 10.

In the reproduction device of FIG. 3, that is a 3D compatible player, the content of the 2D image can be reproduced and the content of the 3D image can be reproduced from the disk 10.

In FIG. 3, the disk 10 is removable with respect to the reproduction device.

The reproduction device performs reproduction of the disk 10 attached thereto.

In other words, the reproduction device is configured by a playback manager (BD playback manager) 11, a 3D file controller 12, a UDF manager 13, a main stream buffer 14, an enhanced stream buffer 15, and a 3D AV decoder 16.

The playback manager 11 provides the request of file to be reproduced (to be read out) to the 3D file controller 12 according to the operation of the user, and the like.

In other words, the playback manager 11 requests the 3D file controller 12 for the request of file for reproducing the content of the 3D image when reproduction of the content of the 3D image is instructed according to the operation of the user, and the like.

The playback manager 11 (directly) provides a request of file to the UDF manager 13 for the request of files other than the file for reproducing the content of the 3D image.

The 3D file controller 12 provides the request of the file and other information for reproducing the content of the 3D image to the UDF manager 13 in response to the request of the file from the playback manager 11.

When the file and information for reproducing the content of the 3D image requested to the UDF manager 13 are provided from the UDF manager 13, the 3D file controller 12 divides the stream stored in the file from the UDF manager 13 into the main stream and the enhanced stream (extent thereof), as hereinafter described, using the information from the UDF manager 13.

The 3D file controller 12 provides the main stream to the main stream buffer 14, and the enhanced stream to the enhanced stream buffer 15.

The UDF manager 13 is a driver of the UDF that is the file system used in the disk 10, which is the BD, and reads out files and information requested from the 3D file controller 12 from the disk 10 and provides the same to the 3D file controller 12.

The UDF manager 13 reads out the file from the disk 10 when the request of the file is made from the playback manger 11, and thus the description will not be repeated here since the process of such file is similar to the process performed in the legacy player.

The main stream buffer 14 temporarily stores the main stream from the 3D file controller 12.

The enhanced stream buffer 15 temporarily stores the enhanced stream from the 3D file controller 12.

The 3D AV decoder 16 reads out the stored main stream from the main stream buffer 14, as necessary, and reads out the stored enhanced stream from the enhanced stream buffer 15, as necessary.

The 3D AV decoder 16 decodes the main stream read out from the main stream buffer 14 and the enhanced stream read out from the enhanced stream buffer 15, and further performs the desired process to obtain the image data (3D stream) for the display of the 3D image, and outputs the same to the display device (not shown). The 3D image is displayed on the display device (not shown) in correspondence to the image data from the 3D AV decoder 16.

[Description of Disk 10]

Figure 4:
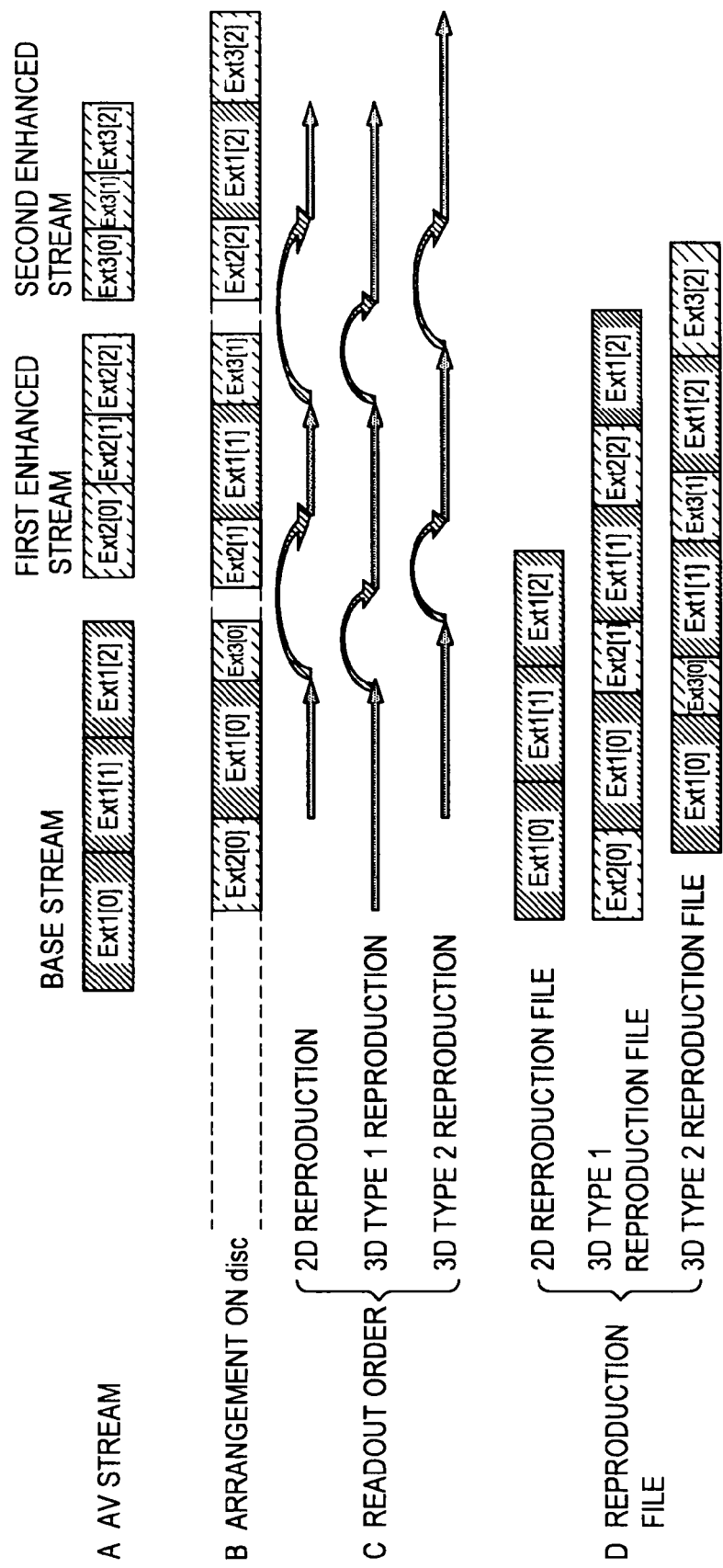
FIG. 4 is a view describing the stream and the file recorded in the disk 10.

FIG. 4 is a view describing the stream and the file related to the 3D image recorded in the disk 10.

The disk 10 is the Blu-Ray (registered trademark) Disk (hereinafter also referred to as BD) such as BD (Blu-Ray (registered trademark)-ROM (Read Only Memory), and the disk 10 records the stream for displaying the stereo image (so-called 3D (Dimension) image) in which the number of view points is two serving as a stereoscopic image that can be stereoscopically viewed.

The reproduction of the 3D image described in the specification can be applied to the reproduction of the stereoscopic image, in which the number of view points is three or more, that can be stereoscopically viewed.

Various methods are proposed for the method of displaying the 3D image (stereo image). The display method type 1 (first display method) and the display method of type 2 (second display method) are herein used for the method of displaying the 3D image.

In the display method of type 1, the data of the 3D image is configured by the data of an image observed with a left eye (hereinafter referred to as left eye image) and the data of an image observed with a right eye (hereinafter referred to as right eye image), and the 3D image is displayed by displaying the left eye image and the right eye image.

In the display method of type 2, the data of the 3D image is configured by the data of the original image, that becomes an origin for generating the 3D image, and the data of parallax for generating the left eye image and the right eye image from the original image by giving a parallax to the original image. The 3D image is displayed by displaying the left eye image and the right eye image generated from the original image.

The disk 10 records the stream (AV (Audio Visual) stream) so that the 3D image can be displayed by display method, type 1 or type 2.

In other words, FIG. 4A shows the AV stream recorded in the disk 10.

The AV stream recorded in the disk 10 includes the base stream, the first enhanced stream, and the second enhanced stream.

The base stream is a stream in which data of one of the left eye image and the right eye image (or image having a middle point of the left eye and the right eye as a view point) is encoded, and is also used when displaying the 3D image with the display method of either type 1 or type 2.

The first enhanced stream is a stream in which the data of the other image, the left eye image or the right eye image, is encoded, and is used when displaying the 3D image with the display method of type 1.

The second enhanced stream is a stream of data of parallax for generating the left eye image and the right eye image by giving parallax to the image serving as the base stream (or stream in which data of parallax is encoded), and is used for displaying the 3D image with the display method of type 2.

H.264 AVC (Advanced Video Coding)/MVC (Multi-view Video coding) and the like can be used for the method of encoding the data.

In H.264 AVC/MVC, the image stream called the Base View and the image stream called the Dependent View are defined.

The predictive coding of having the other stream as a reference image is not permitted in the base view, but the predictive coding of having the base view as a reference image is permitted in the dependent view. Therefore, if the left eye image, of the left eye image and the right eye image, is assumed as the base view and the right eye image as the dependent view, and the base view and the dependent view are encoded, the amount of data of the encoded stream of the dependent view obtained as a result is significantly less than the amount of data of the encoded stream of the base view.

In FIG. 4A, the base stream is the stream in which the base view is encoded with H.264 AVC/MVC.

The first enhanced stream is the stream in which the dependent view is encoded with H.264 AVC/MVC.

As described above, the second enhanced stream is a stream of data of parallax, and has small amount of data, similar to the first enhanced stream that is the encoded stream of the dependent view.

The disk 10 records the above-described base stream, the first enhanced stream, and the second enhanced stream as the AV stream.

If the reproduction of the 3D image is carried out by displaying the 3D image with the display method of type 1, the base stream and the first enhanced stream are read out from the disk 10.

Furthermore, in the display method of type 1, the base stream is provided to and stored in the main stream buffer 14 as a main stream in the 3D file controller 12 (FIG. 3).

The first enhanced stream is provided to and stored in the enhanced stream buffer 15 as an enhanced stream in the 3D file controller 12 (FIG. 3).

The 3D image is displayed with the image obtained from the base stream stored as the main stream in the main stream buffer 14 as the image of either the left eye image or the right eye image, and the image obtained from the first enhanced stream stored as the enhanced stream in the enhanced stream buffer 15 as other image of either the left eye image or the right eye image.

If the reproduction of the 3D image is carried out by displaying the 3D image with the display method of type 2, the base stream and the second enhanced stream are read out from the disk 10.

Furthermore, in the display method of type 2, the base stream is provided to and stored in the main stream buffer 14 as a main stream in the 3D file controller 12 (FIG. 3).

The second enhanced stream is provided to and stored in the enhanced stream buffer 15 as an enhanced stream in the 3D file controller 12 (FIG. 3).

The 3D image is displayed by giving parallax, obtained from the second enhanced stream stored as the enhanced stream in the enhanced stream buffer 15, to the image obtained from the base stream stored as the main stream in the main stream buffer 14 to generate the left eye image and the right eye image, and displaying the left eye image and the right eye image.

The reproduction of the 3D image (3D reproduction) by displaying the 3D image with the display method of type 1 is hereinafter also referred to as 3D type 1 reproduction. Similarly, the reproduction of the 3D image by displaying the 3D image with the display method of type 2 is hereinafter also referred to as 3D type 2 reproduction.

According to the disk 10, in addition to the 3D reproduction as described above, only the base stream may be read out from the disk 10, and the 2D reproduction of displaying the two-dimensional image (2D image) (e.g., left eye image herein) may be performed by such base stream.

For instance, the 2D reproduction is performed when the reproduction device used in the reproduction of the disk 10 is the legacy player not compatible to the 3D reproduction. In other words, in the legacy player, only the base stream is read out from the disk 10, and the 2D image is displayed by the base stream. The disk 10 thus can be reproduced in both the legacy player and the 3D compatible player compatible to the 3D reproduction.

In the 3D compatible player, whether to perform the 3D type 1 reproduction or the 3D type 2 reproduction can be determined in advance, or may be determined according to the operation of the user etc.

In the 3D reproduction, the base stream and the first enhanced stream are read out from the base 10, or the base stream and the second enhanced stream are read out as described above.

For instance, if two streams, the base stream and the first enhanced stream, are read out from the disk 10, the readout rate of the stream from the disk 10 is limited by seek and the like, and thus the readout of the base stream and the first enhanced stream may not make it in time for the reproduction (display) of the 3D image when the base stream and the first enhanced stream are not appropriately recorded in the disk 10. This is the same when reading out two streams, the base stream and the second enhanced stream.

As shown in FIG. 4A, the base stream, the first enhanced stream, and the second enhanced stream recorded in the disk 10 are all divided into segments called extent, which is a unit read out continuously.

In FIG. 4A, the base stream is divided into extents Ext1[0], Ext1[1], Ext1[2] in order from the front. The first enhanced stream is divided into extents Ext2[0], Ext2[1], Ext2[2] in order from the front. Furthermore, the second enhanced stream is divided into extents Ext3[0], Ext3[1], Ext3[2] in order from the front.

Each extent of the base stream, the first enhanced stream, and the second enhanced stream is lined (interleaved) to an interleaved arrangement. The interleaved data obtained as a result is recorded in the disk 10 so as to be physically continuous (as much as possible).

With respect to three types of streams, the base stream, the first enhanced stream, and the second enhanced stream, the interleaved arrangement means a periodic arrangement in which the extent of the same type of stream is not adjacent to each other.

FIG. 4B shows the interleaved data recorded in the disk 10.

In the interleaved data of FIG. 4B, each extent of the base stream, the first enhanced stream, and the second enhanced stream is arranged in the order of the extents Ext2[0], Ext1[0], Ext3[0], the extents Ext2[1], Ext1[1], Ext3[1], and the extents Ext2[2], Ext1[2], Ext3[2].

The division of the base stream, the first enhanced stream, and the second enhanced stream into the extent is carried out so that the data for the same reproduction time of the 3D reproduction is one extent.

In other words, to simplify the explanation, assuming the time that divides the reproduction time of the entire content of the image corresponding to the base stream into three is represented with t1, t2 in time-series order with the start time of the reproduction as 0, the data of the base stream for the reproduction time from the start time of the reproduction to time t1 is divided into extent Ext1[0].

Furthermore, the data of the base stream for the reproduction time from time t1 to time t2 is divided into extent Ext1[1], and the data of the base stream for the reproduction time from time t2 to end time of the reproduction is divided into extent Ext1[2].

With respect to the first enhanced stream as well, the data of the first enhanced stream for the reproduction time from the start time of the reproduction to time t1 is divided into extent Ext2[0].

Furthermore, the data of the first enhanced stream for the reproduction time from time t1 to time t2 is divided into extent Ext2[1], and the data of the first enhanced stream for the reproduction time from time t2 to end time of the reproduction is divided into extent Ext2[2].

The second enhanced stream is similarly divided into the extents Ext3[0], Ext3[1], and Ext3[2].

The extent of the base stream is also described as extent Ext1, as appropriate. Similarly, the extent of the first enhanced stream is also described as extent Ext2, as appropriate, and the extent of the second enhanced stream is also described as extent Ext3, as appropriate.

In the interleaving of the extent, the extents of the base stream, the first enhanced stream, and the second enhanced stream are arranged to interleaved arrangement as below.

In other words, the base stream is the essential stream (essential stream) necessary for all types of reproduction, the 2D reproduction, the 3D type 1 reproduction, and the 3D type 2 reproduction.

The first enhanced stream is a selective stream (selective stream) that is not necessary for the 2D reproduction and the 3D type 2 reproduction, but is necessary for the 3D type 1 reproduction. Similarly, the second enhanced stream is a selective stream that is not necessary for the 2D reproduction and the 3D type 1 reproduction, but is necessary for the 3D type 2 reproduction.

In the interleaving of the extents, the extents are arranged such that the extents of the selective stream (first enhanced stream and second enhanced stream herein) are adjacent to the extent of the essential stream (base stream herein).

In other words, the extent Ext2 of the first enhanced stream, and the extent Ext3 of the second enhanced stream, which are the selective streams, are both arranged to be adjacent to the extent Ext1 of the base stream, which is the essential stream.

In FIG. 4B, the extent Ext2 of the first enhanced stream is arranged to be adjacent to the left side (front side) (position side read out first) of the extent Ext1 of the base stream in the figure. The extent Ext3 of the second enhanced stream is arranged to be adjacent to the right side (back side) (position side read out after) of the extent Ext1 of the base stream in the figure.

In other words, the three types of extents, the extent Ext1 of the base stream, the extent Ext2 of the first enhanced stream, and the extent Ext3 of the second enhanced stream, may be arranged so as to continuously line in the order of the extents Ext2, Ext1, Ext3 with the three types of extents forming one set of extents (hereinafter also referred to as extent set).

In FIG. 4B, the extent set is recorded in the disk 10 so that a small gap is formed between the adjacent extent sets, but the extent set may be recorded in the disk 10 so that the gap is not formed between the adjacent extent sets.

In FIG. 4B, the extent Ext1 of the base stream, the extent Ext2 of the first enhanced stream, and the extent Ext3 of the second enhanced stream configuring the one extent set are extents reproduced on the same reproduction time.

In other words, the $k+1^{th}$ extent Ext1[k] from the head of the base stream, the $k+1^{th}$ extent Ext2[k] from the head of the first enhanced stream, and the $k+1^{th}$ extent Ext3[k] from the head of the second enhanced stream are extents reproduced on the same reproduction time, but such extents Ext1[k], Ext2[k], and Ext3[k] configure the one extent set in FIG. 4B.

Therefore, the two streams, the base stream and the first enhanced stream, or the two streams (extent thereof), the base stream and the second enhanced stream, can be rapidly read out from the disk 10 in time for the reproduction at the time of the 3D reproduction by recording the extents in the disk 10 in the interleaved arrangement.

In other words, FIG. 4C is a view describing the readout of the extents from the disk 10.

When performing the 2D reproduction, the extent Ext1 of only the base stream, of the base stream, the first enhanced stream, and the second enhanced stream, is read out from the disk 10.

When performing the 3D type 1 reproduction, the extent Ext1 of the base stream and the extent Ext2 of the first enhanced stream, of the base stream, the first enhanced stream, and the second enhanced stream, are read out from the disk 10.

As described above, in the extent set, the extent Ext1 of the base stream and the extent Ext2 of the first enhanced stream are adjacently (continuously) recorded, and thus the extents Ext1 and Ext2 in the extent set can be read out without seek, that is, rapidly read out. Therefore, the extent can be read out in time for the reproduction of the 3D image, and the content of the 3D image can be appropriately reproduced.

When performing the 3D type 2 reproduction, the extent Ext1 of the base stream and the extent Ext3 of the second enhanced stream, of the base stream, the first enhanced stream, and the second enhanced stream, are read out from the disk 10.

As described above, in the extent set, the extent Ext1 of the base stream and the extent Ext3 of the second enhanced stream are adjacently recorded, and thus the extents Ext1 and Ext3 in the extent set can also be rapidly read out without seek, similar to the extents Ext1 and Ext2. Therefore, the extent can be read out in time for the reproduction of the 3D image, and the content of the 3D image can be appropriately reproduced.

FIG. 4D shows a file recorded in the disk 10 when recording the interleaved data in which the extents are interleaved in the disk 10 as described above.

The 2D reproduction file, the 3D type 1 reproduction file, and the 3D type 2 reproduction file are recorded in the disk 10.

The 2D reproduction file is a file (base file), in which the base stream is stored, read out at the time of the 2D reproduction. The extent Ext1 of the base stream for the 2D reproduction is stored in the 2D reproduction file in the order of Ext1[0], Ext1[1], Ext1[2], which is the reproducing order.

The 3D type 1 reproduction file is a file (virtual extent file), in which the virtual extent, to be described later, is stored, read out at the time of the 3D type 1 reproduction. The extent Ext1 of the base stream and the extent Ext2 of the first enhanced stream for the 3D type 1 reproduction are stored in the 3D type 1 reproduction file in the order of the set of Ext2[0] and Ext1[0], the set of Ext2[1] and Ext1[1], and the set of Ext2[2] and Ext1[2], which is the reproducing order.

The 3D type 2 reproduction file is a virtual extent file, in which the virtual extent, to be described later, is stored, read out at the time of the 3D type 2 reproduction. The extent Ext1 of the base stream and the extent Ext3 of the second enhanced stream for the 3D type 2 reproduction are stored in the 3D type 2 reproduction file in the order of the set of Ext1[0] and Ext3[0], the set of Ext1[1] and Ext3[1], and the set of Ext1[2] and Ext3[2], which is the reproducing order.

Therefore, the extent Ext1 of the base stream is the configuring component of all three files of the 2D reproduction file, the 3D type 1 reproduction file, and the 3D type 2 reproduction file, and is shared by the three files.

The extent Ext2 of the first enhanced stream is the configuring component of the 3D type 1 reproduction file, but is not the configuring component of the 2D reproduction file and the 3D type 2 reproduction file.

Similarly, the extent Ext3 of the second enhanced stream is the configuring component of the 3D type 2 reproduction file, but is not the configuring component of the 2D reproduction file and the 3D type 1 reproduction file.

Figure 5:
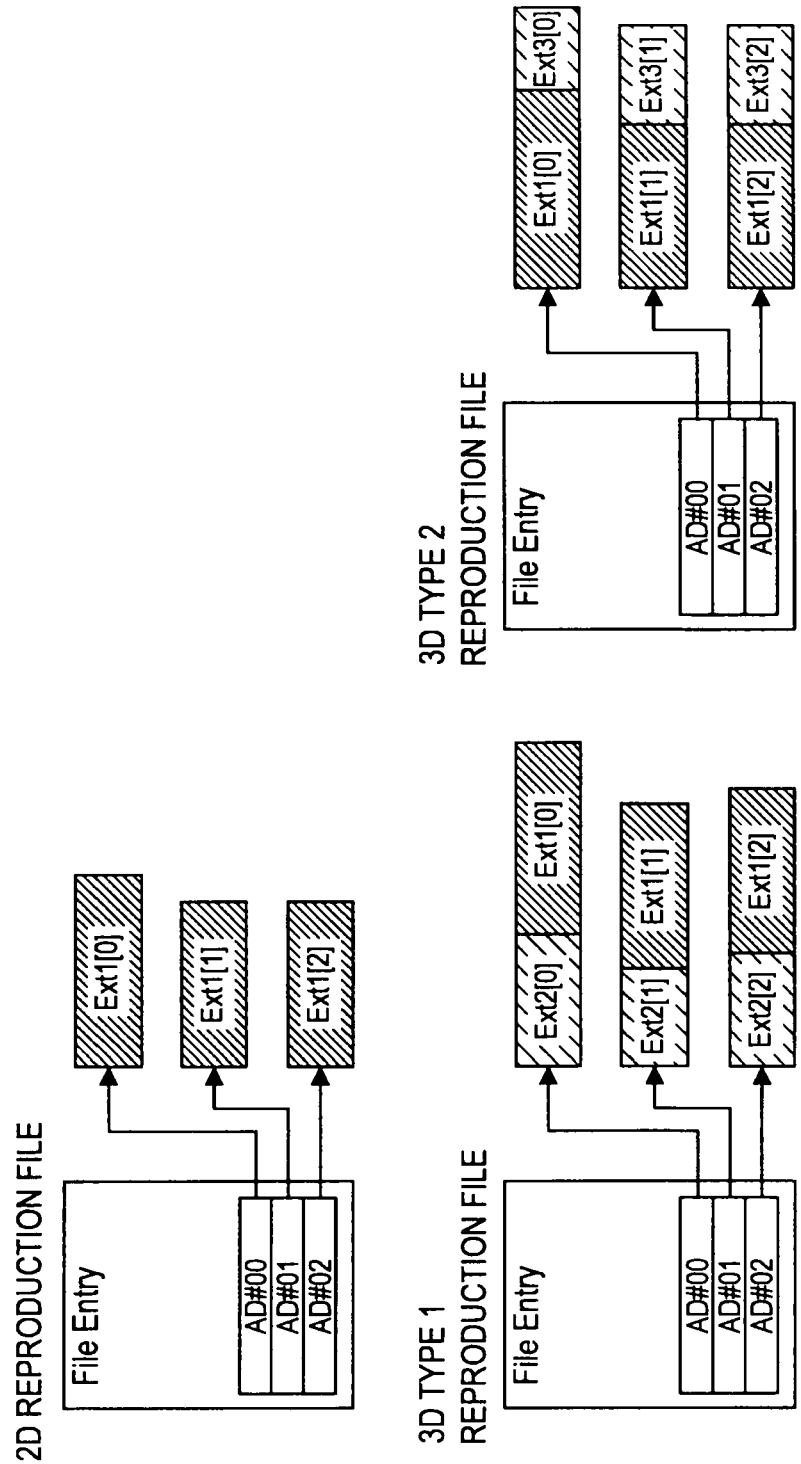
FIG. 5 is a view describing the management of the file on the disk 10 by the file system.

FIG. 5 is a view describing the management of the file on the disk 10 by the file system (driver).

As described in FIG. 4, the data (extent) recorded in the disk 10 is sometimes shared by a plurality of files. Thus, a file system capable of sharing the data recorded in the disk 10 among a plurality of files is to be adopted for the file system for managing the files on the disk 10. Such file system includes a UDF (Universal Disk Format) complying with the standard of ECMA (European Computer Manufacturer Association) 167.

In the file system, a File Entry serving as one of the file information related to the file such as the file name of the file on the disk 10, and the positional information representing the position of the data (extent herein) that becomes the configuring component configuring the file on the disk 10, and the like is managed (generated, stored, etc.).

FIG. 5 shows the file entry of the 2D reproduction file, the 3D type 1 reproduction file, and the 3D type 2 reproduction file.

In the file entry of the 2D reproduction file, the positional information AD (Allocation Descriptor) #00, AD#01, and AD#02 of the respective extent Ext1[0], Ext1[1], and Ext1[2], which are the configuring components of the 2D reproduction file, are registered.

The positional information of the extent includes a head address (Extent Position) (e.g., logical sector number etc.) of the position on the disk 10 where the relevant extent is recorded, and the size (Extent Length) of the relevant extent.

In the file entry of the 3D type 1 reproduction file, the positional information of the relevant virtual extent is registered with the set of the extent Ext1 of the base stream and the extent Ext2 of the first enhanced stream, which are configuring components of the 3D type 1 reproduction file and are (physically) continuously recorded in the disk 10, as one virtual extent (hereinafter also referred to as virtual extent).

In other words, the positional information AD#00 of the virtual extent that is the set of the extents Ext2[0] and Ext1[0], the positional information AD#01 of the virtual extent that is the set of the extents Ext2[1] and Ext1[1], and the positional information AD#02 of the virtual extent that is the set of the extents Ext2[2] and Ext1[2] are registered in the file entry of the 3D type 1 reproduction file.

In the file entry of the 3D type 2 reproduction file, the positional information of the relevant virtual extent is registered with the set of the extent Ext1 of the base stream and the extent Ext3 of the second enhanced stream, which are configuring components of the 3D type 2 reproduction file and are continuously recorded in the disk 10, as one virtual extent.

In other words, the positional information AD#00 of the virtual extent that is the set of the extents Ext1[0] and Ext3[0], the positional information AD#01 of the virtual extent that is the set of the extents Ext1[1] and Ext3[1], and the positional information AD#02 of the virtual extent that is the set of the extents Ext1[2] and Ext3[2] are registered in the file entry of the 3D type 2 reproduction file.

Figure 6:
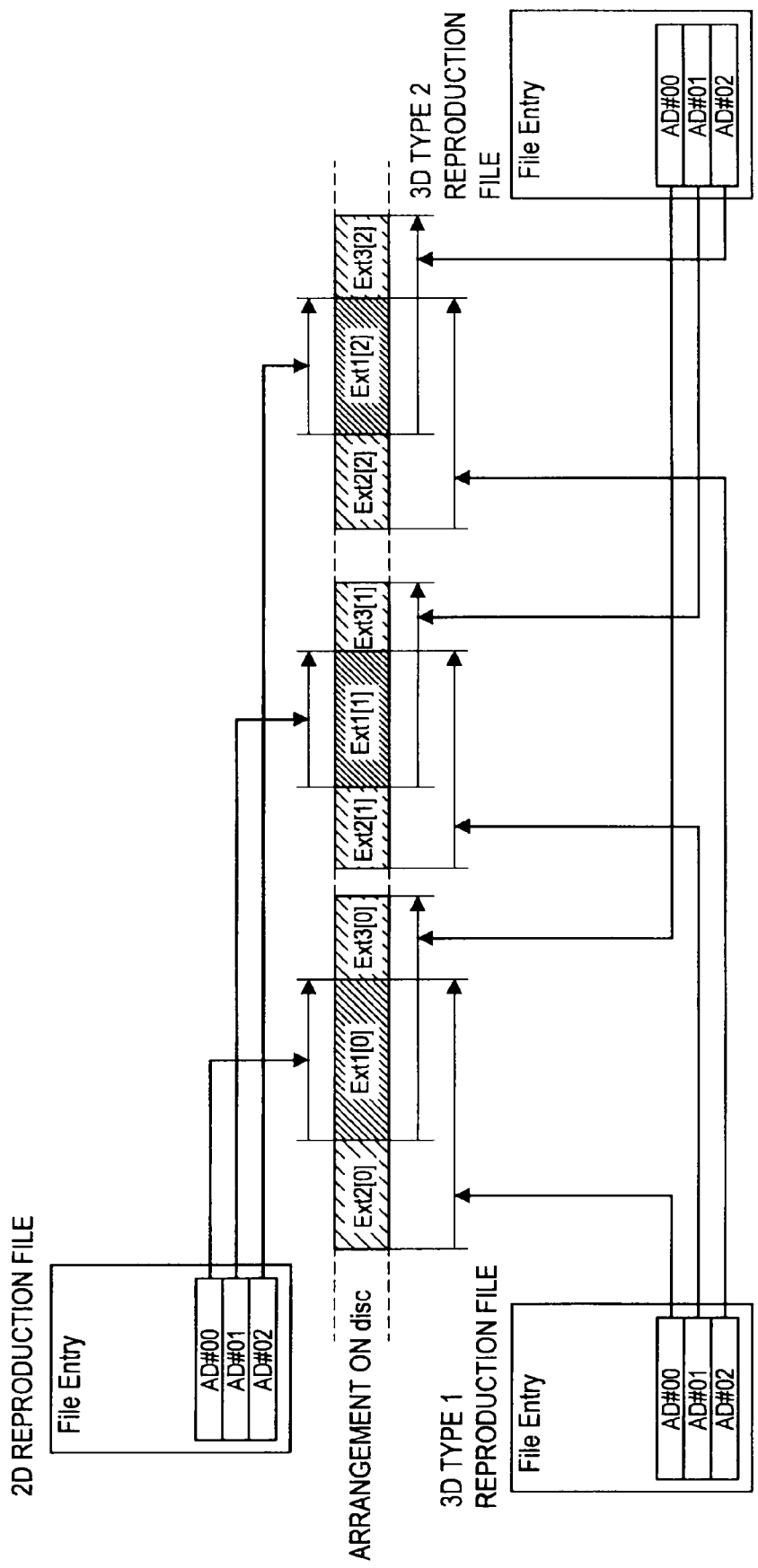
FIG. 6 is a view describing the read out of the extent from the disk 10 by the file system.

FIG. 6 is a view describing the readout process in which the file system reads out the extent (virtual extent) with reference to the file entry, and provides the same to the outside.

For instance, when the application (hereinafter also referred to as reproducing application) for performing the reproduction such as the playback manager 11 and the 3D file controller 12 of FIG. 3 requests for readout of the 2D reproduction file with respect to the file system (UDF manager 13 of FIG. 3), the file system references the file entry of the 2D reproduction file, reads out the extents Ext1[0], Ext1[1], Ext1[2] from the disk 10, and provides the same.

Since the extents Ext1[0], Ext1[1], Ext1[2] read out from the disk 10 are extents of the base stream, and thus the reproducing application can perform the 2D reproduction using such extents Ext1[0], Ext1[1], Ext1[2] of the base stream.

When the reproducing application requests for readout of the 3D type 1 reproduction file with respect to the file system, the file system references the file entry of the 3D type 1 reproduction file, reads out the virtual extent that is the set of the extents Ext2[0] and Ext1[0], the virtual extent that is the set of the extents Ext2[1] and Ext1[1], and the virtual extent that is the set of the extents Ext2[2] and Ext1[2] from the disk 10, and provides the same.

The extents Ext1[0], Ext1[1], Ext1[2] of the virtual extent that is the set of the extents Ext2[0] and Ext1[0], the virtual extent that is the set of the extents Ext2[1] and Ext1[1], and the virtual extent that is the set of the extents Ext2[2] and Ext1[2] read out from the disk 10 are extents of the base stream, and the remaining extents Ext2[0], Ext2[1], and Ext2[2] are the extents of the first enhanced stream.

Therefore, the reproducing application can perform the 3D type 1 reproduction using the extents Ext1[0], Ext1[1], and Ext1[2] of the base stream and the extents Ext2[0], Ext2[1], and Ext2[2] of the first enhanced stream read out from the disk 10.

Furthermore, when the reproducing application requests for readout of the 3D type 2 reproduction file with respect to the file system, the file system references the file entry of the 3D type 2 reproduction file, reads out the virtual extent that is the set of the extents Ext1[0] and Ext3[0], the virtual extent that is the set of the extents Ext1[1] and Ext3[1], and the virtual extent that is the set of the extents Ext1[2] and Ext3[2] from the disk 10, and provides the same.

The extents Ext1[0], Ext1[1], Ext1[2] of the virtual extent that is the set of the extents Ext1[0] and Ext3[0], the virtual extent that is the set of the extents Ext1[1] and Ext3[1], and the virtual extent that is the set of the extents Ext1[2] and Ext3[2] read out from the disk 10 are extents of the base stream, and the remaining extents Ext3[0], Ext3[1], and Ext3[2] are the extents of the second enhanced stream.

Therefore, the reproducing application can perform the 3D type 2 reproduction using the extents Ext1[0], Ext1[1], and Ext1[2] of the base stream and the extents Ext3[0], Ext3[1], and Ext3[2] of the second enhanced stream read out from the disk 10.

As described above, when the reproducing application requests for readout of the 3D type 1 reproduction file with respect to the file system, the file system references the file entry of the 3D type 1 reproduction file to read out the virtual extent that is the set of the extents Ext2[0] and Ext1[0], the virtual extent that is the set of the extents Ext2[1] and Ext1[1], and the virtual extent that is the set of the extents Ext2[2] and Ext1[2] from the disk 10.

When performing the 3D type 1 reproduction, the base stream and the first enhanced stream are to be respectively decrypted. Thus, when performing the 3D type 1 reproduction, the virtual extent read out from the disk 10 is to be divided into the extent Ext2 of the first enhanced stream and the extent Ext1 of the base stream.

This is similar when performing the 3D type 2 reproduction, and when performing the 3D type 2 reproduction, the virtual extent read out from the disk 10 is to be divided into the extent Ext1 of the base stream and the extent Ext3 of the second enhanced stream.

Figure 7:
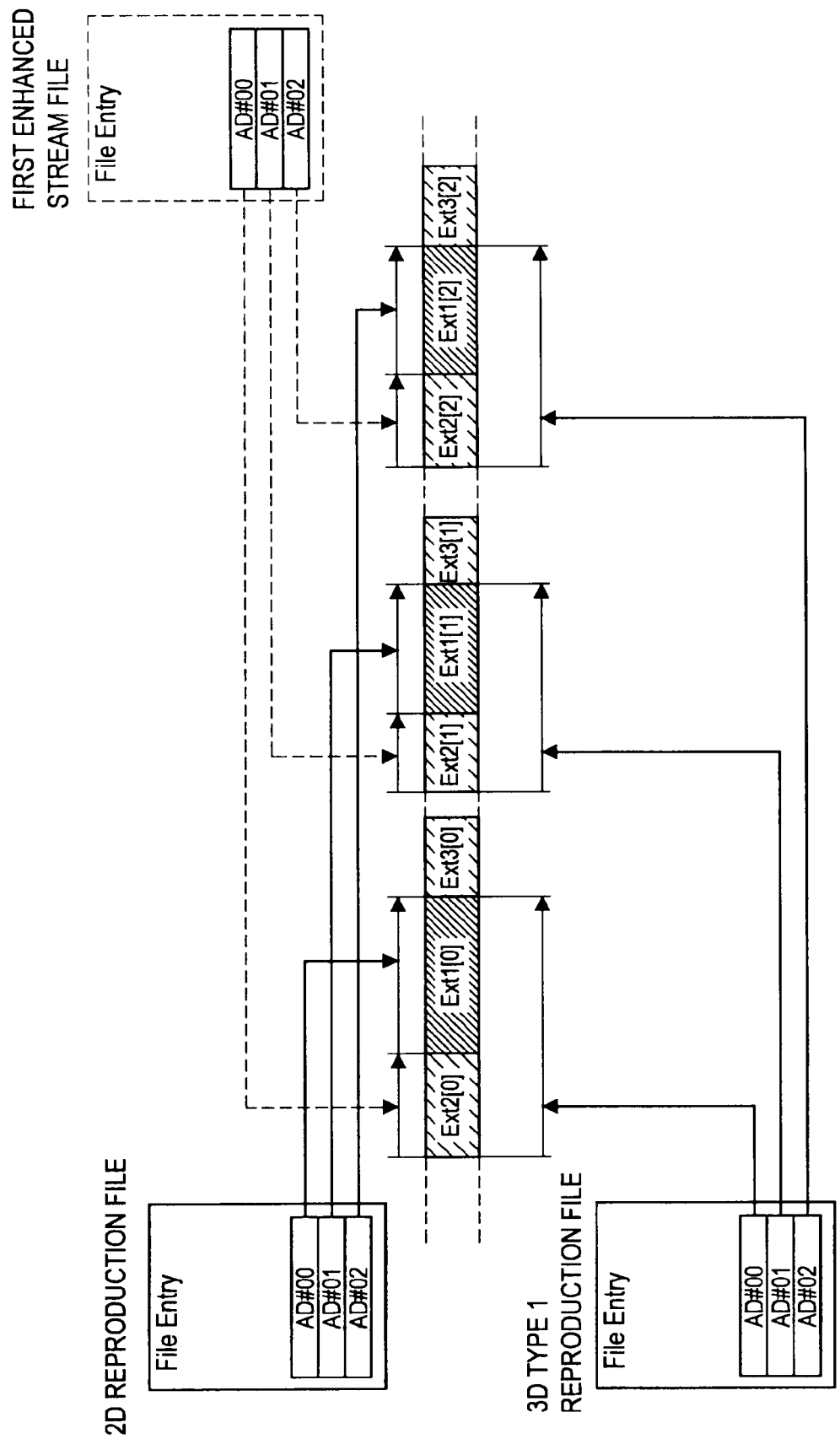
FIG. 7 is a view describing a method of dividing the virtual extent read out from the 3D type 1 reproduction file into the extent Ext 2 of the first enhanced stream and the extent Ext1 of the base stream.

FIG. 7 is a view describing a method of dividing the virtual extent read out from the 3D type 1 reproduction file into the extent Ext 2 of the first enhanced stream and the extent Ext1 of the base stream.

As described above, the file system references the file entry of the 3D type 1 reproduction file to read out the virtual extent that is the set of the extent Ext 2 of the first enhanced stream and the extent Ext 1 of the base stream (the virtual extent that is the set of the extents Ext2[0] and Ext1[0], the virtual extent that is the set of the extents Ext2[1] and Ext1[1], and the virtual extent that is the set of the extents Ext2[2] and Ext1[2]) from the disk 10.

The file system manages the file entry of the 2D reproduction file, where the address and the size of the extent serving as the positional information AD#00, AD#01, and AD#02 of the extent Ext1 (extents Ext1[0], Ext1[1], Ext1[2]) of the base stream are registered in such file entry.

Therefore, the size of the extent Ext1 of the base stream can be recognized from the file entry of the 2D reproduction file. The boundary between the extents Ext2 and Ext1 in the virtual extent that is the set of the extent Ext2 of the first enhanced stream and the extent Ext1 of the base stream then can be recognized from the size of the extent Ext1.

Therefore, the virtual extent (hereinafter also referred to as 3D type 1 virtual extent) that is the set of the extent Ext2 of the first enhanced stream and the extent Ext1 of the base stream can be divided into the extent Ext2 of the first enhanced stream and the extent Ext1 of the base stream with reference to the file entry of the 2D reproduction file.

Similarly, the virtual extent (hereinafter also referred to as 3D type 2 virtual extent) that is the set of the extent Ext1 of the base stream and the extent Ext3 of the second enhanced stream read out from the 3D type 2 reproduction file can also be divided into the extent Ext1 of the base stream and the extent Ext3 of the second enhanced stream with reference to the file entry of the 2D reproduction file.

In FIG. 7, the 3D type 1 virtual extent read out from the 3D type 1 reproduction file is divided into the extents Ext2 and Ext1 with reference to the file entry of the 2D reproduction file, but the 3D type 1 virtual extent may be divided into the extents Ext2 and Ext1 by recording the file of the first enhanced stream in the disk 10, and referencing the file entry of the file of the first enhanced stream.

In other words, in FIG. 4D, three files, the 2D reproduction file, the 3D type 1 reproduction file, and the 3D type 2 reproduction file, are recorded in the disk 10, but the file of the first enhanced stream may be further recorded in the disk 10.

The file of the first enhanced stream (first enhanced stream file) is a file in which the extent Ext2 of the first enhanced stream is stored in the order of Ext2[0], Ext2[1], and Ext2[2], which is the reproducing order.

Therefore, the positional information AD#00, AD#01, and AD#02 of the extents Ext2[0], Ext2[1], Ext2[2] that is the configuring components of the first enhanced stream file are registered in the file entry of the first enhanced stream file, as shown with a dotted line in FIG. 7.

Similar to when referencing the file entry of the 2D reproduction file, the boundary between the extents Ext2 and Ext1 in the 3D type 1 virtual extent (virtual extent that is the set of the extent Ext2 of the first enhanced stream and the extent Ext1 of the base stream) can be recognized by referencing the file entry of the first enhanced stream file.

Therefore, the 3D type 1 virtual extent can be divided into the extent Ext2 of the first enhanced stream and the extent Ext1 of the base stream with reference to the file entry of the first enhanced stream file.

Similarly, the 3D type 2 virtual extent read out from the 3D type 2 reproduction file can be divided into the extent Ext1 of the base stream and the extent Ext3 of the second enhanced stream by recording second enhanced stream file, which is a file where the extent Ext3 of the second enhanced stream is stored in the order of Ext3[0], Ext3[1], Ext3[2] that is the reproducing order, in the disk 10, and referencing the file entry of the second enhanced stream file.

When performing the 3D type 1 reproduction, specification of the positional information of the file entry of the 2D reproduction file in which the $k+1^{th}$ virtual extent read out from the 3D type 1 reproduction file, that is, the virtual extent that is the set of the extent Ext2[k] of the first enhanced stream and the extent Ext1[k] of the base stream is used (referenced) to divide into the extent Ext2[k] of the first enhanced stream and the extent Ext1[k] of the base stream, becomes an issue.

The position of the $k+1^{th}$ virtual extent of the 3D type 1 reproduction file is represented by the $k+1^{th}$ positional information AD#0$k$ of the file entry of the 3D type 1 reproduction file.

When the $k+1^{th}$ virtual extent is configured by the extent Ext2[k] of the first enhanced stream and the extent Ext1[k] of the base stream reproduced at the same time, the position of the extent Ext1[k] of the base stream configuring the k+1 virtual extent is represented by the $k+1^{th}$ positional information AD#0$k$ of the file entry of the 2D reproduction file.

Therefore, the $k+1^{th}$ virtual extent read out according to the $k+1^{th}$ positional information AD#0$k$ of the file entry of the 3D type 1 reproduction file can be divided into the extent Ext2[k] of the first enhanced stream and the extent Ext1[k] of the base stream with reference to the positional information of the same order of the file entry of the 2D reproduction file, that is, the $k+1^{th}$ positional information AD#0$k$.

When referencing the file entry of the first enhanced stream file, as shown with a dotted line in FIG. 7, instead of the file entry of the 2D reproduction file to divide the $k+1^{th}$ virtual extent into the extent Ext2[k] of the first enhanced stream and the extent Ext1[k] of the base stream, the $k+1^{th}$ positional information AD#0$k$ is none the less referenced.

When performing the 3D type 2 reproduction as well, the virtual extent that is the set of the extent Ext1[k] of the base stream and the extent Ext3[k] of the second enhanced stream read out according to the $k+1^{th}$ positional information AD#0$k$ of the file entry of the 3D type 2 reproduction file can be divided into the extent Ext1[k] of the base stream and the extent Ext3[k] of the second enhanced stream with reference to the $k+1^{th}$ positional information AD#0$k$ that is the positional information of the same order of the file entry of the 2D reproduction file (or file of the second enhanced stream).

Furthermore, since the extent Ext1 of the base stream exists in a state pushed to the front side (position side read out first) or the back side (position side read out later) of the virtual extent in the virtual extent, the specification of the positional information of the file entry of the 2D reproduction file of when dividing the virtual extent into the extent Ext1 of the base stream, and the extent Ext2 of the first enhanced stream or the extent Ext3 of the second enhanced stream is carried out in the following manner.

In other words, when performing the 3D type 1 reproduction, the extents are lined in the order of the extent Ext2[k] of the first enhanced stream and the extent Ext1[k] of the base stream in the $k+1^{th}$ virtual extent read out according to the $k+1^{th}$ positional information AD#0$k$ of the file entry of the 3D type 1 reproduction file.

In the $k+1^{th}$ virtual extent, the boundary between the extent Ext2[k] of the first enhanced stream and the extent Ext1[k] of the base stream exists between the start address As represented by the $k+1^{th}$ positional information AD#0$k$ of the file entry of the 3D type 1 reproduction file and the address Ae=As+S obtained by adding the size S represented by the positional information AD#0$k$ thereof to the start address As.

Therefore, in the file entry of the 2D reproduction file, the positional information AD in which the start address is a value in a range between the address As and the address Ae is the positional information to be referenced when dividing the $k+1^{th}$ virtual extent into the extent Ext2[k] of the first enhanced stream and the extent Ext1[k] of the base stream.

When referencing the file entry of the first enhanced stream file to divide the $k+1^{th}$ virtual extent into the extent Ext2[k] of the first enhanced stream and the extent Ext1[k] of the base stream, the positional information in which the start address matches the start address As represented by the $k+1^{th}$ positional information AD#0$k$ of the file entry of the 3D type 1 reproduction file of the positional information of the relevant file entry becomes the positional information to be referenced.

Similarly, when the 3D type 2 reproduction is performed, the positional information to be referenced when dividing the $k+1^{th}$ virtual extent in which the extents are lined in the order of the extent Ext1[k] of the base stream and the extent Ext3[k] of the second enhanced stream read out according to the $k+1^{th}$ positional information AD#0$k$ of the file entry of the 3D type 2 reproduction file into the extent Ext1[k] of the base stream and the extent Ext3[k] of the second enhanced stream is as follows.

In other words, when referencing the file entry of the 2D reproduction file, the positional information in which the start address matches the start address As represented by the $k+1^{th}$ positional information AD#0$k$ of the file entry of the 3D type 2 reproduction file of the positional information of the relevant file entry becomes the positional information to be referenced.

When referencing the file entry of the file of the second enhanced stream, the positional information in which the start address is a value in a range from the start address As represented by the $k+1^{th}$ positional information AD#0$k$ of the file entry of the 3D type 2 reproduction file to the address Ae=As+S obtained by adding the size S represented by the positional information AD#0$k$ thereof to the start address As of the positional information of the relevant file entry becomes the positional information to be referenced.

In the interleaving of the extents described in FIG. 4B, one extent set is configured by the k+1$^{th}$ extent Ext1[k] from the head of the base stream, the k+1$^{th}$ extent Ext2[k] from the head of the first enhanced stream, and the k+1$^{th}$ extent Ext3[k] from the head of the second enhanced stream, but the configuration of one extent set is not limited thereto.

In other words, in the interleaving of the extents described in FIG. 4B, one extent set is configured by the k+1$^{th}$ extents Ext1[k], Ext2[k], and Ext3[k] reproduced (can be reproduced) at the same reproduction time, but one extent set can be configured by extents reproduced at different reproduction times.

Specifically, the k+1$^{th}$ extent Ext2[k] from the head of the first enhanced stream, the k+1$^{th}$ extent Ext1[k] from the head of the base stream, and the k+2$^{th}$ extent Ext3[k] from the head of the second enhanced stream may be lined in such order to form one extent set.

In the embodiment described in FIGS. 4 to 7, a maximum of seven files can be recorded in the disk 10 for the base stream, the first enhanced stream, and the second enhanced stream.

In other words, the 2D reproduction file, the 3D type 1 reproduction file, the 3D type 2 reproduction file described in FIG. 4, the first enhanced stream file, the second enhanced stream file, a file (hereinafter also referred to as type 1 base file) in which the sequence of the extent Ext1 of the base stream in the 3D type 1 virtual extent stored in the 3D type 1 reproduction file is stored, and a file (hereinafter also referred to as type 2 base file) in which the sequence of the extent Ext1 of the base stream in the 3D type 2 virtual extent stored in the 3D type 2 reproduction file is stored described in FIG. 7 can be recorded in the disk 10.

The entities of the 2D reproduction file, the type 1 base file, and the type 2 base file are all sequence of the extent Ext1 of the base stream, and thus the entities (contents) of the type 1 base file and the type 2 base file are all the same as the base file.

The 2D reproduction file can be considered as an associated file associated with the 2D reproduction. The 3D type 1 reproduction file, the first enhanced stream file, and the type 1 base file can be considered as associated files associated with the 3D type 1 reproduction. Furthermore, the 3D type 2 reproduction file, the second enhanced stream file, and the type 2 base file can be considered as associated files associated with the 3D type 2 reproduction.

When performing the 3D type 1 reproduction, the virtual extent stored in the 3D type 1 reproduction file is read out by the file entries of the 3D type 1 reproduction file and the first enhanced stream file or the file entries of the 3D type 1 reproduction file and the type 1 base file of the 3D type 1 reproduction file, the first enhanced stream file, and the type 1 base file, which are associated files of the 3D type 1 reproduction, and the relevant virtual extent can be divided into the extent Ext2 of the first enhanced stream and the extent Ext1 of the base stream.

Similarly, when performing the 3D type 2 reproduction, the virtual extent stored in the 3D type 2 reproduction file is read out by the file entries of the 3D type 2 reproduction file and the second enhanced stream file or the file entries of the 3D type 2 reproduction file and the type 2 base file of the 3D type 2 reproduction file, the second enhanced stream file, and the type 2 base file, which are associated files of the 3D type 2 reproduction, and the relevant virtual extent can be divided into the extent Ext3 of the second enhanced stream and the extent Ext1 of the base stream.

[3D File Controller 12]

Figure 8:
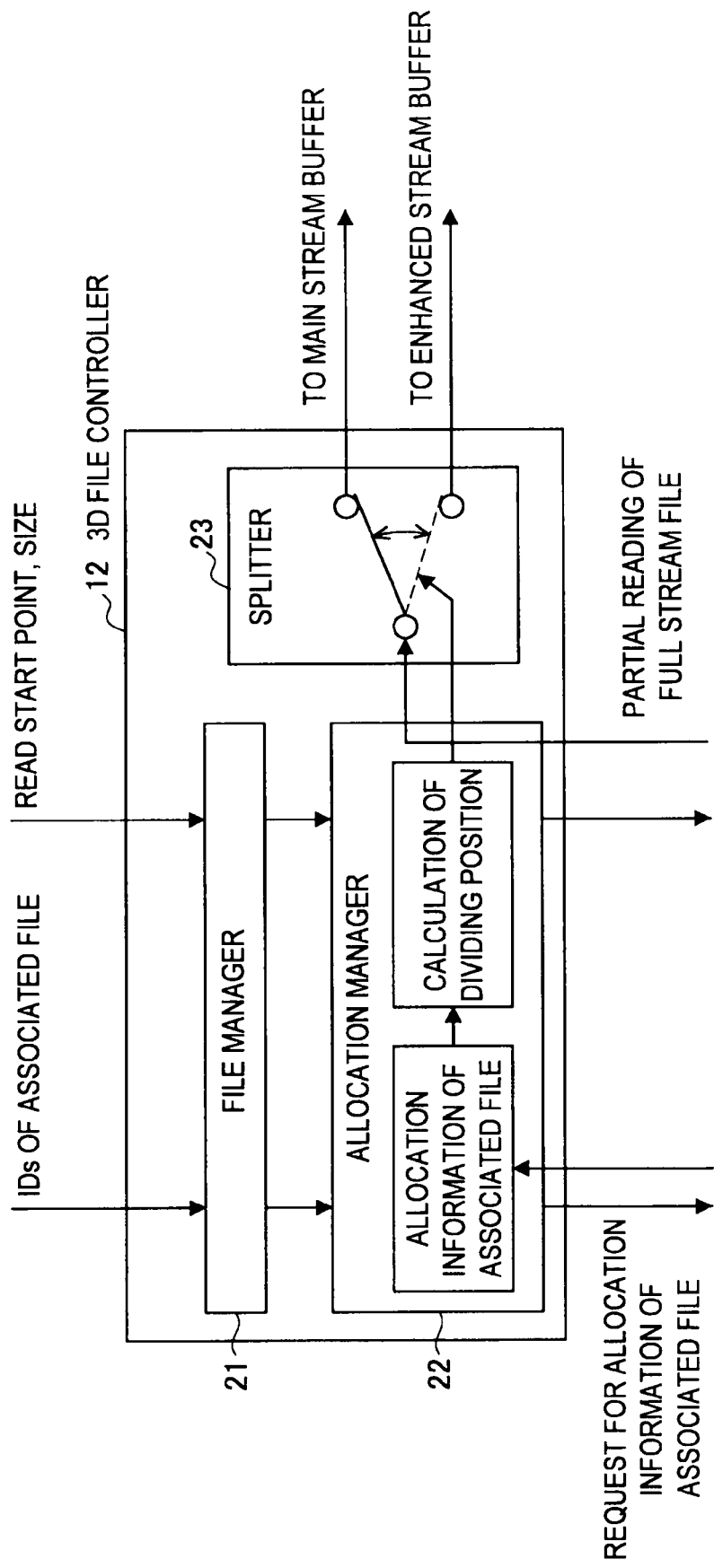
FIG. 8 is a block diagram showing a configuration example of the 3D file controller 12.

FIG. 8 is a block diagram showing a configuration example of the 3D file controller 12 of FIG. 3.

The 3D file controller 12 functions as a reproduction control unit for dividing the virtual extent into the extent Ext1 of the base stream and the extent of the enhanced stream by obtaining the dividing position, at where the virtual extent of the virtual extent file (3D type 1 reproduction file or 3D type 2 reproduction file) read out from the disk 10 is divided into the extent Ext1 of the base stream and the extent of the enhanced stream (extent Ext2 of the first enhanced stream or extent Ext3 of the second enhanced stream) from the file entry of the base file and the virtual extent file, and dividing the virtual extent at the dividing position.

In other words, the 3D file controller 12 is configured by a file manager 21, an allocation manager 22, and a splitter 23.

For instance, when performing the 3D type 1 reproduction, the file manager 21 receives the ID (Identification) etc. serving as information for specifying the 3D type 1 reproduction file, the first enhanced stream file, and the type 1 base file, which are associated files of 3D type 1 reproduction, the start point (read start point) of starting the reading from the disk 10 of the base stream (base stream stored in the type 1 base file) used in the 3D type 1 reproduction, and the size (reading size) of the base stream to be read from the disk 10 from the playback manager 11 (FIG. 3) along with the request for readout of the file.

For example, the read start point may be a number SPN (Source Packet Number) of the source packet of the base stream, in which case, the number of packets of the source packet is used for the reading size.

The read start point may be a number AUN (Aligned Unit Number) of the aligned unit of the base stream, in which case, the number of units of the aligned unit is used for the reading size.

The file manager 21 provides the ID of the 3D type 1 reproduction file, the first enhanced stream file, and the type 1 base file, which are associated files of the 3D type 1 reproduction, the read start point, as well as the reading size from the playback manager 11 (FIG. 3) to the allocation manager 22.

The file manager 21 also requests for the readout of the 3D type 1 reproduction file, and the division of the virtual extent stored in the 3D type 1 reproduction file into the extent Ext1 of the base stream and the extent Ext2 of the first enhanced stream to the allocation manager 22.

The allocation manager 22 requests for and acquires from the UDF manager 13 (FIG. 3) the file entry (allocation information) of the 3D type 1 reproduction file, the first enhanced stream file, and the type 1 base file, which are associated files to which ID are provided from the file manager 21, in response to the request from the file manager 21, and stores the same in a memory (not shown).

The allocation manager 22 calculates the dividing position at where the virtual extent stored in the 3D type 1 reproduction file is divided into the extent Ext1 of the base stream and the extent Ext2 of the first enhanced stream.

The allocation manager 22 requests for and acquires from the UDF manager 13 (FIG. 3) the virtual extent stored in the 3D type 1 reproduction file, and provides the same to the splitter 23.

The allocation manager 22 divides the virtual extent stored in the 3D type 1 reproduction file from the UDF manager 13 at the dividing position by controlling the splitter 23.

In other words, the allocation manager 22 sets the read start point from the file manager 21 to variable pos, and sets the reading size from the file manger 21 to variable size.

The allocation manger 22 references the file entry of the type 1 base file acquired from the UDF manager 13 (FIG. 3), and specifies the extent Ext1 of the base stream recorded at the position on the disk 10 represented by the variable pos as an interest base extent Ext1.

The allocation manager 22 references the file entry of the type 1 base file acquired from the UDF manager 13, and recognizes the start address (sector number) EB_start and the size EB_size of the interest base extent Ext1.

Furthermore, the allocation manager 22 obtains the relative position (relative position) EB_pos of the position on the disk 10 represented by the variable pos having the head of the interest base extent Ext1 as a reference.

Thereafter, the allocation manager 22 references the file entry of the 3D type 1 reproduction file acquired from the UDF manager 13, and specifies the virtual extent (set of the interest base extent Ext1 and the extent Ext2 of the first enhanced stream) recorded at the start address EB_start of the interest base extent Ext1 as an interest virtual extent.

Furthermore, the allocation manager 22 references the file entry of the 3D type 1 reproduction file acquired from the UDF manager 13, and obtains the start address EF_start and the size EF_size of the interest virtual extent.

The allocation manager 22 obtains the dividing position SP, at where to divide the interest virtual extent, based on the start address EB_start of the interest base extent Ext1 and the start address EF_start of the interest virtual extent.

In other words, if the start address EB_start of the interest base extent Ext1 is greater than the start address EF_start of the interest virtual extent (EB_start>EF_start), that is, if the extent Ext2 of the first enhanced stream is positioned on the front side (side read out first) and the interest base extent Ext1 is positioned on the back side (side read out later) in the interest virtual extent, the allocation manager 22 sets the dividing position SP to the start address EB_start of the interest base extent Ext1.

If the start address EB_start of the interest base extent Ext1 and the start address EF_start of the interest virtual extent are the same (EB_start=EF_start), that is, if the extent Ext2 of the first enhanced stream is positioned on the back side and the interest base extent Ext1 is positioned on the front side in the interest virtual extent, the allocation manager 22 sets the dividing position SP to an added value, obtained by adding the start address EB_start of the interest base extent Ext1 and the size EB_size thereof.

Thereafter, the allocation manager 22 requests for and acquires from the UDF manager 13 (FIG. 3) the data worth the size EF_size of the interest virtual extent, that is, the interest virtual extent from the start address EF_start of the interest virtual extent, and provides the same to the splitter 23.

Furthermore, the allocation manager 22 controls the splitter 23 so as to divide the interest virtual extent at the dividing position SP.

The splitter 23 divides the interest virtual extent from the allocation manager 22 at the dividing position SP to divide the interest virtual extent into the extent (interest base extent) Ext1 of the base stream and the extent Ext2 of the first enhanced stream according to the control of the allocation manager 22.

The splitter 23 provides the extent Ext1 of the base stream to the main stream buffer 14 (FIG. 3) as the extent of the main stream, and provides the extent Ext2 of the first enhanced stream to the enhanced stream buffer 15 (FIG. 3) as the extent of the enhanced stream.

Thereafter, the allocation manager 22 determines whether a subtracted value EB_size−EB_pos, obtained by subtracting the relative position EB_pos from the size EB_size of the interest base extent Ext1 is greater than or equal to the variable size.

If the subtracted value EB_size−EB_pos is not greater than or equal to the variable size, the allocation manager 22 newly sets the added value, obtained by adding the variable pos and the value EB_size−EB_pos, as the variable pos.

Furthermore, the allocation manager 22 newly sets the subtracted value, obtained by subtracting the value EB_size−EB_pos from the variable size, as the variable size.

The allocation manager 22 references the file entry of the type 1 base file acquired from the UDF manager 13 (FIG. 3), newly specifies the extent Ext1 of the base stream recorded at the position on the disk 10 represented by the variable pos as the interest base extent Ext1, and repeats the similar processes hereinafter.

If the subtracted value EB_size−EB_pos is greater than or equal to the variable size, that is, if the readout of the extent of the base stream and the extent of the first enhanced stream configuring the virtual extent as a set with the extent of the base stream worth the reading size from the read start point from the file manager 21 is completed, the 3D file controller 12 terminates the process.

In the 3D file controller 12, processes similar to when performing the 3D type 1 reproduction are performed, where the extent Ext1 of the base stream is provided to the main stream buffer 14 (FIG. 3) as the extent of the main stream, and the extent Ext3 of the second enhanced stream is provided to the enhanced stream buffer 15 (FIG. 3) as the extent of the enhanced stream.

[Configuration Example of Recording Device Applied with the Present Invention]

Figure 9:
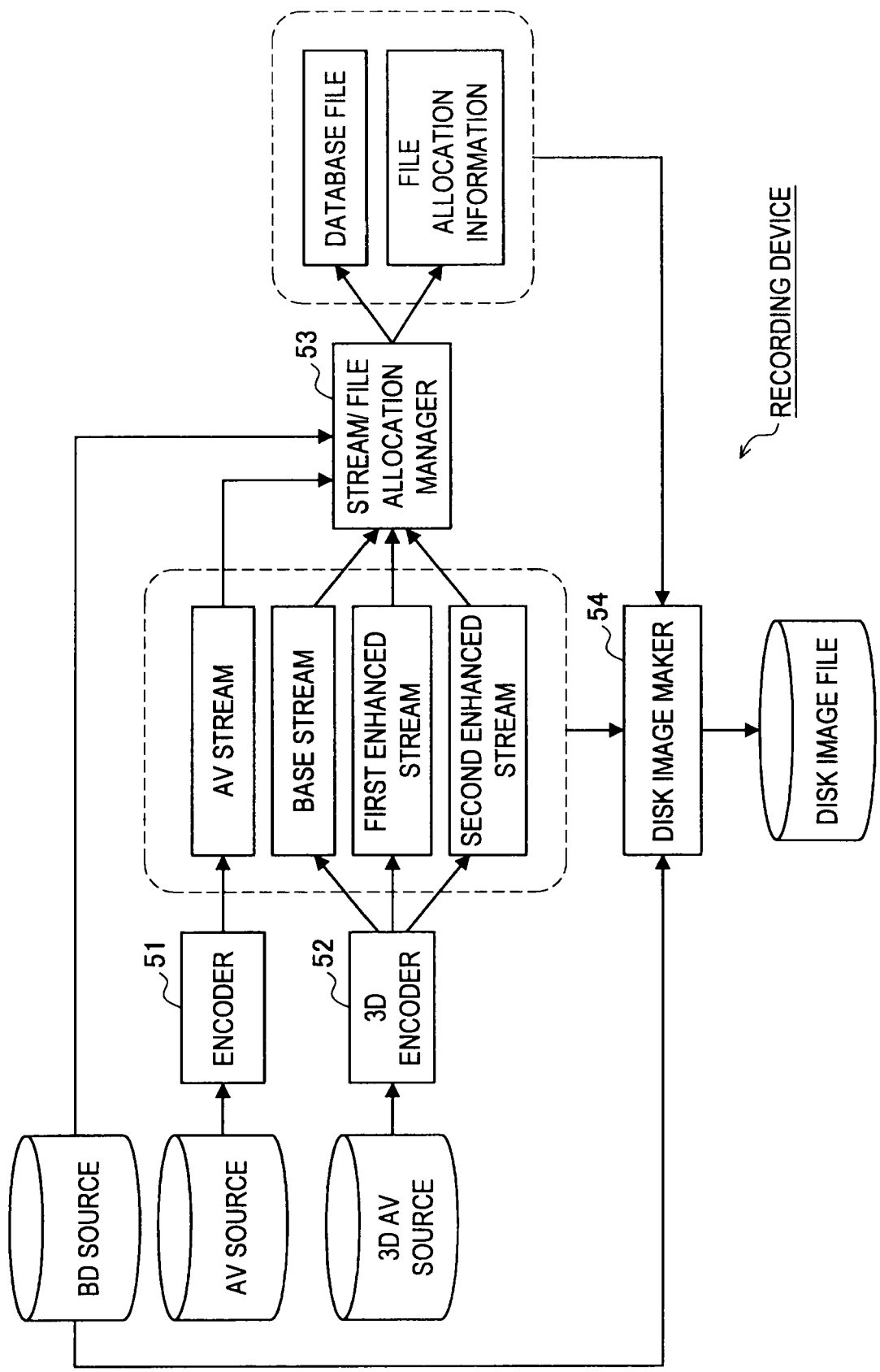
FIG. 9 is a block diagram showing a configuration example of one embodiment of a recording device applied with the information processing device according to the embodiment of the present invention.

FIG. 9 is a block diagram showing a configuration example of one embodiment of a recording device applied with the present invention.

The recording device of FIG. 9 is an authoring device for producing the disk 10, which is a BD, and records streams, files (file entry etc.), and other necessary information in the disk 10.

In other words, the encoder 51 externally receives the AV source (other AV source (non 3D)) not relevant to the 3D reproduction.

The encoder 51 performs encoding through MPEG method with the provided AV source as the target, and provides the resultant AV stream to the allocation manager 53 and the disk image maker 54.

The 3D encoder 52 externally receives the 3D AV source relevant to the 3D reproduction.

The 3D encoder 52 performs encoding through H.264 AVC/MVC method with the provided 3D AV source as the target, and provides the resultant base stream (MVC Base View Stream), the first enhanced stream ($1^{st}$ Enhanced View Stream), and the second enhanced stream ($2^{nd}$ Enhanced Stream) to the allocation manager (stream/file allocation manager) 53 and the disk image maker 54.

The allocation manager 53 receives the AV stream from the encoder 51, as well as the base stream, the first enhanced stream, and the second enhanced stream from the 3D encoder 52, and also externally receives the BD source (other BD source) recorded on the disk 10 other than the AV source and the 3D AV source.

The allocation manager 53 generates the database file (BD database file) of the database of the BD as well as the file allocation information based on the AV stream from the encoder 51, the base stream, the first enhanced stream, and the second enhanced stream from the 3D encoder 52, as well as the BD source from the outside, and provides the same to the disk image maker 54.

The file allocation information generated by the allocation manager 53 contains the file entry of at least the 2D reproduction file, which is the base file, and the 3D type 1 reproduction file and the 3D type 2 reproduction file, which are virtual extent files.

Therefore, the allocation manager 53 functions as a file entry generation unit for generating the file entry.

The disk image maker 54 generates interleaved data described in FIG. 4 from the base stream, the first enhanced stream, and the second enhanced stream from the 3D encoder 52.

Therefore, the disk image maker 54 functions as an interleaved data generation unit for generating interleaved data.

Furthermore, the disk image maker 54 generates the disk image file (BD Disk image file) of the disk image (image data) of the interleaved data, the AV stream from the encoder 51, as well as the data base file and the file allocation information from the allocation manager 53.

The disk image maker 54 records the disk image of the disk image file in the disk 10.

Therefore, the disk image maker 54 functions as a recording control unit for performing the recording control of recording the interleaved data and the file entry in the disk 10.

In the above description, both the first enhanced stream and the second enhanced stream can be recorded in the disk 10 in addition to the base stream so that the 3D image can be displayed by either the display method of type 1 and the display method of type 2, but only one of the first enhanced stream and the second enhanced stream may be recorded in the disk 10 in addition to the base stream if the 3D image is displayed only by one of the display method of type 1 and the display method of type 2.

In other words, the base stream and the first enhanced stream are to be recorded in the disk 10 if the 3D image is to be displayed only by the display method of type 1, and the base stream and the second enhanced stream are to be recorded in the disk 10 if the 3D image is to be displayed only by the display method of type 2.

The disk 10 recorded with the base stream and the first enhanced stream (not recorded with the second enhanced stream) will be described with reference to FIGS. 10 to 13.

Figure 10:
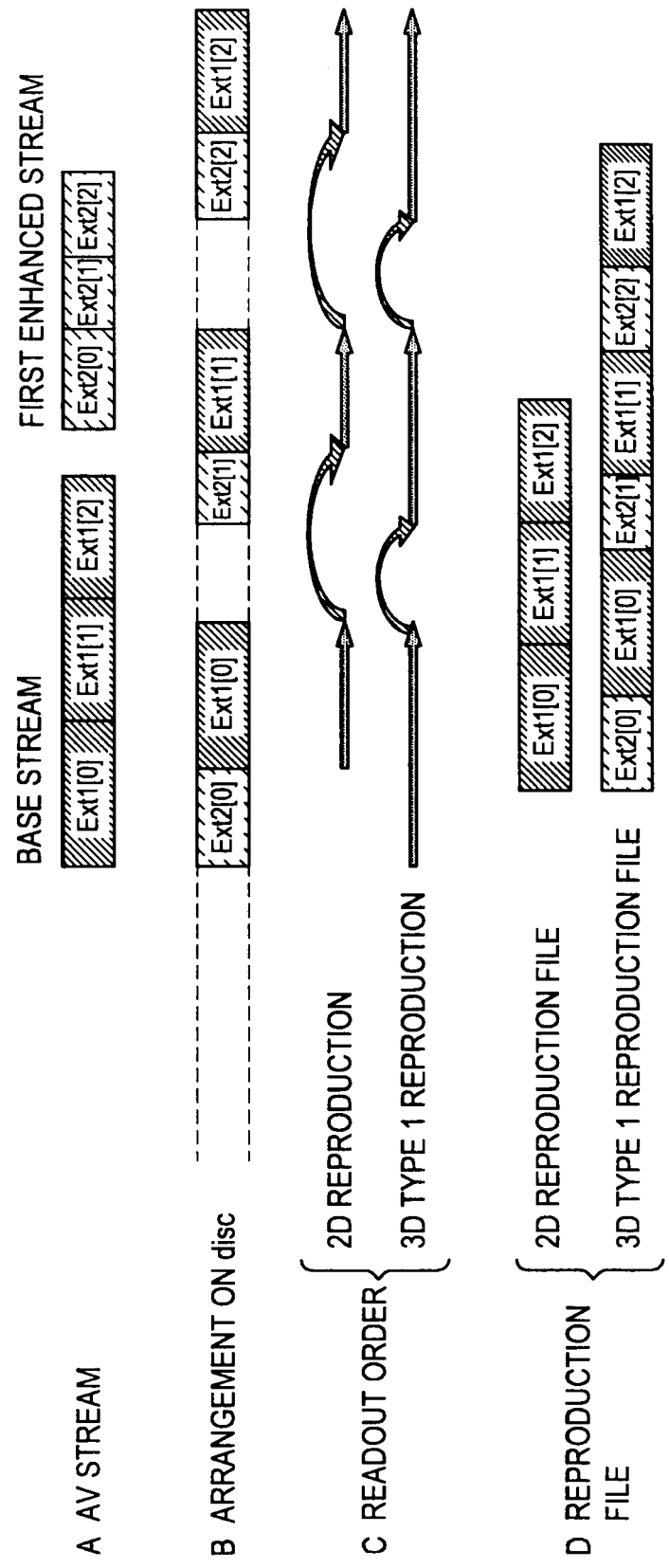
FIG. 10 is a view describing the stream and the file recorded in the disk 10.

FIG. 10 is a view describing the base stream and the first enhanced stream, and the file recorded in the disk 10.

In other words, FIG. 10A shows the base stream and the first enhanced stream recorded in the disk 10, similar to the case of FIG. 4A.

As shown in FIG. 10A, the base stream and the first enhanced stream are both divided into extents.

Each extent of the base stream and the first enhanced stream is interleaved, and the resultant interleaved data is physically (as much as possible) continuously recorded in the disk 10.

FIG. 10B shows the interleaved data recorded in the disk 10.

In the interleaved data of FIG. 10B, the extent Ext1[k] of the base stream and the extent Ext2[k] of the first enhanced stream are arranged in the order of the extents Ext2[0], Ext1[0], the extents Ext2[1], Ext1[1], and the extents Ext2[2], Ext1[2].

As described in FIG. 4, the extents are arranged such that the extent Ext2 of the first enhanced stream, which is the selective stream, is adjacent to the extent Ext1 of the base stream, which is the essential stream, in the interleaving of the extents.

In other words, the two types of extents, the extent Ext1 of the base stream and the extent Ext2 of the first enhanced stream are arranged to be continuously lined in the order of the extents Ext2, Ext1 with such two types of extents as one extent set.

In FIG. 10B, the extent sets are recorded in the disk 10 so that a small gap is formed between the adjacent extent sets, but the extent sets can be recorded in the disk 10 so that a gap is not formed between the adjacent extent sets.

Therefore, the two streams (extents thereof), base stream and the first enhanced stream, can be rapidly read out from the disk 10 in time for reproduction at the time of the 3D reproduction by recording the extents in the disk 10 in interleaved arrangement.

In other words, FIG. 10C is a view describing the readout of the extents from the disk 10.

When performing the 2D reproduction, the extent Ext1 of only the base stream, of the base stream and the first enhanced stream, is read out from the disk 10.

When performing the 3D reproduction (3D type 1 reproduction herein), the extent Ext1 of the base stream and the extent Ext2 of the first enhanced stream are read out from the disk 10.

As described above, in the extent set, the extent Ext1 of the base stream and the extent Ext2 of the first enhanced stream are adjacently (continuously) recorded, and thus the extents Ext1 and Ext2 (extent set) can be read out without seek, that is, rapidly read out.

FIG. 10D shows a file recorded in the disk 10 when recording the interleaved data in which the extents are interleaved, shown in FIG. 10B, in the disk 10.

The 2D reproduction file, and the 3D type 1 reproduction file are recorded in the disk 10.

As described in FIG. 4, the extent Ext1 of the base stream for the 2D reproduction is stored in the 2D reproduction file in the order of Ext1[0], Ext1[1], Ext1[2], which is the reproducing order.

Similarly, the extent Ext1 of the base stream and the extent Ext2 of the first enhanced stream for the 3D type 1 reproduction are stored in the 3D type 1 reproduction file in the order of the set (virtual extent) of Ext2[0] and Ext1[0], the set of Ext2[1] and Ext1[1], and the set of Ext2[2] and Ext1[2], which is the reproducing order.

FIG. 11 is a view describing the management of the file on the disk 10 described in FIG. 10 by the file system (driver).

In other words, FIG. 11 shows the file entry of the 2D reproduction file and the 3D type 1 reproduction file.

As described in FIG. 5, the positional information AD #00, AD#01, and AD#02 of the respective extents Ext1[0], Ext1[1], and Ext1[2], which are the configuring components of the 2D reproduction file, are registered in the file entry of the 2D reproduction file.

Similarly, in the file entry of the 3D type 1 reproduction file, the positional information of the relevant virtual extent is registered with the set of the extent Ext1 of the base stream and the extent Ext2 of the first enhanced stream, which are configuring components of the 3D type 1 reproduction file and are (physically) continuously recorded in the disk 10, as one virtual extent.

In other words, the positional information AD#00 of the virtual extent that is the set of the extents Ext2[0] and Ext1[0], the positional information AD#01 of the virtual extent that is the set of the extents Ext2[0] and Ext1[1], and the positional information AD#02 of the virtual extent that is the set of the extents Ext2[2] and Ext1[2] are registered in the file entry of the 3D type 1 reproduction file.

Figure 12:
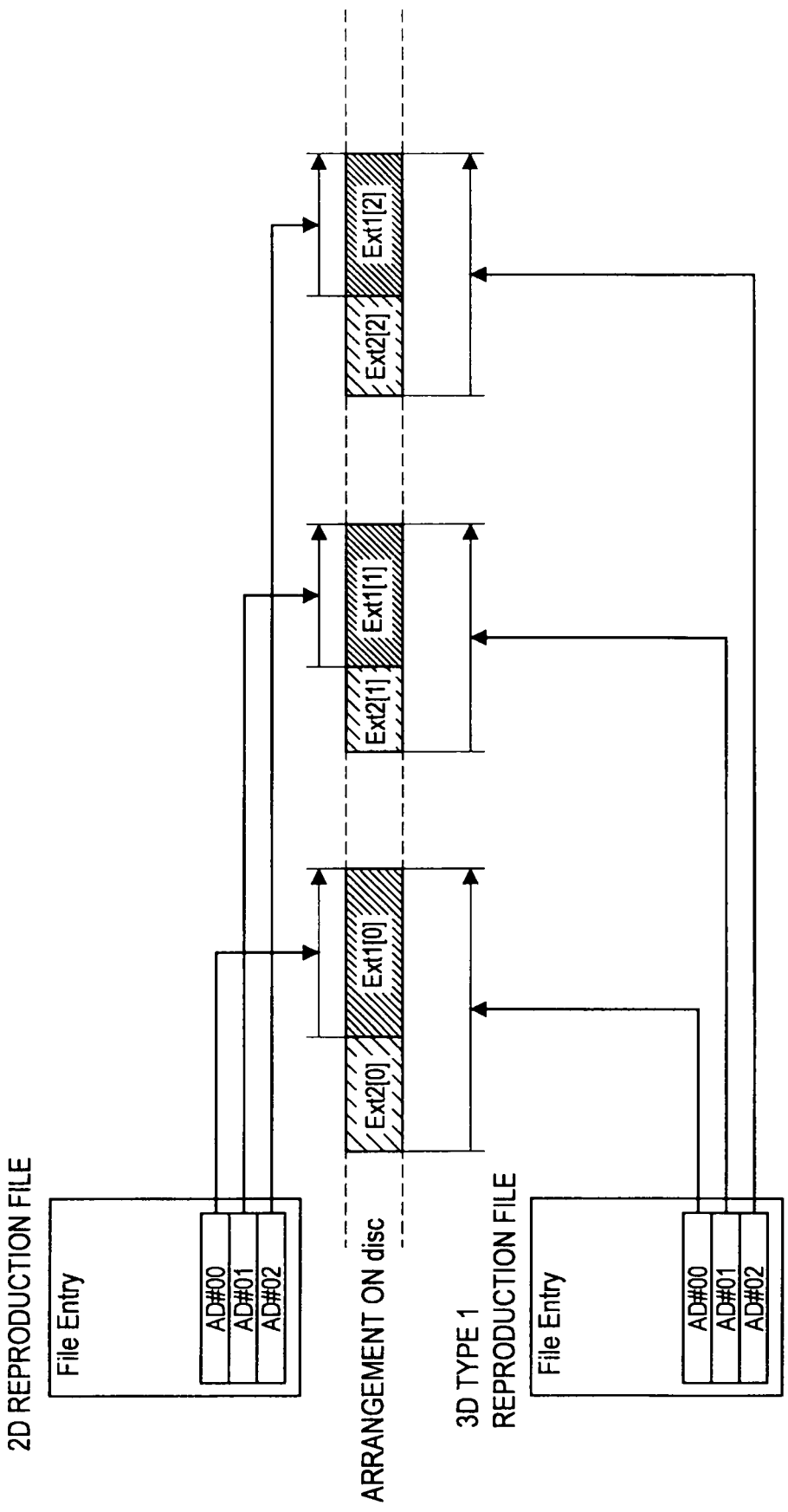
FIG. 12 is a view describing the readout of the extent from the disk 10 by the file system.

FIG. 12 is a view describing the readout process in which the file system reads out the extent (virtual extent) with reference to the file entry with respect to the disk 10 described in FIG. 10, and provides the same to the outside.

For instance, when the reproducing application requests for readout of the 2D reproduction file with respect to the file system, the file system references the file entry of the 2D reproduction file, reads out the extents Ext1[0], Ext1[1], Ext1[2] from the disk 10, and provides the same.

Since the extents Ext1[0], Ext1[1], Ext1[2] read out from the disk 10 are extents of the base stream, and thus the reproducing application can perform the 2D reproduction using such extents Ext1[0], Ext1[1], Ext1[2] of the base stream.

When the reproducing application requests for readout of the 3D type 1 reproduction file with respect to the file system, the file system references the file entry of the 3D type 1 reproduction file, reads out the virtual extent that is the set of the extents Ext2[0] and Ext1[0], the virtual extent that is the set of the extents Ext2[1] and Ext1[1], and the virtual extent that is the set of the extents Ext2[2] and Ext1[2] from the disk 10, and provides the same.

The extents Ext1[0], Ext1[1], Ext1[2] of the virtual extent that is the set of the extents Ext2[0] and Ext1[0], the virtual extent that is the set of the extents Ext2[1] and Ext1[1], and the virtual extent that is the set of the extents Ext2[2] and Ext1[2] read out from the disk 10 are extents of the base stream, and the remaining extents Ext2[0], Ext2[1], and Ext2[2] are the extents of the first enhanced stream.

Therefore, the reproducing application can perform the 3D type 1 reproduction using the extents Ext1[0], Ext1[1], and Ext1[2] of the base stream and the extents Ext2[0], Ext2[1], and Ext2[2] of the first enhanced stream read out from the disk 10.

When performing the 3D type 1 reproduction, the base stream and the first enhanced stream are to be respectively decrypted, and thus, the virtual extent read out from the disk 10 is to be divided into the extent Ext2 of the first enhanced stream and the extent Ext1 of the base stream.

Figure 13:
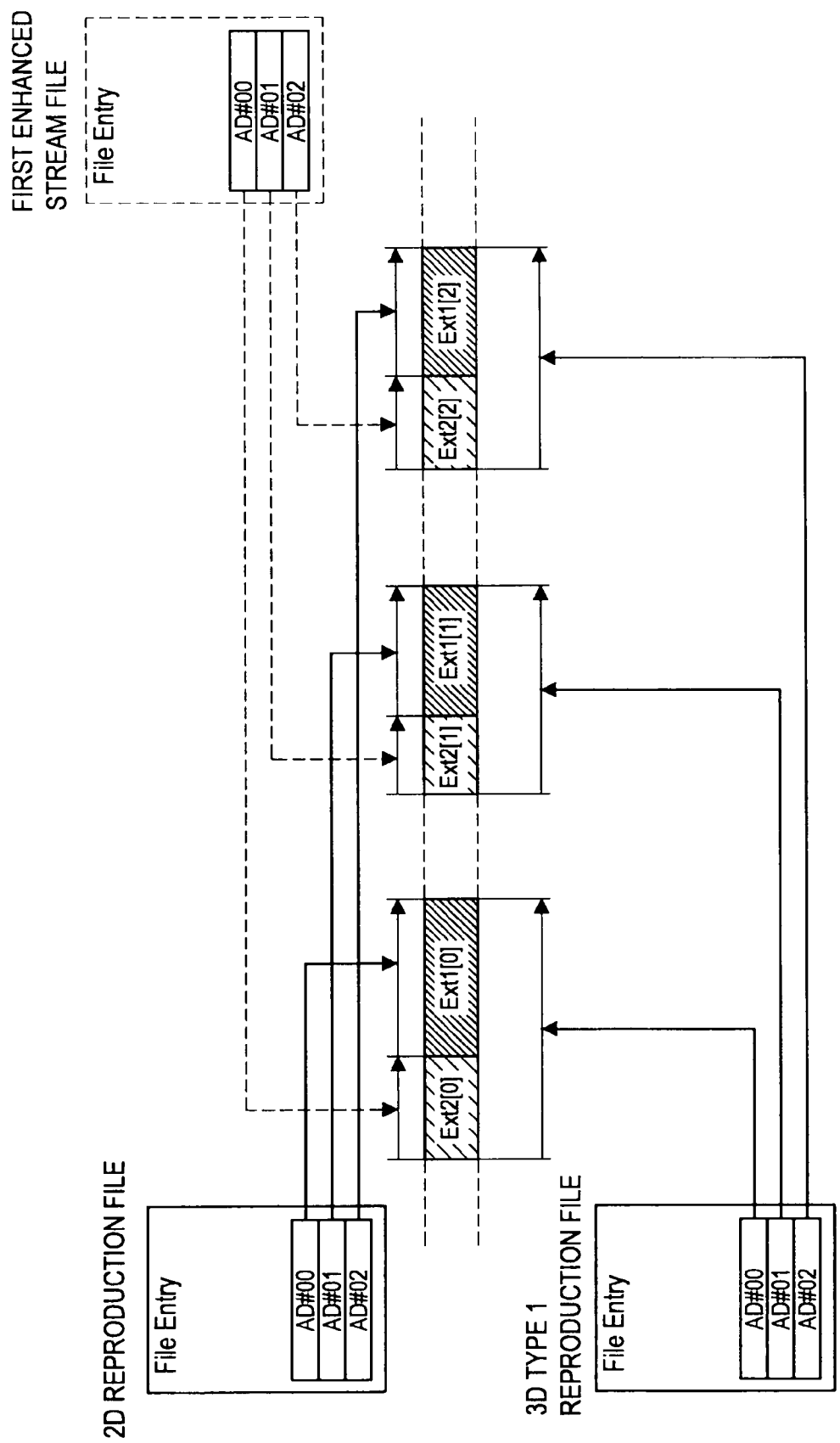
FIG. 13 is a view describing a method of dividing the virtual extent read out from the 3D type 1 reproduction file into the extent Ext 2 of the first enhanced stream and the extent Ext1 of the base stream.

FIG. 13 is a view describing a method of dividing the virtual extent read out from the 3D type 1 reproduction file into the extent Ext 2 of the first enhanced stream and the extent Ext1 of the base stream, as described in FIG. 12.

As described above, the file system references the file entry of the 3D type 1 reproduction file to read out the virtual extent that is the set of the extent Ext 2 of the first enhanced stream and the extent Ext 1 of the base stream (the virtual extent that is the set of the extents Ext2[0] and Ext1[0], the virtual extent that is the set of the extents Ext2[1] and Ext1[1], and the virtual extent that is the set of the extents Ext2[2] and Ext1[2]) from the disk 10.

The file system manages the file entry of the 2D reproduction file, and can recognize the boundary between the extents Ext2 and Ext1 in the virtual extent that is the set of the extent Ext2 of the first enhanced stream and the extent Ext1 of the base stream by referencing the file entry.

Therefore, the virtual extent that is the set of the extent Ext2 of the first enhanced stream and the extent Ext1 of the base stream can be divided into the extent Ext2 of the first enhanced stream and the extent Ext1 of the base stream with reference to the file entry of the 2D reproduction file.

As shown with a dotted line in FIG. 13, the virtual extent that is the set of the extent Ext2 of the first enhanced stream and the extent Ext1 of the base stream read out from the 3D type 1 reproduction file can also be divided into the extents Ext2 and Ext 1 with reference to the file of the first enhanced stream in place of the file entry of the 2D reproduction file by recording the first enhanced stream file in the disk 10.

In FIGS. 10 to 13, the extent Ext2 of the first enhanced stream and the extent Ext1 of the base stream configure the virtual extent by being lined in such order, but in the virtual extent, the extent Ext2 of the first enhanced stream and the extent Ext1 of the base stream may be lined in the reverse order, that is, in the order of the extent Ext1 of the base stream and the extent Ext2 of the first enhanced stream.

As described in FIGS. 10 to 13, however, the virtual extent is desirably configured with the extent Ext2 of the first enhanced stream and the extent Ext1 of the base stream lined in such order.

In other words, as described above, the amount of data is large in the extent Ext1 of the base stream, and the amount of data is small in the extent Ext2 of the first enhanced stream in the extent Ext1 of the base stream and the extent Ext2 of the first enhanced stream.

Therefore, when the extent Ext1 of the base stream and the extent Ext2 of the first enhanced stream are lined in such order in the virtual extent, the extent Ext1 of the base stream is read out first and the extent Ext2 of the first enhanced stream is read out later in the reading of the virtual extent.

In this case, the display of the 3D image may not be performed until the extent Ext1 of the base stream is read out and then the readout of the extent Ext2 of the first enhanced stream is started.

Thus, the extent Ext1 of the base stream to be read out first is to be temporarily stored in the buffer, but in this case, the buffer of large capacity is necessary to store the extent Ext1 of the base stream having large amount of data.

When the extent Ext2 of the first enhanced stream is arranged first and the extent Ext1 of the base stream is arranged following thereto in the virtual extent, the extent Ext2 of the first enhanced stream is read out first and the extent Ext 1 of the base stream is read out later.

In this case as well, the extent Ext2 of the first enhanced stream to be read out first is to be temporarily stored in the buffer, but the buffer of small capacity can be used for the buffer since the extent Ext2 of the first enhanced stream has small amount of data.

[Description on Computer Applied with the Present Invention]

The series of processes can be carried out by hardware or can be carried out by software. When carrying out the series of processes by software, the program configuring such software is installed in a general-purpose computer, and the like.

Figure 14:
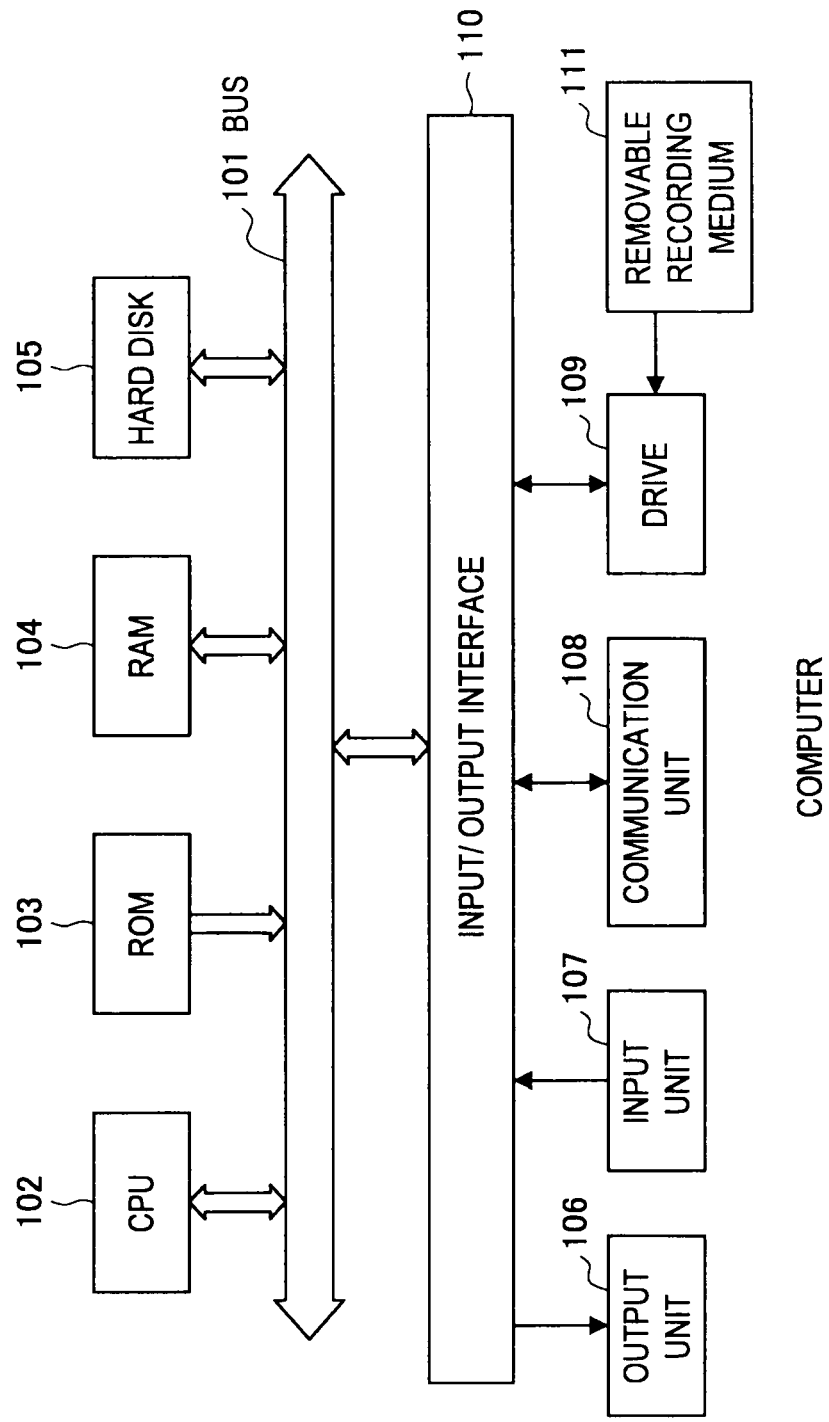
FIG. 14 is a block diagram showing a configuration example of one embodiment of a computer applied with the present invention.

FIG. 14 shows a configuration example of one embodiment of a computer installed with a program for executing the series of processes.

The program can be recorded in advance in a hard disk 105 serving as a recording medium built in the computer or a ROM 103.

Alternatively, the program can be stored (recorded) in a removable recording medium 111. Such removable recording medium 111 can be provided as a so-called package software. The removable recording medium 111 includes a flexible disk, a CD-ROM (Compact Disk Read Only Memory), an MO (Magneto Optical) disk, a DVD (Digital Versatile Disk), a magnetic disk, a semiconductor memory, and the like.

In addition to being installed from the removable recording medium 111 to the computer as described above, the program can be downloaded to the computer through a communication network and a broadcast network, and installed in the built-in hard disk 105. In other words, the program can be wirelessly transferred to the computer from the download site through an artificial earth satellite for digital satellite broadcasting, or wire transferred to the computer through the network such as LAN (Local Area Network), and Internet.

The computer incorporates a CPU (Central Processing Unit) 102, and the CPU 102 is connected to an input/output interface 110 by way of a bus 101.

When an input unit 107 is operated etc. and a command is input by the user through the input/output interface 110, the CPU 102 accordingly executes the program stored in the ROM (Read Only Memory) 103. Alternatively, the CPU 102 loads the program stored in the hard disk 105 to the RAM (Random Access Memory) 104, and executes the same.

Thus, the CPU 102 performs the process according to the above-described flowchart or the process performed by the configuration of the block diagram described above. The CPU 102 outputs the processing result from the output unit 106 or transmits from the communication unit 108 through the input/output interface 110, and records the same in the hard disk 105, as necessary.

The input unit 107 is configured by a keyboard, a mouse, a microphone, and the like. The output unit 106 is configured by a LCD (Liquid Crystal Display), a speaker, and the like.

In the present specification, the processes that the computer performs according to the program may not be necessarily performed in time-series along the order described in the flowchart. In other words, the processes that the computer performs according to the program include processes executed in parallel or individually (e.g., parallel process or process by object).

The program may be processed by one computer (processor), or may be distributing-processed by a plurality of computers. Furthermore, the program may be transferred to a distant computer and executed thereat.

The embodiment of the present invention is not limited to the above-described embodiment, and various modifications may be made without deviating from the concept of the invention.

<Second Embodiment>

The base stream is hereinafter referred to as Base view video stream. The enhanced stream is hereinafter referred to as Dependent view video stream.

[Configuration Example of Reproduction System]

Figure 15:
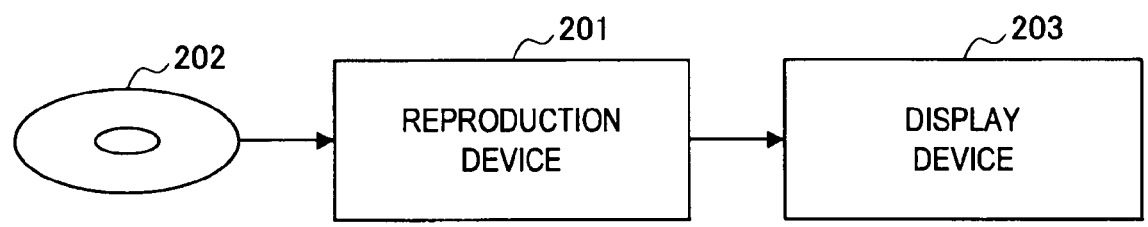
FIG. 15 is a view showing a configuration example of a reproduction system including a reproduction device applied with the present invention.

FIG. 15 is a view showing a configuration example of a reproduction system including a reproduction device 201 applied with the present invention.

As shown in FIG. 15, the reproduction system is configured by connecting the reproduction device 201 and the display device 203 with an HDMI (High Definition Multimedia Interface) cable, and the like. An optical disk 202 such as the BD is attached to the reproduction device 201.

Streams for displaying a stereo image (3D image) in which the number of view points is two are recorded in the optical disk 202.

The data of each stream is recorded in the optical disk 202 in the interleaved state in units of extents as described above.

The reproduction device 201 is a player compatible to the 3D reproduction of streams recorded in the optical disk 202. The reproduction device 201 reproduces the streams recorded in the optical disk 202, and displays the 3D image obtained by reproduction on the display device 203 including a television receiver, and the like. Similarly, the audio is reproduced by the reproduction device 201, and output from a speaker, and the like arranged in the display device 203.

A stream capable of displaying the 3D image in both display methods of type 1 and type 2 is recorded in the optical disk 202. H.264 AVC (Advanced Video Coding)/MVC (Multi-view Video coding) is used for the method of encoding to record the stream in the optical disk 202.

[H.264 AVC/MVC Profile]

In H.264 AVC/MVC, the image stream called the Base view video and the image stream called the Dependent view video are defined. The H.264 AVC/MVC is hereinafter simply referred to as MVC, as appropriate.

Figure 16:
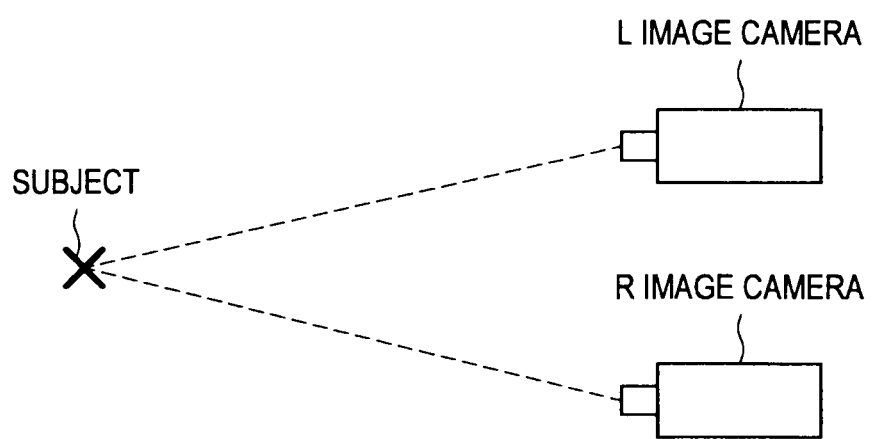
FIG. 16 is a view showing an example of photographing.

FIG. 16 is a view showing an example of photographing.

As shown in FIG. 16, photographing is carried out with an L image camera and an R image camera with the same subject as the target. An elementary stream of the video photographed by the L image camera and the R image camera is input to an MVC encoder.

Figure 17:
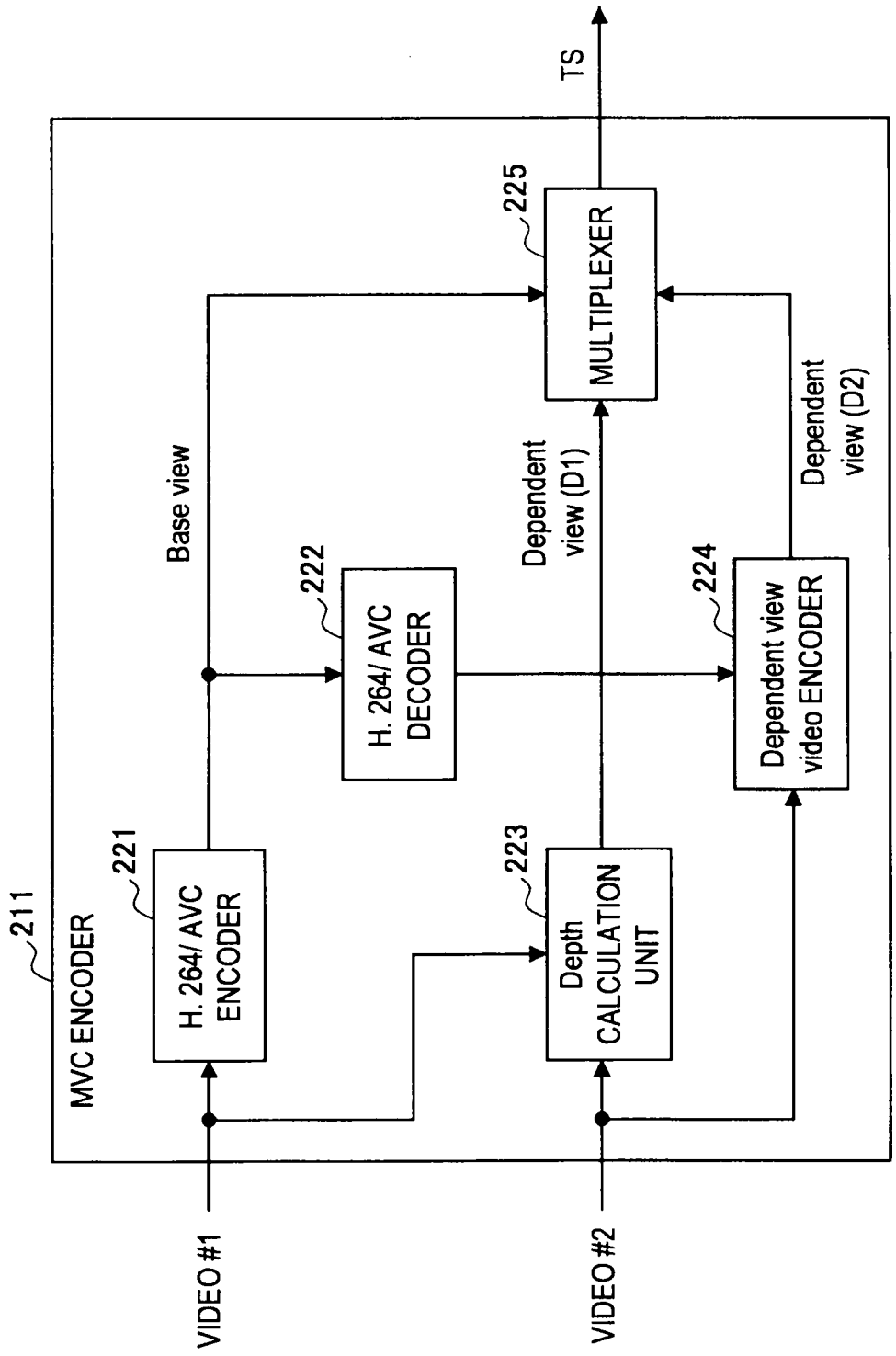
FIG. 17 is a block diagram showing a configuration example of the MVC encoder.

FIG. 17 is a block diagram showing a configuration example of the MVC encoder.

As shown in FIG. 17, an MVC encoder 211 is configured by an H.264/AVC encoder 221, a H.264/AVC decoder 222, a Depth calculation unit 223, a Dependent view video encoder 224, and a multiplexer 225.

The stream of video #1 photographed by the L image camera is input to the H.264/AVC encoder 221 and the Depth calculation unit 223. The stream of video #2 photographed by the R image camera is input to the Depth calculation unit 223 and the Dependent view video encoder 224. The stream of video #2 may be input to the H.264/AVC encoder 221 and the Depth calculation unit 223, and stream of video #1 may be input to the Depth calculation unit 223 and the Dependent view video encoder 224.

The H.264/AVC encoder 221 encodes the stream of video #1 as H.264 AVC/High Profile video stream, and the like. The H.264/AVC encoder 221 outputs the AVC video stream obtained by encoding to the H.264/AVC decoder 222 and the multiplexer 225 as Base view video stream.

The H.264/AVC decoder 222 decodes the AVC video stream provided from the H.264/AVC encoder 221, and outputs the stream of video #1 obtained through decoding to the Dependent view video encoder 224.

The Depth calculation unit 223 calculates the Depth (parallax) based on the stream of video #1 and the stream of video #2, and outputs the data of the calculated Depth to the multiplexer 225.

The Dependent view video encoder 224 encodes the stream of video #1 provided from the H.264/AVC decoder 222 and the stream of video #2 input from the outside, and outputs the Dependent view video stream.

Figure 18:
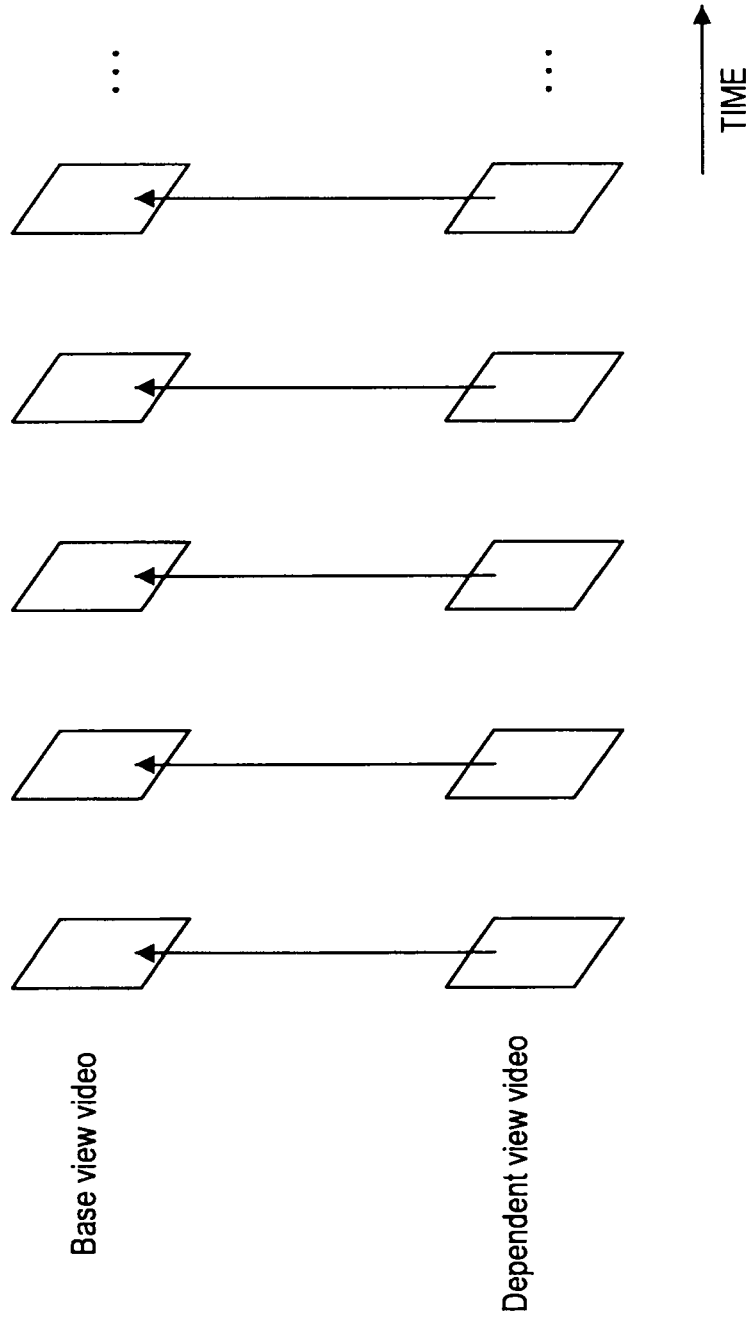
FIG. 18 is a view showing an example of a reference image.

The predictive coding of having another stream as a reference image is not permitted in the Base view video, but the predictive coding of having the Base view video as a reference image is permitted in the Dependent view video, as shown in FIG. 18. For instance, when encoding with the L image as the Base view video and the R image as the Dependent view video, the amount of data of the Dependent view video stream obtained as a result is less compared to the amount of data of the Base view video stream.

Since encoding in H.264/AVC is performed, the prediction in the time direction is performed for the Base view video. For the Dependent view video as well, the prediction between views and the prediction in the time direction are performed. The decoding of the corresponding Base view video, which is referenced in time of encoding, is to be terminated first to decode the Dependent view video.

The Dependent view video encoder 224 outputs the Dependent view video stream obtained through encoding also using the prediction between views to the multiplexer 225.

The multiplexer 225 multiplexes the Base view video stream provided from the H.264/AVC encoder 221, the Dependent view video stream (data of Depth) provided from the Depth calculation unit 223, and the Dependent view video stream provided from the Dependent view video encoder 224 as MPEG2 TS, for example. The Base view video stream and the Dependent view video stream may be multiplexed as one MPEG2 TS, or may be contained in different MPEG2 TS.

The multiplexer 225 outputs the generated TS (MPEG2 TS). The TS output from the multiplexer 225 is recorded in the optical disk 202 along with other management data at the recording device, and provided to the reproduction device 201 in the form recorded in the optical disk 202.

As appropriately shown in FIG. 17, the Dependent view video including the Depth information of the two Dependent view videos is referred to as D1 view video, and the Dependent view video including the R image is referred to as D2 view video. The Dependent view video including the R image may be processed as the D1 view video, and the Dependent view video including the Depth information may be processed as the D2 view video.

The 3D reproduction performed using the Base view video and the D1 view video is referred to as B-D1 reproduction. The 3D reproduction performed using the Base view video and the D2 view video is referred to as B-D2 reproduction.

When performing the B-D1 reproduction according to instructions etc. by the user, the reproduction device 201 reads out the Base view video stream and the D1 view video stream from the optical disk 202 and reproduces the same.

When performing the B-D2 reproduction, the reproduction device 201 reads out the Base view video stream and the D2 view video stream from the optical disk 202 and reproduces the same.

Furthermore, when performing the normal 2D image reproduction, the reproduction device 201 reads out only the Base view video stream from the optical disk 202 and reproduces the same.

Since the Base view video stream is the AVC video stream encoded by H.264/AVC, the Base view video stream can be reproduced and the 2D image can be displayed if the player is compatible to the BD format.

[Configuration Example of TS]

Figure 19:
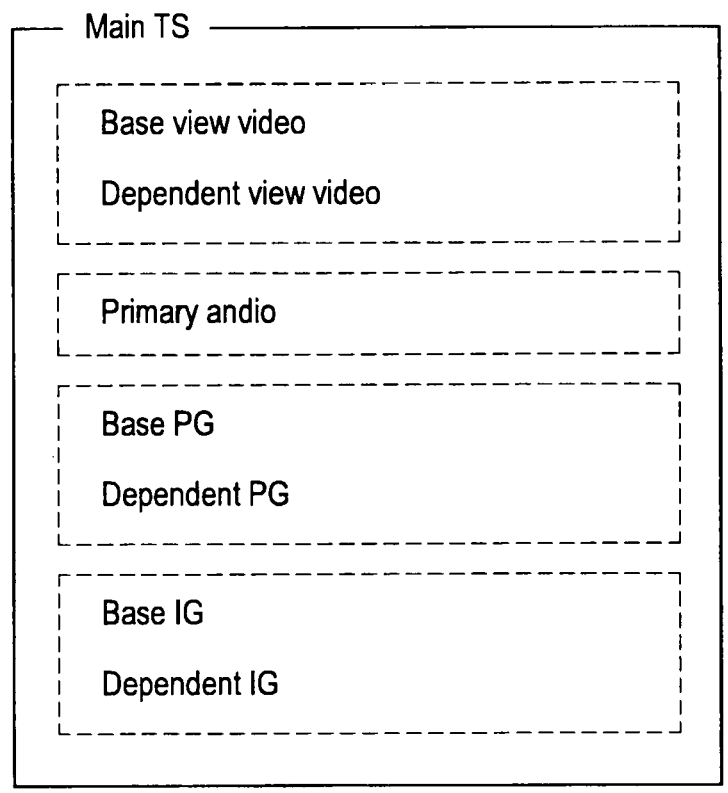
FIG. 19 is a view showing a configuration example of the TS.

FIG. 19 is a view showing a configuration example of the TS.

In the Main TS of FIG. 19, the respective streams of the Base view video, the Dependent view video, the Primary audio, the Base PG, the Dependent PG, the Base IG, and the Dependent IG are multiplexed. Thus, the Main TS may include the Dependent view video stream along with the Base view video stream.

The optical disk 202 is recorded with the Main TS and the Sub TS. The Main TS is a TS that includes at least the Base view video stream. The Sub TS is a TS that includes streams other than the Base view video stream, and that is used with the Main TS.

Similar to the video, the respective streams of the Base view and the Dependent view are prepared for the PG and the IG so that the display can be made in 3D.

FIG. 20 is a view showing another configuration example of the TS.

In the Main TS of FIG. 20, the respective streams of the Base view video and the Dependent view video are multiplexed.

The respective streams of the Primary audio, the Base PG the Dependent PG, the Base IG, and the Dependent IG are multiplexed in the Sub TS.

Therefore, the video stream may be multiplexed in the Main TS, and the streams etc. of the PG and the IG may be multiplexed in the Sub TS.

FIG. 21 is a view showing further configuration example of the TS.

In the Main TS of FIG. 21, the respective streams of the Base view video, the Primary audio, the Base PG, the Dependent PG, the Base IQ and the Dependent IG are multiplexed.

The Sub TS includes the Dependent view video stream.

Thus, the Dependent view video stream may be contained in the TS different from the Base view video stream.

[Application Format]

Figure 22:
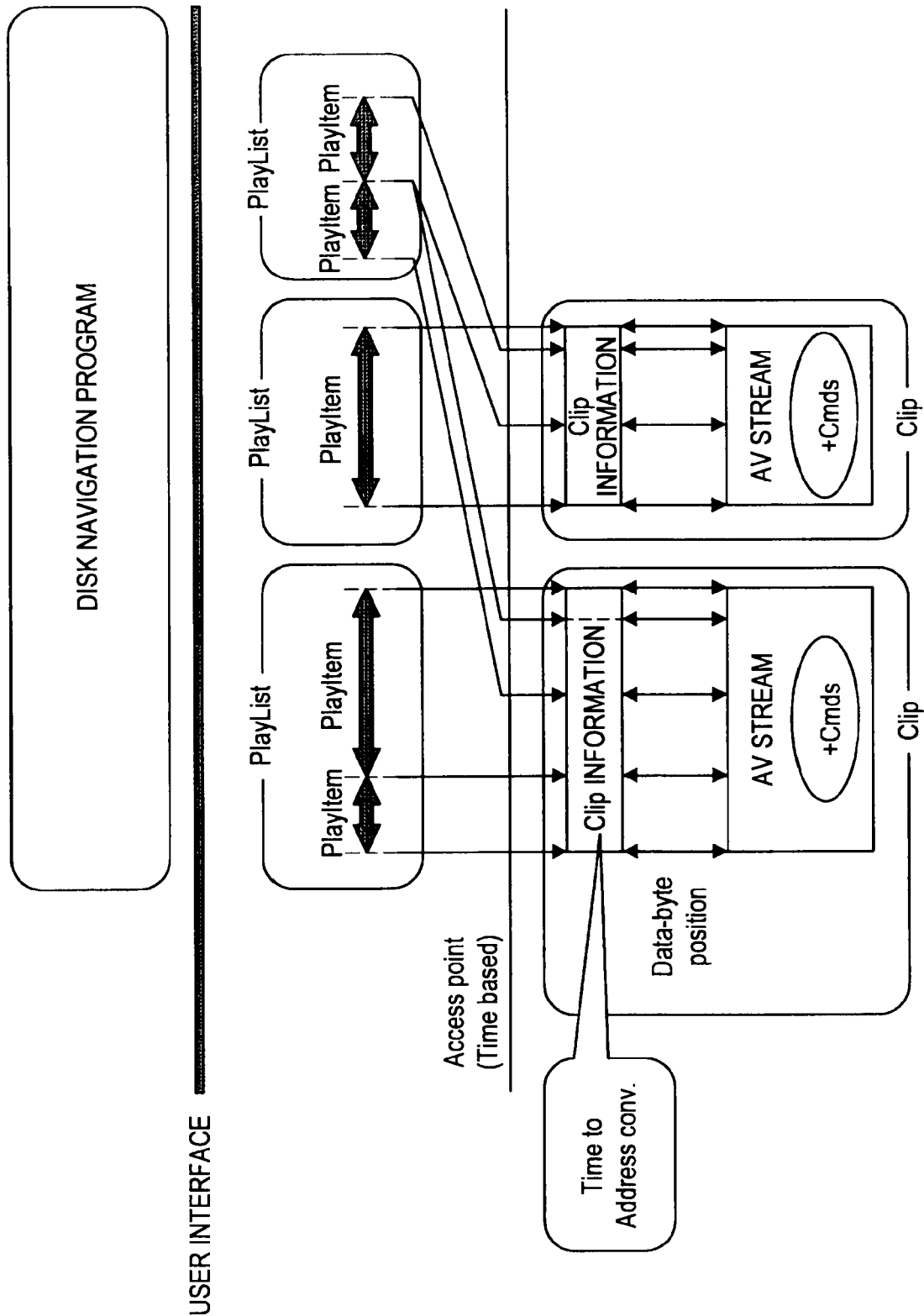
FIG. 22 is a view showing an example of management of the AV stream.

FIG. 22 is a view showing an example of management of the AV stream by the reproduction device 201.

As shown in FIG. 22, the AV stream is managed using two layers of PlayList and Clip. The AV stream is sometimes recorded not only in the optical disk 202, but also in the local storage of the reproduction device 201.

Here, the pair of one AV stream and Clip Information, which is information attached thereto, is considered as one object, and is collectively referred to as Clip. Hereinafter, the file storing the AV stream is referred to as the AV stream file. The file storing the Clip Information is also referred to as the Clip Information file.

The AV stream is developed on the time axis, and the access point of each Clip is mainly specified at the PlayList with time stamp. The Clip Information file is used, for example, to find the address to start the decoding in the AV stream.

The PlayList is a collection of reproduction intervals of the AV stream. One reproduction interval in the AV stream is called a PlayItem. The PlayItem is represented with a pair of IN point and OUT point of the reproduction interval on the time axis. As shown in FIG. 22, the PlayList is configured by one or a plurality of PlayItems.

The first PlayList from the left in FIG. 22 is configured by two PlayItems, and the first half and the second half of the AV stream contained in the Clip on the left side are respectively referenced by the two PlayItems.

The second PlayList from the left is configured by one PlayList, and the entire AV stream contained in the Clip on the right side is referenced by such PlayList.

The third PlayList from the left is configured by two PlayItems, and a certain portion of the AV stream contained in the Clip on the left side and a certain portion of the AV stream contained in the Clip on the right side are respectively referenced by the two PlayItems.

For instance, when the PlayItem on the left side contained in the first PlayList from the left is specified by the disk navigation program as a reproduction target, the reproduction of the first half of the AV stream contained in the Clip on the left side referenced by the PlayItem is performed. Thus, the PlayList is used as reproduction management information for managing the reproduction of the AV stream.

A reproduction path created by the sequence of one or more PlayItems is called the Main Path in the PlayList.

A reproduction path created by the sequence of one or more SubPlayItems in parallel to the Main Path is called the Sub Path in the PlayList.

Figure 23:
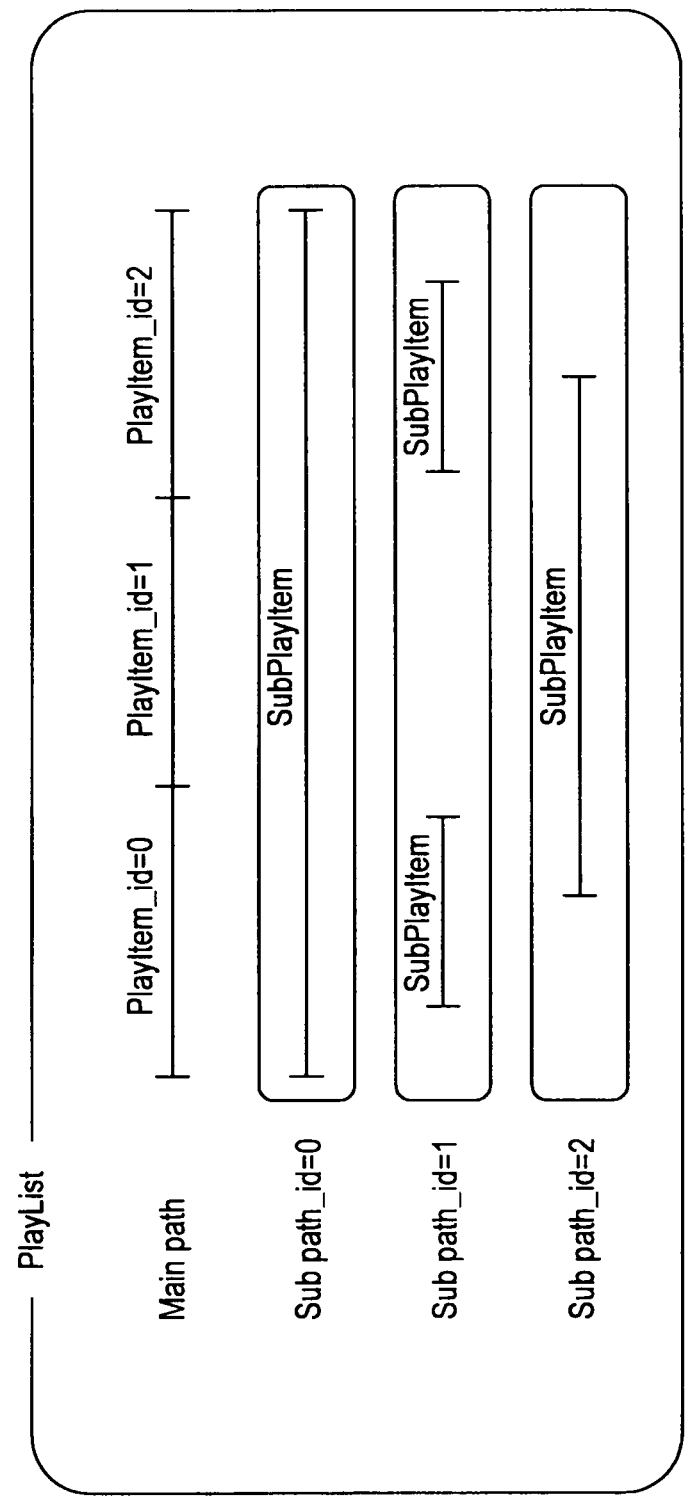
FIG. 23 is a view showing a structure of the Main Path and the Sub Path.

FIG. 23 is a view showing a structure of the Main Path and the Sub Path.

The PlayList may have one Main Path and one or more Sub Paths.

The Base view video stream described above is managed as a stream referenced by the PlayItem configuring the Main Path. The Dependent view video stream is managed as a stream referenced by the SubPlayItem configuring the Sub Path.

The PlayList of FIG. 23 includes one Main Path created by the sequence of three PlayItems, and three Sub Paths.

An ID is respectively set in order from the head in the PlayItem configuring the Main Path. The ID of Subpath_id=0, Subpath_id=1, and Subpath_id=2 is set in order from the head in the Sub Path.

In the example of FIG. 23, one SubPlayItem is contained in the Sub Path of Subpath_id=0, and two SubPlayItems are contained in the Sub Path of Subpath_id=1. Furthermore, one SubPlayItem is contained in the Sub Path of Subpath_id=2.

The Clip AV stream referenced by one PlayItem includes at least the video stream (main image data).

The Clip AV stream may include or may not include one or more audio streams reproduced at the same timing as (in synchronization with) the video stream contained in the Clip AV stream.

The Clip AV stream may include or may not include one or more streams of caption data (PG (Presentation Graphic)) of the bit map reproduced in synchronization with the video stream contained in the Clip AV stream.

The Clip AV stream may include or may not include one or more streams of IG (Interactive Graphic) reproduced in synchronization with the video stream contained in the Clip AV stream. The stream of IG is used to display graphics such as buttons operated by the user.

In the Clip AV stream referenced by one PlayItem, the video stream, and zero or more audio streams, zero or more PG streams, and zero or more IG streams to be reproduced in synchronization with the video stream are multiplexed.

One SubPlayItem references the video stream, the audio stream, the PG stream, or the like of a stream (different stream) different from the Clip AV stream referenced by the PlayItem.

The management of the AV stream using such PlayList, PlayItem, and SubPlayItem is described in Japanese Patent Application Laid-Open No. 2008-252740, and Japanese Patent Application Laid-Open No. 2005-348314.

[Directory Structure]

Figure 24:
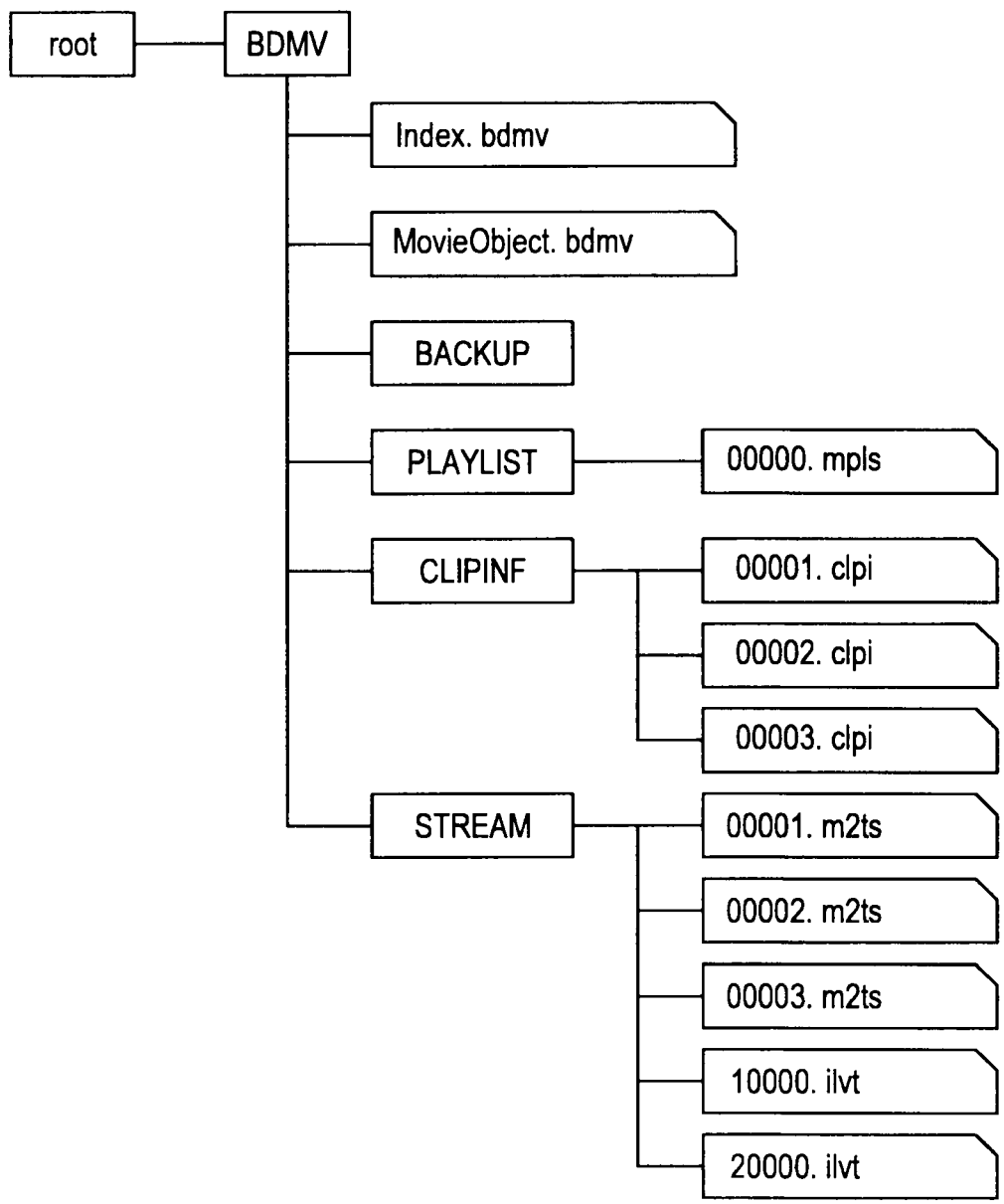
FIG. 24 is a view showing an example of a management structure of the file recorded in the optical disk.

FIG. 24 is a view showing an example of a management structure of the file recorded in the optical disk 202.

As shown in FIG. 24, the file is hierarchically managed by the directory structure. One root directory is created on the optical disk 202. Below the root directory is a range managed by one recording and reproduction system.

The BDMV directory is arranged below the root directory.

The Index file, which is a file set with a name "Index.bdmv", and the MovieObject file, which is a file set with a name "MovieObject.bdmv" are stored immediately below the BDMV directory.

The BACKUP directory, the PLAYLIST directory, the CLIPINF directory, the STREAM directory, and the like are arranged below the BDMV directory.

A PlayList file describing the PlayList is stored in the PLAYLIST directory. A name combining a five digit number and an extension ".mpls" is set to each PlayList file. A file name "00000.mpls" is set to one PlayList file shown in FIG. 24.

The Clip Information file is stored in the CLIPINF directory. A name combining a five digit number and an extension ".clpi" is set to each Clip Information file.

File names "00001.clpi", "00002.clpi", and "00003.clpi" are set to the three Clip Information files of FIG. 24. The Clip Information file is hereinafter appropriately referred to as clpi file.

For instance, the clpi file "00001.clpi" is a file described with information related to the Clip of the Base view video.

The clpi file "00002.clpi" is a file described with information related to the Clip of the D2 view video.

The clpi file "00003.clpi" is a file described with information related to the Clip of the D1 view video.

The stream file is stored in the STREAM directory. A name combining a five digit number and an extension ".m2ts" or a name combining a five digit number and an extension ".ilvt" is set to each stream file. The file set with the extension ".m2ts" is hereinafter appropriately referred to as m2ts file. The file set with the extension ".ilvt" is hereinafter referred to as ilvt file.

The m2ts file of "00001.m2ts" is the 2D reproduction file, where the Base view video stream is read out by specifying such file.

The m2ts file of "00002.m2ts" is the file of D2 view video stream, and the m2ts file of "00003.m2ts" is the file of D1 view video stream.

The ilvt file of "10000.ilvt" is the B-D1 reproduction file, where the Base view video stream and the D1 view video stream are read out by specifying such file. The ilvt file for B-D1 reproduction corresponds to the 3D type 1 reproduction file described above.

The ilvt file of "20000.ilvt" is the B-D2 reproduction file, where the Base view video stream and the D2 view video stream are read out by specifying such file. The ilvt file for B-D2 reproduction corresponds to the 3D type 2 reproduction file described above.

In addition to those shown in FIG. 24, directories for storing the files of audio stream, and the like are also arranged under the BDMV directory.

[Syntax of Each Data]

FIG. 25 is a view showing the syntax of the PlayList file.

The PlayList file is a file set with the extension ".mpls" stored in the PLAYLIST directory of FIG. 24.

The type_indicator of FIG. 25 represents the type of file of "xxxxx.mpls".

The version_number represents the version number of "xxxx.mpls". The version_number includes a four digit number. For instance, "0240" representing "3D Spec version" is set to the PlayList file for 3D reproduction. The PlayList described in the PlayList file set with "0240" becomes the 3D_PlayList, to be described later.

The PlayList_start_address represents the head address of PlayList( ) with the relative number of bytes from the byte at the head of the PlayList file as the unit.

The PlayListMark_start_address represents the head address of PlayListMark( ) with the relative number of bytes from the byte at the head of the PlayList file as the unit.

The ExtensionData_start_address represents the head address of ExtensionData( ) with the relative number of bytes from the byte at the head of the PlayList file as the unit.

The reserved_for_future_use of 160 bits is provided after the ExtensionData_start_address.

The AppInfoPlayList( ) stores parameters related to the reproduction control of the PlayList such as reproduction limitation.

The PlayList( ) stores parameters related to the Main Path, the Sub Path, and the like. The contents of the PlayList( ) will be described later.

In the PlayListMark( ) the mark information of the PlayList, that is, information related to user operation commanding chapter jump etc. or mark, which is the jump destination (jump point) in the command etc.

The private data can be inserted to the ExtensionData( ).

FIG. 26 is view showing the syntax of the PlayList( ) of FIG. 25.

The length is an integer without sign of 32 bits indicating the number of bytes from immediately after the length field to the end of PlayList( ). In other words, the length represents the number of bytes from the reserved_for_future_use to the end of PlayList.

The reserved_for_future_use of 16 bits is prepared after the length.

The number_of_PlayItems is a field of 16 bits indicating the number of PlayItems in the PlayList. In the case of the example of FIG. 23, the number of PlayItems is three. The value of PlayItem_id is allocated from zero in the order the PlayItem( ) appears in the PlayList. For instance, PlayItem_id=0, 1, 2 of FIG. 23 are allocated.

The number_of_SubPaths is a field of 16 bits indicating the number of Sub Paths in the PlayList. In the case of the example of FIG. 23, the number of Sub Paths is three. The value of SubPath_id is allocated from zero in the order the SubPath( ) appears in the PlayList. For instance, Subpath_id=0, 1, 2 of FIG. 23 are allocated. The PlayItem( ) is referenced by the number of PlayItems, and the SubPath( ) is referenced by the number of Sub Paths in the following for sentence.

FIG. 27 is a view showing the syntax of SubPath( ) of FIG. 26.

The length is an integer without sign of 32 bits indicating the number of bytes from immediately after the length field to the end of Sub Path( ). In other words, the length represents the number of bytes from the reserved_for_future_use to the end of PlayList.

The reserved_for_future_use of 16 bits is prepared after the length.

The SubPath_type is a field of eight bits indicating the type of application of the Sub Path. The SubPath_type is used when the Sub Path indicates a type such as audio, bitmap caption, text caption, or the like.

The reserved_for_future_use of 15 bits is prepared after the SubPath_type.

The is_repeat_SubPath is a field of one bit specifying the reproduction method of the Sub Path, and indicates whether to repeatedly perform the reproduction of the Sub Path, or whether to perform the reproduction of the Sub Path only once during the reproduction of the Main Path. For instance, it is used when the reproduction timing of the Clip referenced by the Main Path and the Clip referenced by the Sub Path differ (when using with the Main Path as a path of slide show of still images, and the Sub Path as a path of audio that is BGM).

The reserved_for_future_use of eight bits is prepared after the Is_repeat_SubPath.

The number_of_SubPlayItems is a field of eight bits indicating the number of SubPlayItems (number of entries) in one Sub Path. For instance, the number_of_SubPlayItems of the SubPlayItem of the SubPath_id=0 of FIG. 23 is one, and the number_of_SubPlayItems of the SubPlayItem of the SubPath_id=1 is two. The SubPlayItem( ) is referenced by the number of SubPlayItems in the following for sentence.

FIG. 28 is a view showing the syntax of the SubPlayItem(i) of FIG. 27.

The length is an integer without sign of 16 bits indicating the number of bytes from immediately after the length field to the end of Sub playItem( ).

The SubPlayItem(i) of FIG. 28 is described divided for a case in which the SubPlayItem references one Clip and a case in which the SubPlayItem references a plurality of Clips.

A case in which the SubPlayItem references one Clip will be described.

The Clip_Information_file_name[0] represents the name of the Clip Information file of the Clip referenced by the SubPlayItem.

The Clip_codec_identifier[0] represents the codec method of the Clip. The reserved_for_future_use is arranged after the Clip_codec_identifier[0].

The is_multi_Clip_entries is a flag indicating the presence or absence of registration of the multi-Clip. When the flag of the is_multi_Clip_entries is ON, the syntax of when the SubPlayItem references a plurality of Clips is referenced.

The ref_to_STC_id[0] is information related to the STC discontinuous point (discontinuous point of the system time base).

The SubPlayItem_IN_time represents the start position of the reproduction interval of the Sub Path, and the SubPlayItem_OUT_time represents the end position.

The sync_PlayItem_id and the sync_start_PTS_of_PlayItem represent the time in which the Sub Path starts the reproduction on the time axis of the Main Path.

The SubPlayItem_IN_time, the SubPlayItem_OUT_time, the sync_PlayItem_id, and the sync_start_PTS_of_PlayItem are commonly used in the Clip referenced by the SubPlayItem.

A case in which "if (is_multi_Clip_entries==1b", and the SubPlayItem references a plurality of Clips will be described.

The num_of_Clip_entries represents the number of Clips to be referenced. The number of Clip_Information_file_name [SubClip_entry_id] specifies the number of Clips excluding the Clip_Information_file_name[0].

The Clip_codec_identifier[SubClip_entry_id] represents the codec method of the Clip.

The ref_to_STC_id[SubClip_entry_id] is information related to the STC discontinuous point (discontinuous point of the system time base). The reserved_for_future_use is provided after the ref_to_STC_id[SubClip_entry_id].

FIG. 29 is a view showing the syntax of the PlayItem( ) of FIG. 26.

The length is an integer without sign of 16 bits indicating the number of bytes from immediately after the length field to the end of PlayItem( ).

The Clip_Information_file_name[0] represents the name of the Clip Information file of the Clip referenced by the PlayItem. The file name of the mt2s file including the Clip, and the file name of the Clip Information file corresponding thereto contain the same five digit number.

The Clip_codec_identifier[0] represents the codec method of the Clip. The reserved_for_future_use is arranged after the Clip_codec_identifier[0]. The is_multi_angle, and the connection_condition are provided after the reserved_for_future_use.

The ref_to_STC_id[0] is information related to the STC discontinuous point (discontinuous point of the system time base).

The IN_time represents the start position of the reproduction interval of the PlayItem, and the OUT_time represents the end position.

The UO_mask_table( ), the PlayItem_random_access_mode, and the still_mode are provided after the OUT_time.

The STN_table( ) includes information of the AV stream referenced by the target PlayItem. If the Sub Path to be reproduced in association with the target PlayItem is present, information of the AV stream referenced by the SubPlayItem configuring such Sub Path is also included.

FIG. 30 is a view showing the syntax of the STN_table( ) of FIG. 29.

The STN_table( ) is set as an attribute of the PlayItem.

The length is an integer without sign of 16 bits indicating the number of bytes from immediately after the length field to the end of STN_table( ). The reserved_for_future_use of 16 bits is prepared after the length.

The number_of_video_stream_entries represents the number of streams to be given the video_stream_id entered (registered) in the STN_table( ).

The video_stream_id is information for identifying the video stream. For instance, the Base view video stream is specified by such video_stream_id.

The ID of the Dependent view video stream may be defined in the STN_table( ) or may be obtained through calculation such as by adding a predetermined value to the ID of the Base view video stream.

The video_stream_number is a video stream number seen from the user that is used for video switching.

The number_of_audio_stream_entries represents the number of streams of the first audio stream to be given the audio_stream_id entered in the STN_table( ). The audio_stream_id is information for identifying the audio stream, and the audio_stream_number is an audio stream number seen from the user that is used for audio switching.

The number_of_audio_stream2_entries represents the number of streams of the second audio stream to be given the audio_stream_id2 entered in the STN_table( ). The audio_stream_id2 is information for identifying the audio stream, and the audio_stream_number is an audio stream number seen from the user that is used for audio switching. In the example, the audio to be reproduced can be switched.

The number_of_PG_txtST_stream_entries represents the number of streams to be given the PG_txtST_stream_id entered in the STN_table( ). Here, the PG stream in which the bitmap caption is run-length encoded and the text caption file (txtST) are entered. The PG_txtST_stream_id is information for identifying the caption stream, and the PG_txtST_stream_number is a caption stream number seen from the user that is used for caption switching.

The number_of_IG_stream_entries represents the number of streams to be given the IG_stream_id entered in the STN_table( ). Here, the IG stream is entered. The IG_stream_id is information for identifying the IG stream, and the IG_stream_number is a graphics stream number seen from the user that is used for graphics switching.

The IDs of the Main TS and the Sub TS are also registered in the STN_table( ). The fact that the ID is the ID of the TS and not the elementary stream is described in the stream_attribute( ).

[Specific Example of PlayList]

FIG. 31 is a view showing a specific example of the 3D_PlayList, which is the PlayList for 3D reproduction.

The number representing the number of rows and ":" are shown on the left side of FIG. 31 for the sake of convenience of explanation. The number and the ":" do not configure the 3D_PlayList.

The number_of_PlayItems of the second row corresponds to the number_of_PlayItems of FIG. 26, and represents the number of PlayItems in the 3D_PlayList. The second row to the eighth row are descriptions related to the PlayItem. In other words, the third row to the eighth row correspond to the description on the PlayItem using the for sentence of FIG. 26.

The ref_to_B_clpi_file_name of the fifth row corresponds to the Clip_Information_file_name[0] of FIG. 29, and represents a five digit number excluding the extension ".m2ts" of the file names of the m2ts files storing the Base view video streams. This description specifies the m2ts file to be referenced and the clpi file of the Clip of the Base view video.

The type of the sixth row represents the type of arrangement of the data of the Base view video and the D1/D2 view video associated therewith on the optical disk 202. The type is set using the reserved_for_future_use following the Clip_codec_identifier[0] of FIG. 29.

FIG. 32 is a view showing the meaning of type.

If the value of type is 0, this means that the Base view video, the D1 view video, and the D2 view video are not interleaved.

In this case, the packet of both or one of the existing D1/D2 view video are multiplexed on one MPEG2-TS with the packet of the Base view video.

If the value of type is 1, this means that the Base view video, the D1 view video, and the D2 view video are all interleaved.

In this case, three TS, that is the first TS including the B view video, the second TS including the D1 view video, and the third TS including the D2 view video, are interleaved on the optical disk 202 in units of extents.

If the value of type is 2, this means that the Base view video and the D1 view video are interleaved.

In this case, two TS, that is the first TS including the packet of the B view video and the second TS including the packet of the D1 view video, are interleaved on the optical disk 202 in units of extents. The packet of the D2 view video may be multiplexed on the first TS. The packet of the D2 view video may be multiplexed on the second TS.

If the value of type is 3, this means that the Base view video and the D2 view video are interleaved.

In this case, two TS, that is the first TS including the packet of the B view video and the second TS including the packet of the D2 view video, are interleaved on the optical disk 202 in units of extents. The packet of the D1 view video may be multiplexed on the first TS. The second TS does not contain the packet of the D1 view video.

Returning back to the description of FIG. 31, the STN_table of the seventh row corresponds to STN_table( ) of FIG. 29. As described with reference to FIG. 30, the ID of each stream referenced in the 3D_PlayList is described in the STN_table.

The number_of_SubPaths of the ninth row corresponds to the number_of_SubPaths of FIG. 26, and represents the number of SubPaths in the 3D_PlayList. The ninth row to the fourteenth row are description on the SubPath. In other words, the tenth row to the fourteenth row correspond to the description on the SubPath using the for sentence of FIG. 26.

The SubPath_type of the twelfth row corresponds to the SubPath_type of FIG. 27, and represents the type of SubPath.

FIG. 33 is a view showing the meaning of SubPath_type.

Describing the main values of each value shown in FIG. 33, when the value of the SubPath_type is 8, this means that it is the sub path for reproducing the D1 view video.

When the value of the SubPath_type is 9, this means that it is the sub path for reproducing the D2 view video.

The ref_to_clpi_file_name of the thirteenth row of FIG. 31 corresponds to Clip_Information_file_name[0] of FIG. 28.

If such SubPath is for reproducing the D1 view video, the ref_to_clpi_file_name represents a five digit number excluding the extension ".m2ts" of the file names of the m2ts files storing the D1 view video. According to such description, the clpi file to be referenced is specified.

The ref_to_clpi_file_name of the thirteenth row represents a five digit number excluding the extension ".m2ts" of the file names of the m2ts files storing the D2 view video if the SubPath is for reproducing the D2 view video.

The sixteenth row to the thirtieth row are description related to the interleaved_file_info( ) that is, the ilvt file. For instance, the description related to the ilvt file is prepared using the reserved_for_future_use in the PlayItem( ), SubPath( ).

The seventeenth row to the twenty-second row are description referenced when the value of type of the sixth row is 1, and all of the Base view video, the D1 view video, and the D2 view video are interleaved.

The ref_to_D1-B_interleaved_file_name of the eighteenth row represents a five digit number excluding the extension ".ilvt" of the file names of the ilvt file for reproducing the Base view video and the D1 view video.

The ref_to_D2-B_interleaved_file_name of the nineteenth row represents a five digit number excluding the extension ".ilvt" of the file names of the ilvt file for reproducing the Base view video and the D2 view video.

The ref_to_D1_clpi_file_name of the twentieth row represents a five digit number excluding the extension ".m2ts" of the file names of the m2ts file storing the D1 view video. According to such description, the clpi file to be referenced when reproducing the m2ts file of the D1 view video is specified.

The ref_to_D2_clpi_file_name of the twenty-first row represents a five digit number excluding the extension ".m2ts" of the file names of the m2ts file storing the D2 view video. According to such description, the clpi file to be referenced when reproducing the m2ts file of the D2 view video is specified.

The twenty-third row to the twenty-sixth row are description referenced when the value of type of the sixth row is 2, and the Base view video and the D1 view video are interleaved.

The ref_to_D1-B_interleaved_file_name of the twenty-fourth row represents a five digit number excluding the extension ".ilvt" of the file names of the ilvt file for reproducing the Base view video and the D1 view video.

The ref_to_D1_clpi_file_name of the twenty-fifth row represents a five digit number excluding the extension ".m2ts" of the file names of the m2ts file storing the D1 view video. According to such description, the clpi file to be referenced when reproducing the m2ts file of the D1 view video is specified.

The twenty-seventh row to the thirtieth row are description referenced when the value of type of the sixth row is 3, and the Base view video and the D2 view video are interleaved.

The ref_to_D2-B_interleaved_file_name of the twenty-eighth row represents a five digit number excluding the extension ".ilvt" of the file names of the ilvt file for reproducing the Base view video and the D2 view video.

The ref_to_D2_clpi_file_name of the twenty-ninth row represents a five digit number excluding the extension ".m2ts" of the file names of the m2ts file storing the D2 view video. According to such description, the clpi file to be referenced when reproducing the m2ts file of the D2 view video is specified.

Thus, the 3D_PlayList describes information capable of specifying the file name of the clpi file corresponding to the Clip AV stream for the D1 view video and the D2 view video when the data are interleaved on the optical disk 202.

[Configuration Example of Reproduction Device 201]

FIG. 34 is a block diagram showing a configuration example of the reproduction device 201.

A controller 251 executes a control program prepared in advance, and controls the entire operation of the reproduction device 201.

For instance, the controller 251 controls a disk drive 252 to read out the PlayList file for 3D reproduction. The controller 251 also reads out the Main TS and the Sub TS based on the ID registered in the STN_table, and provides the same to a decoder unit 256.

The disk drive 252 reads out data from the optical disk 202 according to the control by the controller 251, and outputs the read data to the controller 251, a memory 253, or the decoder unit 256.

The memory 253 appropriately stores data etc. desired when the controller 251 executes various types of processes.

A local storage 254 is configured by, for example, a HDD (Hard Disk Drive). The local storage 254 records D1/D2 view video stream, and the like downloaded from a server 272. The streams recorded in the local storage 254 are also appropriately provided to the decoder unit 256.

An Internet interface 255 communicates with the server 272 through a network 271 according to the control from the controller 251, and provides the data downloaded from the server 272 to the local storage 254.

Data for updating the data recorded in the optical disk 202 is downloaded from the server 272. The 3D reproduction of the content different from the content of the optical disk 202 can be implemented by using the downloaded D1/D2 view video stream along with the Base view video stream recorded in the optical disk 202. The content of the PlayList is also appropriately updated when the D1/D2 view video stream is downloaded.

The decoder unit 256 decodes the streams provided from the disk drive 252 or the local storage 254, and outputs the obtained video signal to the display device 203. The audio signal is also output to the display device 203 through a predetermined path.

An operation input unit 257 is configured by an input device such as a button, a key, a touch panel, a jog dial, or a mouse, and a reception unit for receiving signals such as infrared light transmitted from a predetermined remote commander. The operation input unit 257 detects the operation of the user, and provides the signal representing the content of the detected operation to the controller 251.

Figure 35:
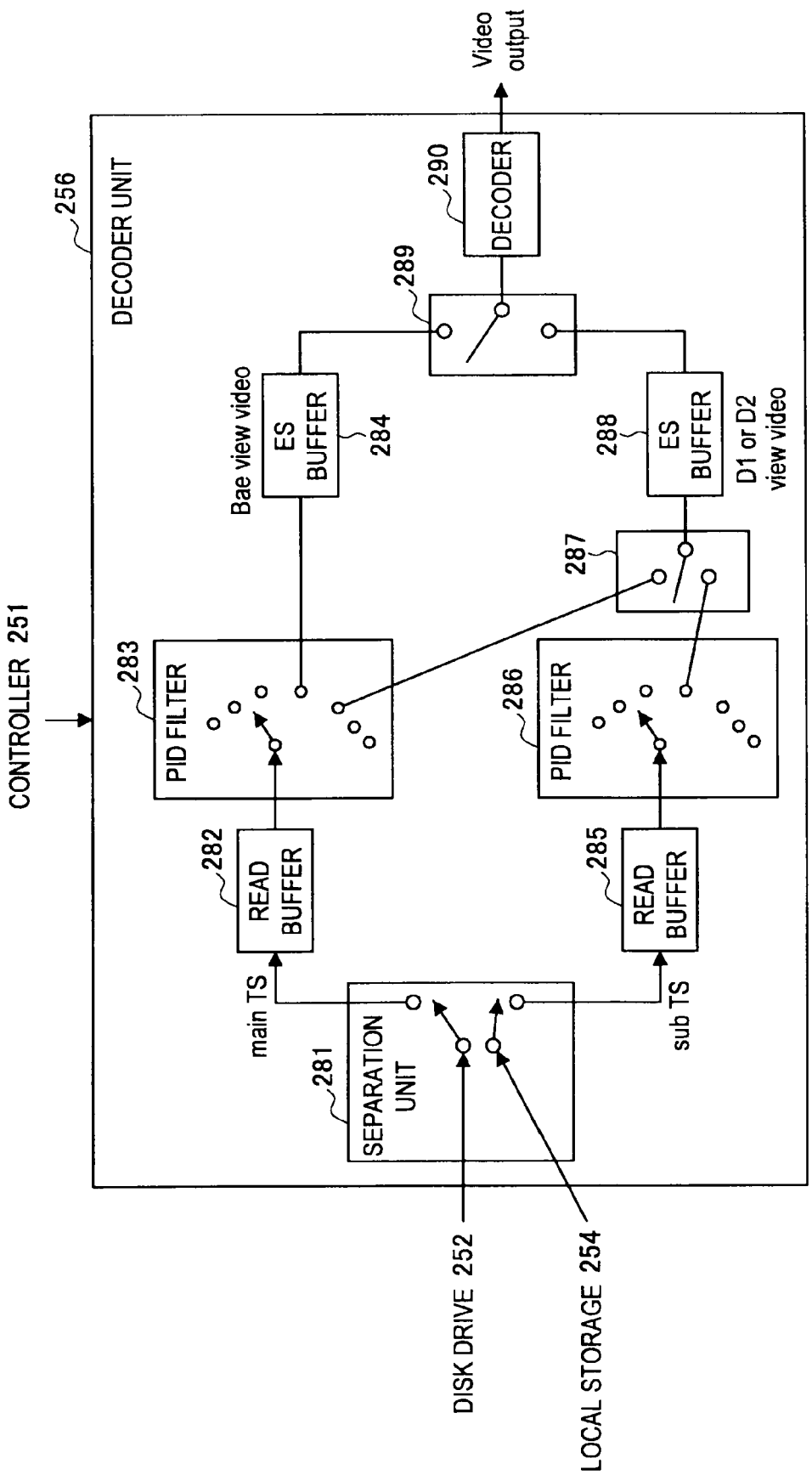
FIG. 35 is a view showing a configuration example of the decoder unit of FIG. 34.

FIG. 35 is a view showing a configuration example of the decoder unit 256.

A separation unit 281 separates the data provided from the disk drive 252 to the data of the packet configuring the Main TS and the data of the packet configuring the Sub TS according to the control by the controller 251. For instance, the TS read out from the optical disk 202 based on the stream ID described in the STN_table( ) of the 3D PlayList file is provided to the separation unit 281.

The separation unit 281 outputs the separated packet configuring the Main TS to a read buffer 282 and stores the same therein, and outputs the packet configuring the Sub TS to a read buffer 285 and stores the same therein.

The separation unit 281 outputs the packet configuring the Sub TS provided from the local storage 254 to the read buffer 285 and stores the same therein.

As described above, the D1/D2 view video downloaded from the server 272 is sometimes stored in the local storage 254. When reproduction with the Base view video recorded in the optical disk 202 is instructed, the D1/D2 view video stream serving as the Sub TS is read out from the local storage 254, and provided to the separation unit 281.

A PID filter 283 allocates the packets configuring the Main TS stored in the read buffer 282 based on the PID set to each packet. The PID of the packet configuring the Base view video, the PID of the packet configuring the D1 view video, and the PID of the packet configuring the D2 view video are respectively specified from the controller 251.

The PID filter 283 reads out the packets of the Base view video contained in the Main TS from the read buffer 282, and outputs and stores the same in an ES buffer 284. The ES buffer 284 stores an ES (Elementary Stream) including the packet of the Base view video.

If the packets of the D1/D2 view video are multiplexed in the Main TS, the PID filer 283 extracts such packets based on the PID, and outputs to a switch 287.

A PID filter 286 reads out the packets of the D1/D2 view video contained in the Sub TS from the read buffer 285, and outputs to the switch 287.

Only processes on the video streams of the Base view video and the D1/D2 view video have been described herein, but graphics data such as PG and IG are sometimes multiplexed in the Main TS, as described with reference to FIG. 19. Similarly, caption data and graphics data are sometimes multiplexed in addition to the D1/D2 view video in the Sub TS, as described with reference to FIG. 20.

The PID filter 283 and the PID filter 286 appropriately allocate the data based on the PID, and output the same to a predetermined output destination. An encoder for encoding the graphics data, and the like are to be connected to a terminal (circle) at the output destination shown in the blocks of the PID filter 283 and the PID filter 286 of FIG. 35.

The switch 287 outputs the packets of the D1/D2 view video provided from the PID filter 283 to the ES buffer 288, and stores the same therein. The switch 287 outputs the packets of the D1/D2 view video provided from the PID filter 286 to the ES buffer 288, and stores the same therein. The ES buffer 288 stores the ES including the packets of the D1/D2 view video.

A switch 289 outputs the packet to be decoded, of the packet of the Base view video stored in the ES buffer 284 and the packet of the D1/D2 view video stored in the ES buffer 288, to the decoder 290. The time information such as DTS (Decoding Time Stamp) is set to the PES packet of the Base view video and the D1/D2 view video, and the readout from the buffer is carried out based on such time information.

The video decoder 290 decodes the packet provided from the switch 289, and outputs the data of the Base view video or the D1/D2 view video obtained through decoding.

[Example 1 of 3D_PlayList]

FIG. 36 is a view showing an example of the 3D_PlayList.

The 3D_PlayList described in the PlayList file of "0000.mpls" of FIG. 36 is a PlayList for managing the reproduction of the optical disk 202 in which the Base view video, the D1 view video, and the D2 view video are all interleaved. In other words, the value of type is 1.

In the example of FIG. 36, ref_to_B_clpi_file_name of PlayItem( ) is "00001". According to such description, referencing the clpi file of "00001.clpi" of FIG. 24 is specified when reproducing the "00001.m2ts" that is the m2ts file of the Base view video.

The SubPath_type of the SubPath( )[1] is "9". If the SubPath_type is "9", this means that the first SubPath is a sub path for reproducing the D2 view video.

The ref_to_clpi_file_name of SubPath( )[1] is "00002". According to such description, referencing the clpi file of "00002.clpi" of FIG. 24 is specified when reproducing the D2 view video.

The SubPath_type of the SubPath( )[2] is "8". If the SubPath_type is "8", this means that the second SubPath is a sub path for reproducing the D1 view video.

The ref_to_clpi_file_name of SubPath( )[2] is "00003". According to such description, referencing the clpi file of "00003.clpi" of FIG. 24 is specified when reproducing the D1 view video.

The ref_to_D1-B_interleaved_file_name of the interleaved_file_info( ) is "10000". According to such description, referencing the ilvt file of "10000.ilvt" of FIG. 24 is specified when performing the D1-B reproduction.

The ref_to_D2-B_interleaved_file_name of the interleaved_file_info( ) is "20000". According to such description, referencing the ilvt file of "20000.ilvt" of FIG. 24 is specified when performing the D2-B reproduction.

The ref_to_D1_clpi_file_name is "00003". According to such description, referencing the file of "00003.clpi" of FIG. 24 is specified when reproducing the D1 view video.

The ref_to_D2_clpi_file_name is "00002". According to such description, referencing the file of "00002.clpi" of FIG. 24 is specified when reproducing the D2 view video.

FIG. 37 is a view showing the syntax of the clpi file used with the 3D_PlayList of FIG. 36.

FIG. 37A is a view showing an example of the clpi file of "00001.clpi". As described above, the clpi file of "00001.clpi" is a file to be referenced when reproducing the "00001.m2ts", which is the m2ts file of the Base view video.

The number_of_source_packets1 represents the number of source packets contained in the m2ts file of "00001.m2ts".

The EP_map represents the positional information of the entry point (EP) in the TS contained in the m2ts file of "00001.m2ts".

The chunk_map( ) represents the Source Packet Number (SPN) representing the start position of each chunk in order from the head chunk for the TS contained in the m2ts file of "00001.m2ts".

A chunk is a collection of Source packets belonging to one TS and being continuously arranged on the optical disk 202. Here, description will be made with one chunk corresponding to one extent arranged on the optical disk 202.

The chunk_map( ) represents the length of each chunk. Specific examples of the chunk_map( ) will be described later.

FIG. 37B is a view showing an example of the clpi file of "00002.clpi". The clpi file of "00002.clpi" is a file to be referenced when reproducing the D2 view video.

FIG. 37C is a view showing an example of the clpi file of "00003.clpi". The clpi file of "00003.clpi" is a file to be referenced when reproducing the D1 view video. The description content of FIGS. 37B and 37C is the same as that of FIG. 37A.

Figure 38:
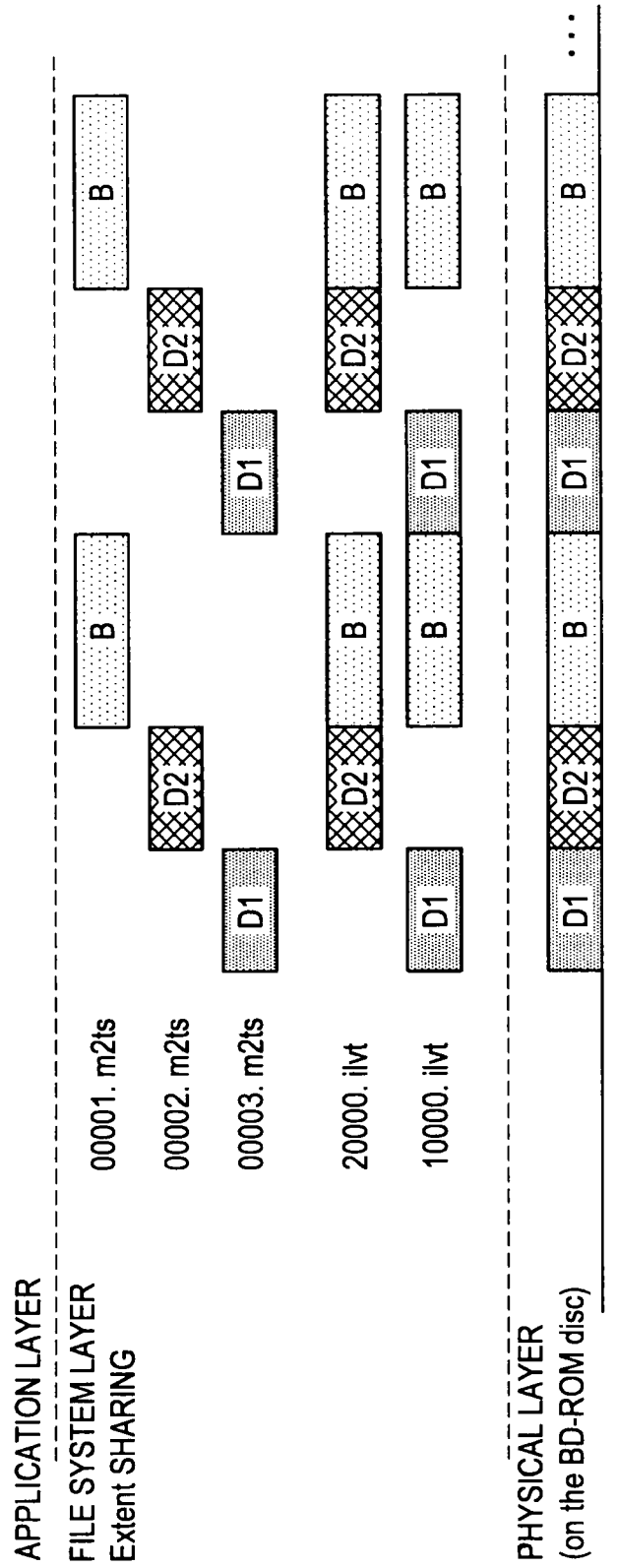
FIG. 38 is a view showing an idea of file management performed using the data of FIGS. 36 and 37.

FIG. 38 is a view showing an idea of file management performed using the data of FIGS. 36 and 37.

As shown in FIG. 38, the file management is performed in a form of three-layer structure of a physical layer, a file system layer, and an application layer. The 3D_PlayList of FIG. 36 and the clpi file of FIG. 36 are information of the application layer.

The physical layer is a layer of the optical disk 202 recorded with all of the Base view video, the D1 view video, and the D2 view video in the interleaved state.

In the example of FIG. 38, the chunk of the D1 view video, the chunk of the D2 view video, and the chunk of the Base view video are arranged in such order. In FIG. 38, the block with the character "B" represents the chunk of the Base view video, and the block with the character "D1" represents the chunk of the D1 view video. The block with the character "D2" represents the chunk of the D2 view video.

Thus, each extent (chunk) of the Base view video, the D1 view video, and the D2 view video is arranged in an interleaved manner on the optical disk 202. As described above, the interleave arrangement means a periodic arrangement in which the extent of the same type of stream is not adjacent.

In the file system layer, the stream file (m2ts file, ilvt file) specified by the application with the file name and each chunk on the optical disk 202 are corresponded. The file system is, for example, UDF file system.

As shown in FIG. 38, the m2ts file of "00001.m2ts" is configured by the chunk of the Base view video arranged on the optical disk 202.

The m2ts file of "00002.m2ts" is configured by the chunk of the D2 view video arranged on the optical disk 202.

The m2ts file of "00003.m2ts" is configured by the chunk of the D1 view video arranged on the optical disk 202.

The file of "20000.ilvt" is configured by the chunk of the D2 view video and the chunk of the Base view video arranged on the optical disk 202.

The file of "10000.ilvt" is configured by the chunk of the D1 view video and the chunk of the Base view video arranged on the optical disk 202.

When "00001.m2ts" is specified and instruction to read out data is made from the application to perform the 2D reproduction, the chunk of the Base view video is read out according to the management by the file system.

When "10000.ilvt" is specified and instruction to read out data is made from the application to perform the B-D1 reproduction, the chunk of the D1 view video and the chunk of the Base view video are read out according to the management by the file system.

When "20000.ilvt" is specified and instruction to read out data is made from the application to perform the B-D2 reproduction, the chunk of the D2 view video and the chunk of the Base view video are read out according to the management by the file system.

[Operation Example 1]

Figure 39:
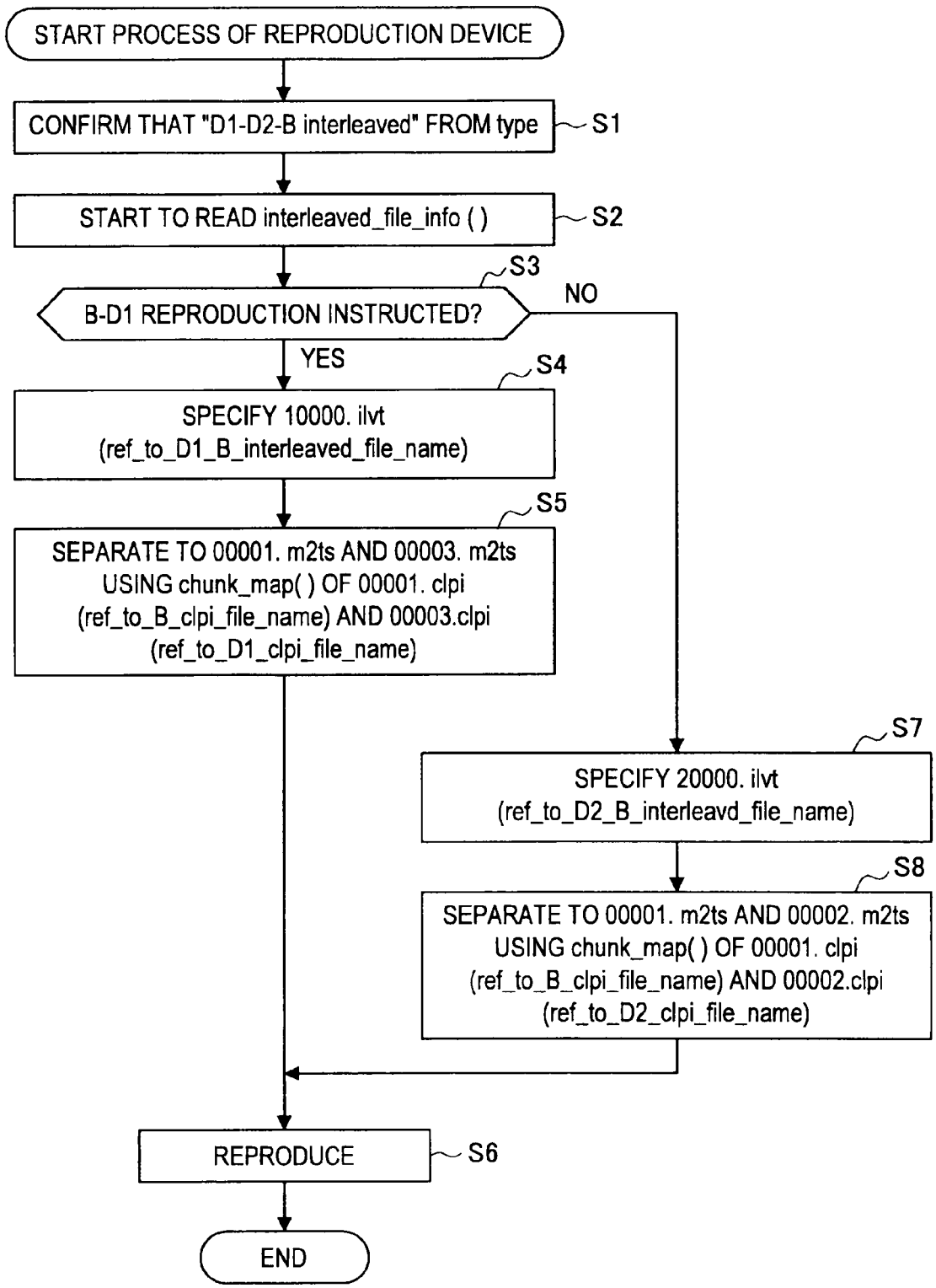
FIG. 39 is a flowchart describing the reproduction process performed according to the 3D_PlayList file of FIG. 36.

The reproduction process performed according to the 3D_PlayList file of FIG. 36 will be described with reference to the flowchart of FIG. 39.

In step S1, the controller 251 confirms from the value of type that the Base view video, the D1 view video, and the D2 view video are all interleaved.

In this case, the controller 251 starts to read the interleaved_file_info( ) in step S2.

In step S3, the controller 251 determines whether or not the B-D1 reproduction is instructed based on the operation by the user and the like.

When determining that the B-D1 reproduction is instructed in step S3, the controller 251 specifies "10000.ilvt" (ref_to_D1-B_interleaved_file_name) described in the interleaved_file_info( ) in step S4, and reads out the chunk of the Base view video and the chunk of the D1 view video from the optical disk 202 through the UDF file system.

The chunk of the Base view video and the chunk of the D1 view video read out by the disk drive 252 are provided to the separation unit 281 of the decoder unit 256.

In step S5, the separation unit 281 separates the provided data into the data of the m2ts file of "00001.m2ts" and the data of the m2ts file of "00003.m2ts" based on the chunk_map( ) of "00001.clpi" (ref_to_B_clpi_file_name) and the chunk_map( ) of "00003.clpi" (ref_to_D1_clpi_file_name) of FIG. 37. The separation unit 281 outputs the data of the m2ts file of "00001.m2ts" to the read buffer 282, and outputs the data of the m2ts file of "00003.m2ts" to the read buffer 285. The separation of data performed using the chunk_map( ) will be described later.

The data of the m2ts file of "00001.m2ts" stored in the read buffer 282 is provided to the decoder 290 through the PID filter 283, the ES buffer 284, and the switch 289. The data of the m2ts file of "00003.m2ts" stored in the read buffer 285 is provided to the decoder 290 through the PID filter 286, the switch 287, the ES buffer 288, and the switch 289.

In step S6, the decoder 290 decodes (reproduces) the packets sequentially provided from the switch 289.

When determining that the B-D1 reproduction is not instructed, that is, the B-D2 reproduction is instructed in step S3, the controller 251 specifies "20000.ilvt" (ref_to_D2-B_interleaved_file_name) described in the interleaved_file_info( ) in step S7, and reads out the chunk of the Base view video and the chunk of the D2 view video from the optical disk 202 through the UDF file system.

In step S8, the separation unit 281 separates the provided data into the data of the m2ts file of "00001.m2ts" and the data of the m2ts file of "00002.m2ts" based on the chunk_map( ) of "00001.clpi" (ref_to_B_clpi_file_name) and the chunk_map( ) of "00002.clpi" (ref_to_D2_clpi_file_name). The separation unit 281 outputs the data of the m2ts file of "00001.m2ts" to the read buffer 282, and outputs the data of the m2ts file of "00002.m2ts" to the read buffer 285.

Thereafter, the data of the m2ts file of "00001.m2ts" and the data of the m2ts file of "00002.m2ts" are provided to the decoder 290, similarly to the B-D1 reproduction, and reproduced in step S6.

[Separation of Data Using Chunk_Map( )]

FIG. 40 is a view showing an example of the syntax of the chunk_map( ).

The number_of_chunks represents the number of chunks to be referenced. After the number_of_chunks, the information on the chunk is described for the number specified thereat.

The SPN_chunk_start[i] represents the SPN (length) from the position of reference to the start position of each chunk, with the start position of the head chunk as a reference. The SPN to the start position of each chunk is described in order from that of the head chunk.

FIG. 41 is a view showing a specific example of the chunk_map( ).

FIG. 41A is the chunk_map( ) described in the clpi file of the "00001.clpi", where the number_of_chunks is n.

The SPN_chunk_start[i] is 0, c1, c2, . . . , cn.

Figure 42:
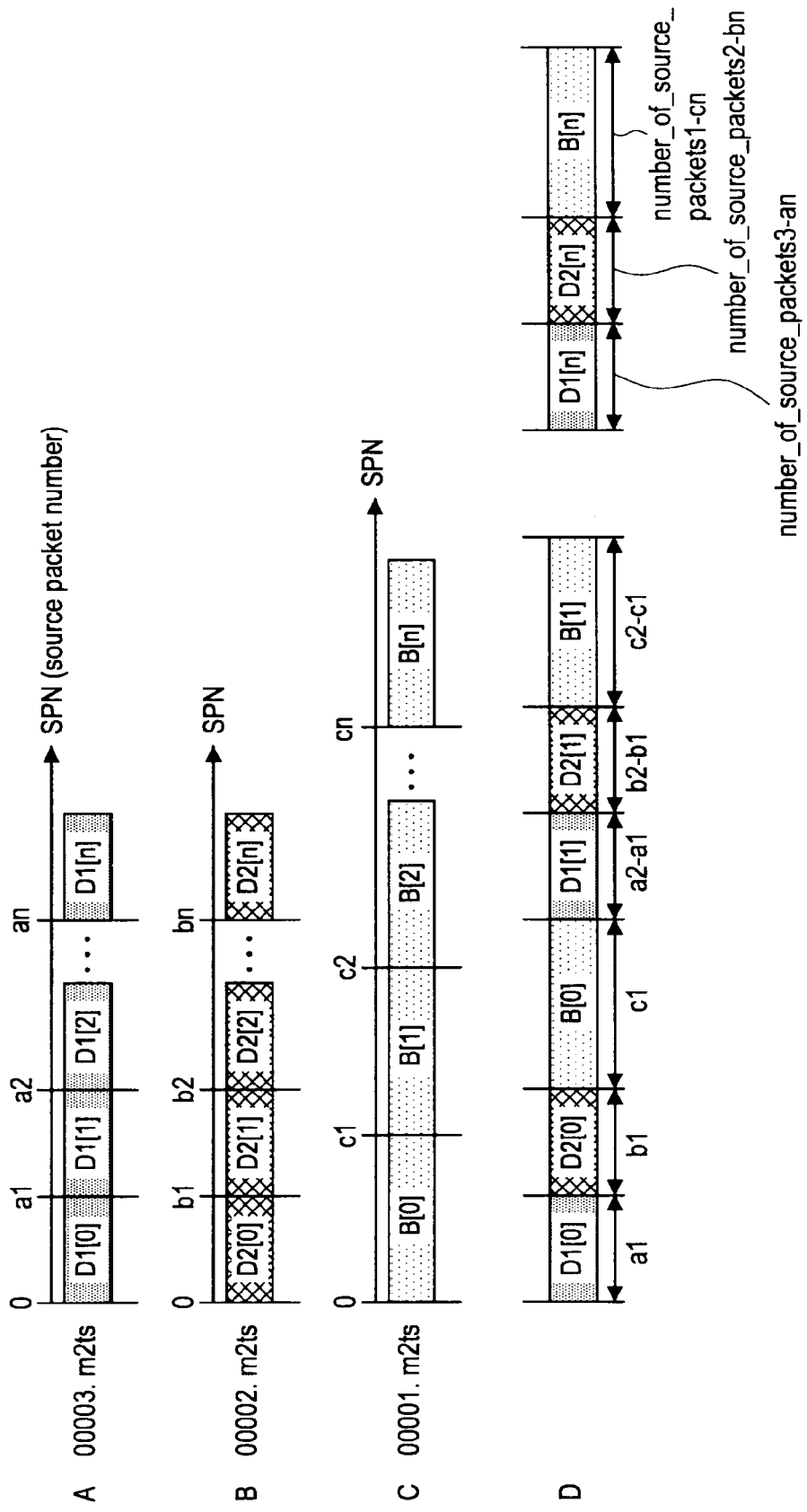
FIG. 42 is a view showing the separation of chunks.

As shown in FIG. 42C, the first value 0 represents that the SPN from the position of reference to the start position of the first chunk (B[0]) is 0, with the start position of the head chunk of the Base view video contained in the m2ts file of "00001.m2ts" as the reference.

The second value c1 represents that the SPN from the position of reference to the start position of the second chunk (B[1]) is c1.

The third value c2 represents that the SPN from the position of reference to the start position of the third chunk (B[2]) is c2.

The n+1$^{th}$ value cn represents that the SPN from the position of reference to the start position of the n+1$^{th}$ chunk (B[n]), which is the last chunk, is cn.

FIG. 41B is the chunk_map( ) described in the clpi file of the "00002.clpi", where the number_of_chunks is n.

The SPN_chunk_start[i] is 0, b1, b2, . . . , bn.

As shown in FIG. 42B, the first value 0 represents that the SPN from the position of reference to the start position of the first chunk (D2[0]) is 0, with the start position of the head chunk of the D2 view video contained in the m2ts file of "00002.m2ts" as the reference.

The second value b1 represents that the SPN from the position of reference to the start position of the second chunk (D2[1]) is b1.

The third value b2 represents that the SPN from the position of reference to the start position of the third chunk (D2[2]) is b2.

The n+1$^{th}$ value bn represents that the SPN from the position of reference to the start position of the n+1$^{th}$ chunk (D2[n]), which is the last chunk, is bn.

FIG. 41C is the chunk_map( ) described in the clpi file of the "00003.clpi", where the number_of_chunks is n.

The SPN_chunk_start[i] is 0, a1, a2, . . . , an.

As shown in FIG. 42A, the first value 0 represents that the SPN from the position of reference to the start position of the first chunk (D1[0]) is 0, with the start position of the head chunk of the D1 view video contained in the m2ts file of "00003.m2ts" as the reference.

The second value a1 represents that the SPN from the position of reference to the start position of the second chunk (D1[1]) is a1.

The third value a2 represents that the SPN from the position of reference to the start position of the third chunk (D1[2]) is a2.

The n+1$^{th}$ value an represents that the SPN from the position of reference to the start position of the n+1$^{th}$ chunk (D1[n]), which is the last chunk, is an.

As shown in FIG. 42D, D1[i], D2[i], B[i] are periodically arranged on the optical disk 202 in such order.

When the data read out from the optical disk 202 is provided from the disk drive 252, the separation unit 281 separates the data worth SPN corresponding to a1 from the head of the provided data as D1[0] based on the description of three chunk_map( ) of FIG. 41.

The separation unit 281 separates the data worth SPN corresponding to b1 from the position at the end of D1[0] as D2[0], and separates the data worth SPN corresponding to c1 from the position at the end of D2[0] as B[0].

The separation unit 281 separates the data worth SPN corresponding to a2-a1 from the position at the end of B[0] as D1[1].

The separation unit 281 separates the data worth SPN corresponding to b2-b1 from the position at the end of D1[1] as D2[1], and separates the data worth SPN corresponding to c2-c1 from the position at the end of D2[1] as B[1].

The chunks to be separated are only D1[i], B[i] when performing the B-D1 reproduction, and only D2[i], B[i] when performing the B-D2 reproduction.

Thus, the separation of data by the separation unit 281 is performed using the information on the length of each chunk described in the chunk_map( ).

The chunk_map( ) will be complemented.

When type=0, the chunk_map( ) is optional (may not be present) for the clpi file referenced by the ref_to_B_clpi_file_name. If the chunk_map( ) is present, the player ignores such chunk_map( ).

The chunk_map( ) is optional (may not be present) for the clpi file corresponding to the m2ts file in the local storage 254. If the chunk_map( ) is present, the player ignores such chunk_map( ).

When type=1, the three TSs, that is the corresponding TS of the Base view video, the TS of the D1 view video, and the TS of the D2 view video, are divided into the same number n of chunks. In other words, the chunk of a set in which the value of subscript i is the same is divided to have the same reproduction time for the D1[i], D2[i], B[i] of FIG. 42.

Similarly, when type=2, the two TSs, that is the corresponding TS of the Base view video and the TS of the D1 view video, are divided into the same number n of chunks. In other words, the chunk of a set in which the value of subscript i is the same is divided to have the same reproduction time for the interleaved D1[i], B[i].

When type=3, the two TSs, the corresponding TS of the Base view video and the TS of the D2 view video, are divided into the same number n of chunks. In other words, the chunk of a set in which the value of subscript i is the same is divided to have the same reproduction time for the interleaved D2[i], B[i].

[Example 2 of 3D_PlayList]

FIG. 43 is a view showing another example of the 3D_PlayList.

The 3D_PlayList described in the PlayList file of "0000.mpls" of FIG. 43 is a PlayList for managing the reproduction of the optical disk 202 in which the Base view video and the D2 view video are interleaved. In other words, the value of type is 3.

The description of the 3D_PlayList of FIG. 43 is similar to the description of FIG. 36 except that the description of the SubPath is only the description of the SubPath that references the D2 view video, and that the description of the interleaved_file_info( ) is different.

In other words, the SubPath_type of the SubPath( ) is "9". If the SubPath_type is "9", this means that the SubPath is a sub path for reproducing the D2 view video.

Furthermore, the ref_to_clpi_file_name is "00002".

The ref_to_D2-B_interleaved_file_name of the interleaved_file_info( ) of FIG. 43 is "20000". According to such description, referencing the ilvt file of "20000.ilvt" of FIG. 24 is specified when performing the D2-B reproduction.

The ref_to_D2_clpi_file_name is "00002". According to such description, referencing the clpi file of "00002.clpi" of FIG. 24 is specified when reproducing the D2 view video.

FIG. 44 is a view showing the syntax of the clpi file used with the 3D_PlayList of FIG. 43.

FIG. 44A is a view showing an example of the clpi file of "00001.clpi", and FIG. 44B is a view showing an example of the clpi file of "00002.clpi". The EP_map and the description of the chunk_map( ) are contained in both clpi files.

Figure 45:
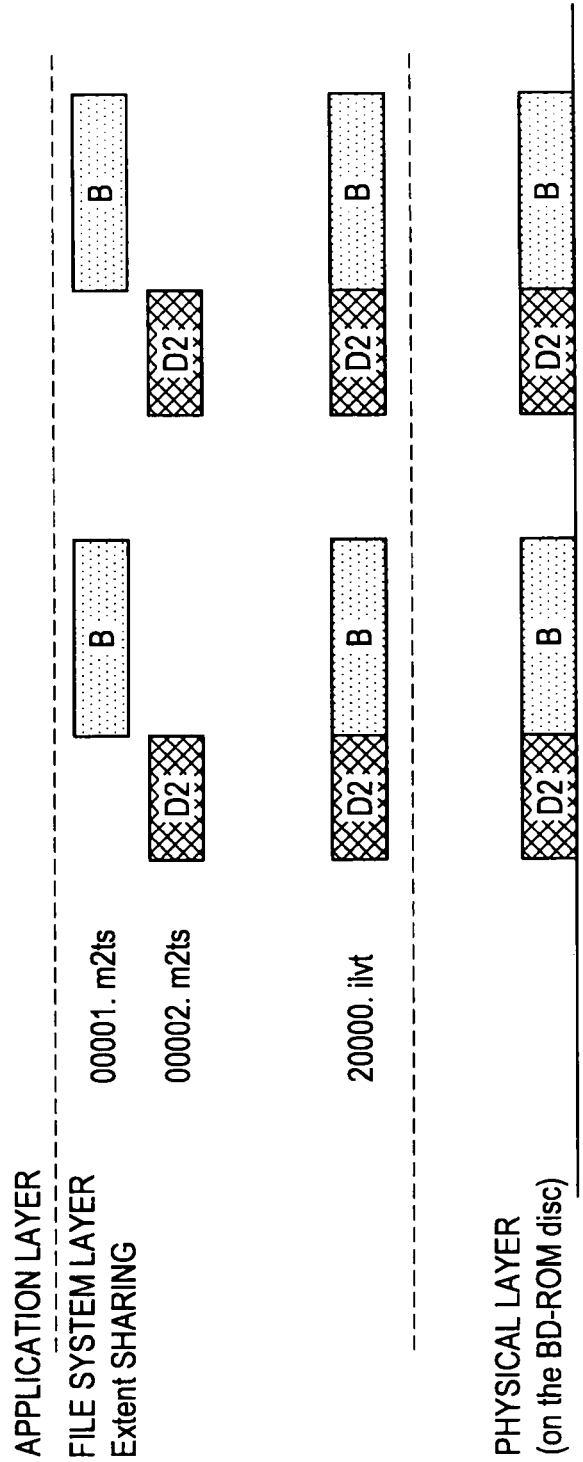
FIG. 45 is a view showing an idea of file management performed using the data of FIGS. 43 and 44.

FIG. 45 is a view showing an idea of file management performed using the data of FIGS. 43 and 44.

As shown in FIG. 45, the physical layer is a layer of the optical disk 202 recorded with the Base view video and the D2 view video in the interleaved state.

The m2ts file of "00001.m2ts" is configured by the chunk of the Base view video arranged on the optical disk 202.

The m2ts file of "00002.m2ts" is configured by the chunk of the D2 view video arranged on the optical disk 202.

The ilvt file of "20000.ilvt" is configured by the chunk of the D2 view video and the chunk of the Base view video arranged on the optical disk 202.

When "00001.m2ts" is specified and instruction to read out data is made from the application to perform the 2D reproduction, the chunk of the Base view video is read out according to the management by the file system.

When "20000.ilvt" is specified and instruction to read out data is made from the application to perform the B-D2 reproduction, the chunk of the D2 view video and the chunk of the Base view video are read out according to the management by the file system.

[Operation Example 2]

Figure 46:
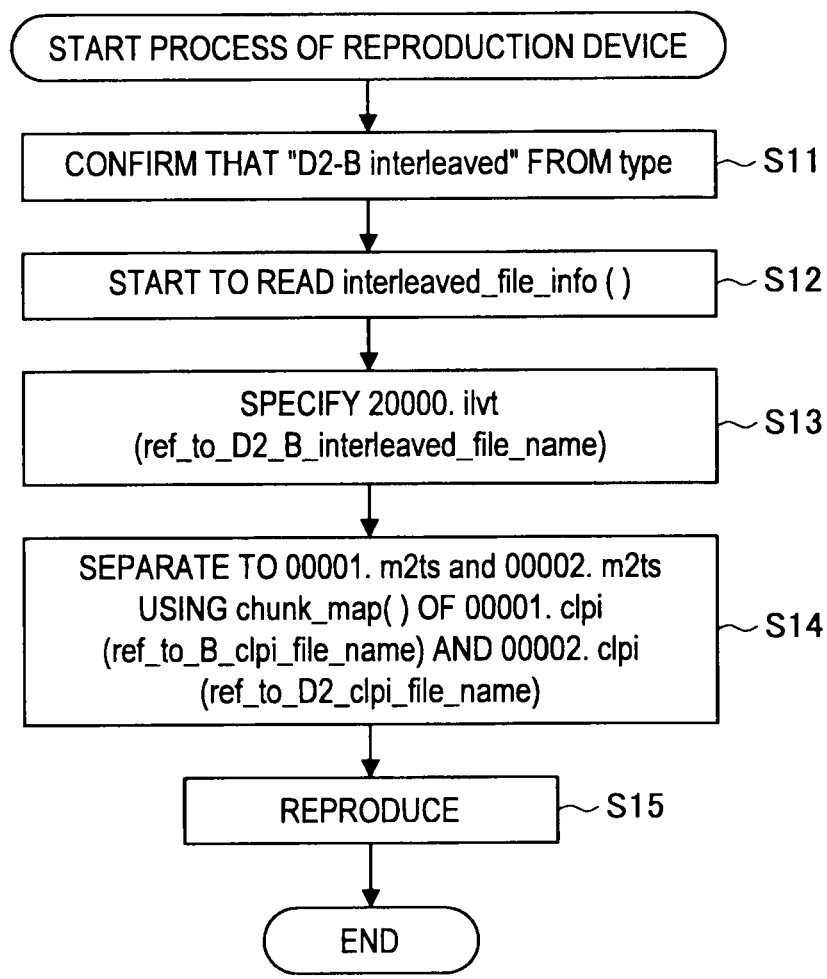
FIG. 46 is a flowchart describing the reproduction process performed according to the 3D_PlayList file of FIG. 43.

The reproduction process performed according to the 3D_PlayList file of FIG. 43 will be described with reference to the flowchart of FIG. 46.

In step S11, the controller 251 confirms from the value of type that the Base view video and the D2 view video are interleaved.

In this case, the controller 251 starts to read the interleaved_file_info( ) in step S12.

When the B-D2 reproduction is instructed, the controller 251 specifies "20000.ilvt" (ref_to_D2-B_interleaved_file_name) described in the interleaved_file_info( ) in step S13, and reads out the chunk of the Base view video and the chunk of the D2 view video from the optical disk 202 through the UDF file system.

The chunk of the Base view video and the chunk of the D2 view video read out by the disk drive 252 are then provided to the separation unit 281 of the decoder unit 256.

In step S14, the separation unit 281 separates the provided data to the data of the m2ts file of "00001.m2ts" and the data of the m2ts file of "00002.m2ts" based on the chunk_map( ) of "00001.clpi" (ref_to_B_clpi_file_name) and the chunk_map( ) of "00002.clpi" (ref_to_D2_clpi_file_name). The separation unit 281 outputs the data of the m2ts file of "00001.m2ts" to the read buffer 282, and outputs the data of the m2ts file of "00002.m2ts" to the read buffer 285.

The data of the m2ts file of "00001.m2ts" stored in the read buffer 282 is provided to the decoder 290 through the PID filter 283, the ES buffer 284, and the switch 289. The data of the m2ts file of "00002.m2ts" stored in the read buffer 285 is provided to the decoder 290 through the PID filter 286, the switch 287, the ES buffer 288, and the switch 289.

In step S15, the decoder 290 decodes the packets sequentially provided from the switch 289.

[Example 3 of 3D_PlayList]

FIG. 47 is a view showing another example of the 3D_PlayList.

The 3D_PlayList described in the PlayList file of "0000.mpls" of FIG. 47 is a PlayList for managing the reproduction of the Base view video, D2 view video recorded in the optical disk 202 and the D1 view video recorded in the local storage 254. The Base view video and the D2 view video are interleaved on the optical disk 202.

Since the type of arrangement of the data on the optical disk 202 is represented, the value of type of PlayItem( ) is 3.

The SubPath_type of the SubPath( )[1] is "9". If the SubPath_type is "9", this means that the first SubPath is a sub path for reproducing the D2 view video.

The ref_to_clpi_file_name of SubPath( )[1] is "00002". According to such description, referencing the clpi file of "00002.clpi" of FIG. 24 is specified when reproducing the D2 view video.

The SubPath_type of the SubPath( )[2] is "8". If the SubPath_type is "8", this means that the second SubPath is a sub path for reproducing the D1 view video.

The ref_to_clpi_file_name of SubPath( )[2] is "00003". According to such description, referencing the clpi file of "00003.clpi" recorded in the local storage 254 is specified when reproducing the D1 view video.

The description regarding the second SubPath is added when the D1 view video is downloaded.

The ref_to_D2-B_interleaved_file_name of the interleaved_file_info( ) is "20000". According to such description, referencing the ilvt file of "20000.ilvt" of FIG. 24 is specified when performing the B-D2 reproduction.

The ref_to_D2_clpi_file_name is "00002". According to such description, referencing the file of "00002.clpi" of FIG. 24 is specified when reproducing the D2 view video.

The ilvt file related to the D1 view video is not necessary since the D1 view video is not interleaved on the local storage 254.

FIG. 48 is a view showing the syntax of the clpi file used with the 3D_PlayList of FIG. 47.

FIG. 48A is a view showing an example of the clpi file of "00001.clpi", and FIG. 48B is a view showing an example of the clpi file of "00002.clpi". The EP_map and the description of the chunk_map( ) are contained in both clpi files.

Figure 49:
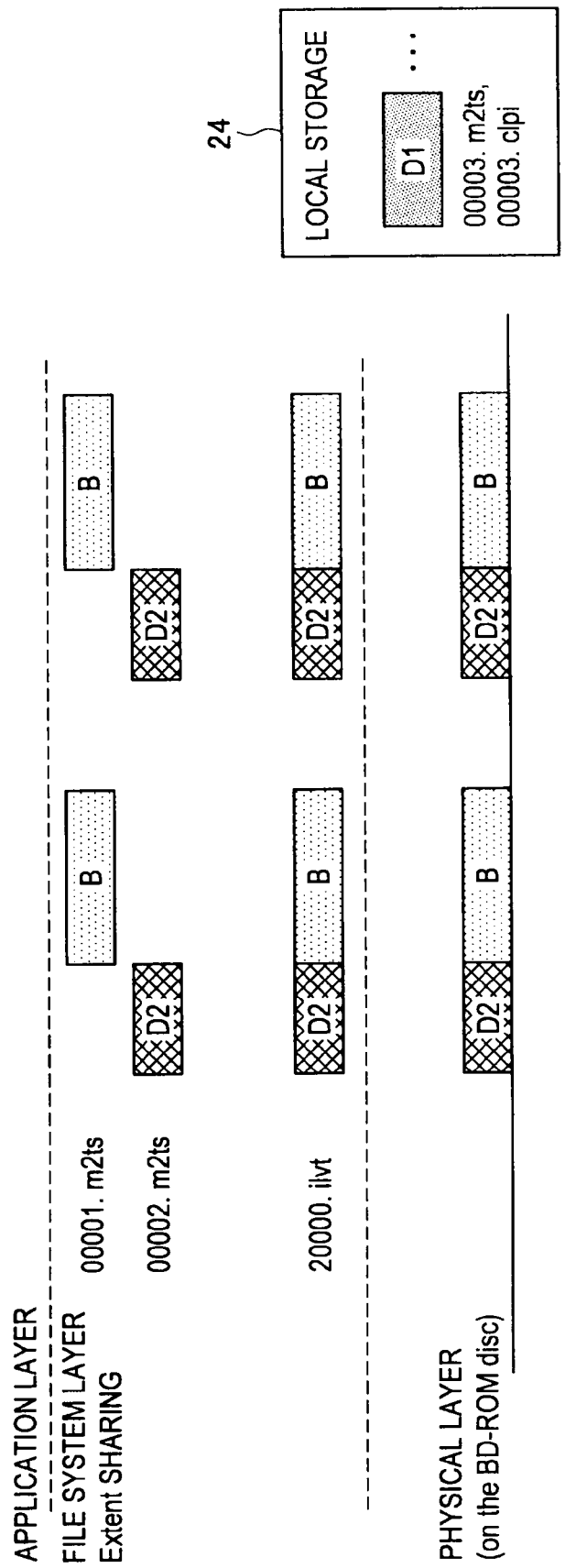
FIG. 49 is a view showing an idea of file management performed using the data of FIGS. 47 and 48.

FIG. 49 is a view showing an idea of file management performed using the data of FIGS. 47 and 48.

As shown in FIG. 49, the physical layer is a layer of the optical disk 202 recorded with the Base view video and the D2 view video in the interleaved state, and the local storage 254 recorded with the file of the D1 view video referenced by the second SubPath.

In the example of FIG. 49, the file name of the m2ts file storing the D1 view video is "00003.m2ts". The file name of the clpi file corresponding to "00003.m2ts" is "00003.clpi".

The m2ts file of "00001.m2ts" is configured by the chunk of the Base view video arranged on the optical disk 202.

The m2ts file of "00002.m2ts" is configured by the chunk of the D2 view video arranged on the optical disk 202.

The ilvt file of "20000.ilvt" is configured by the chunk of the D2 view video and the chunk of the Base view video arranged on the optical disk 202.

When "00001.m2ts" is specified and instruction to read out data is made from the application to perform the 2D reproduction, the chunk of the Base view video is read out according to the management by the file system.

When "00001.m2ts" is specified and instruction to read out data is made from the application to perform the B-D1 reproduction, the chunk of the Base view video is read out according to the management by the file system. The "00003.m2ts" is specified and the m2ts file of the D1 view video is read out from the local storage 254 according to the description on the second SubPath of the 3D_PlayList of FIG. 47.

When "20000.ilvt" is specified and instruction to read out data is made from the application to perform the B-D2 reproduction, the chunk of the D2 view video and the chunk of the Base view video are read out according to the management by the file system.

[Operation Example 3]

Figure 50:
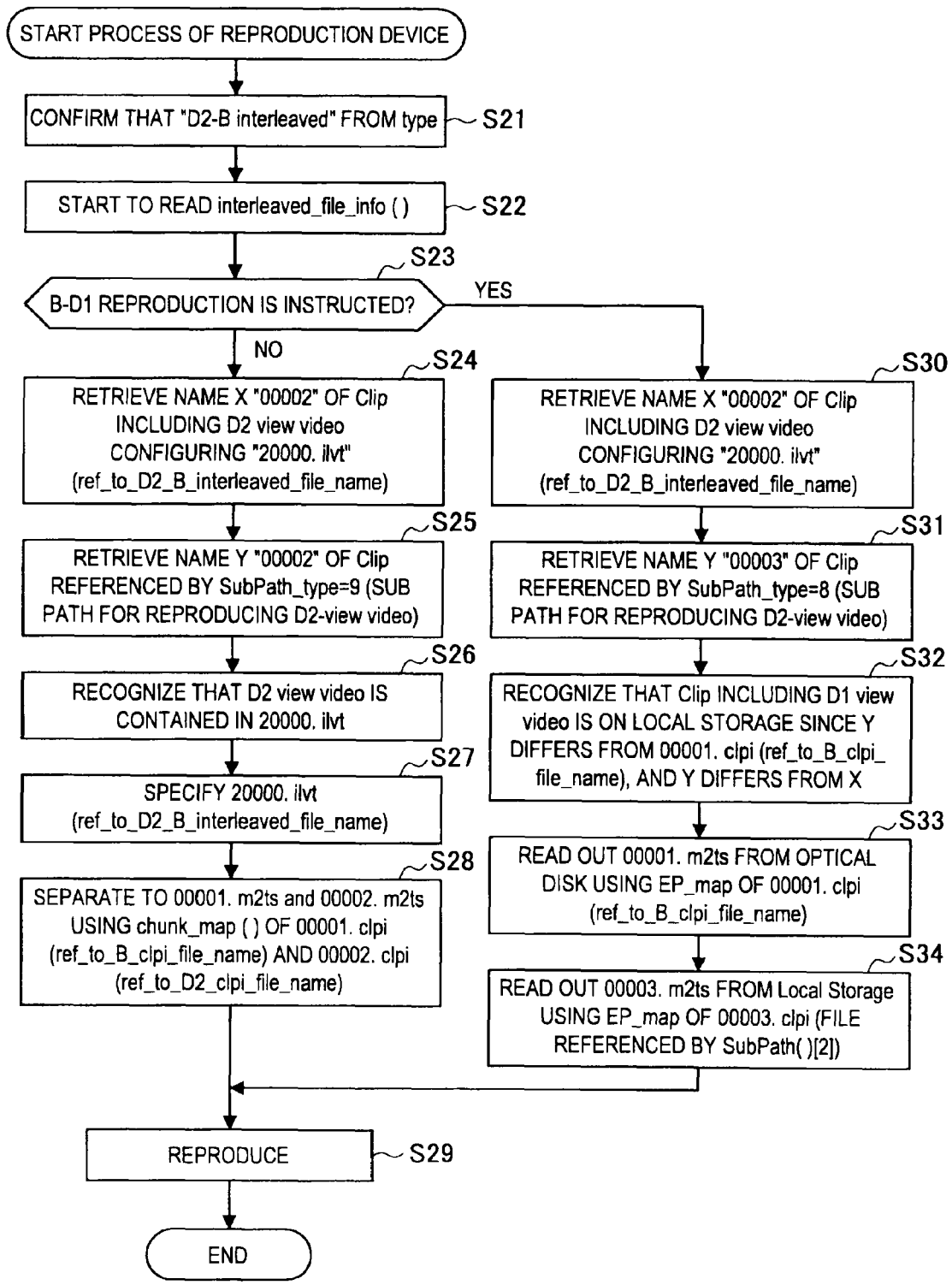
FIG. 50 is a flowchart describing the reproduction process performed according to the 3D_PlayList file of FIG. 47.

The reproduction process performed according to the 3D_PlayList file of FIG. 47 will be described with reference to the flowchart of FIG. 50.

In step S21, the controller 251 confirms from the value of type that the Base view video and the D2 view video are interleaved.

In this case, the controller 251 starts to read the interleaved_file_info( ) in step S22.

In step S23, the controller 251 determines whether or not the B-D1 reproduction is instructed.

When performing the B-D1 reproduction, the data recorded in the optical disk 202 and the data recorded in the local storage 254 are used. When performing the B-D2 reproduction, the data recorded in the optical disk 202 is used.

When determining that the B-D1 reproduction is not instructed, that is, the B-D2 reproduction is instructed in step S23, the controller 251 retrieves the name X "00002" (portion excluding the extension of the name of the m2ts file including the D2 view video) of the Clip including the D2 view video configuring "20000.ilvt" (ref_to_D2-B_interleaved_file_name) described in the interleaved_file_info( ) in step S24.

In step S25, the controller 251 retrieves the name Y "00002" of the Clip referenced by SubPath_type=9 (sub path for reproducing the D2-view video).

In step S26, the controller 251 recognizes that the D2 view video is contained in "20000.ilvt" since Y is the same as X. If Y and X are different, the Clip including the D2 view video is assumed to be in the local storage 254.

In step S27, the controller 251 specifies "20000.ilvt" (ref_to_D2-B_interleaved_file_name) described in the interleaved_file_info( ), and reads out the chunk of the Base view video and the chunk of the D2 view video from the optical disk 202 through the UDF file system.

The chunk of the Base view video and the chunk of the D2 view video read out by the disk drive 252 are provided to the separation unit 281 of the decoder unit 256.

In step S28, the separation unit 281 separates the provided data into the data of the m2ts file of "00001.m2ts" and the data of the m2ts file of "00002.m2ts" based on the chunk_map( ) of "00001.clpi" (ref_to_B_clpi_file_name) and the chunk_map( ) of "00002.clpi" (ref_to_D2_clpi_file_name). The separation unit 281 outputs the data of the m2ts file of "00001.m2ts" to the read buffer 282, and outputs the data of the m2ts file of "00002.m2ts" to the read buffer 285.

The data of the m2ts file of "00001.m2ts" stored in the read buffer 282 is provided to the decoder 290 through the PID filter 283, the ES buffer 284, and the switch 289. The data of the m2ts file of "00002.m2ts" stored in the read buffer 285 is provided to the decoder 290 through the PID filter 286, the switch 287, the ES buffer 288, and the switch 289.

In step S29, the decoder 290 decodes the packets sequentially provided from the switch 289.

When determined in step S23 that the B-D1 reproduction is instructed, the controller 251 retrieves the name X "00002" of the Clip including the D2 view video configuring "20000.ilvt" (ref_to_D2-B_interleaved_file_name) described in the interleaved_file_info( ) in step S30.

In step S31, the controller 251 retrieves the name Y "00003" of the Clip referenced by SubPath_type=8 (sub path for reproducing the D1-view video).

In step S32, the controller 251 recognizes that the Clip of the D1 view video is on the local storage 254 since Y differs from the portion excluding the extension of the "00001.clpi" (ref_to_B_clpi_file_name), and Y differs from X. If Y is the same as the portion excluding the extension of the "00001.clpi" or Y is the same as X, the D1 view video is assumed to be contained in "20000.ilvt".

In step S33, the controller 251 causes the disk drive 252 to read out the m2ts file of "00001.m2ts" using the EP_map of "00001.clpi" (ref_to_B_clpi_file_name). The EP_map of "00001.clpi" contains information on the entry point that becomes the decoding start position of the m2ts file of "00001.m2ts".

In step S34, the controller 251 reads out the m2ts file of "00003.m2ts" from the local storage 254 using the EP_map of "00003.clpi" (file referenced by SubPath( )[2]). The EP_map of "00003.clpi" contains information on the entry point that becomes the decoding start position of the m2ts file of "00003.m2ts".

The chunk of the Base view video and the chunk of the D1 view video that are read out are provided to the separation unit 281 of the decoder unit 256.

The data of the m2ts file of "00001.m2ts" read out from the optical disk 202 is stored in the read buffer 282, and then provided to the decoder 290 through the PID filter 283, the ES buffer 284, and the switch 289.

The data of the m2ts file of "00003.m2ts" read out from the local storage 254 is stored in the read buffer 285, and then provided to the decoder 290 through the PID filter 286, the switch 287, the ES buffer 288, and the switch 289.

In step S29, the decoder 290 decodes the packets sequentially provided from the switch 289.

[Method of Random-Access Reproducing "10000.ilvt" Using Chunk_Map( )]

FIG. 51 is a view collectively showing the content of the chunk_map( ) described with reference to FIG. 41.

FIG. 51 shows the SPN_chunk_start (SPN (length) from the position of reference) described in the chunk_map( ) of each clpi file when lined with i in the vertical direction.

FIG. 52 is a view showing the syntax of the EP_map( ) described in each clpi file with the chunk_map( ).

The EP_map( ) is referenced when specifying the decoding start position in performing the random access, and the like.

The number_of_EP_entries represents the number of EP (entry points).

The description after number_of_EP_entries is prepared for each EP. The PTS_EP_start[i] represents the PTS of the EP, and the SPN_EP_start[i] represents the SPN of the EP. The PTS and the SPN for each entry point are thus corresponded and registered in the EP_map.

Figure 53:
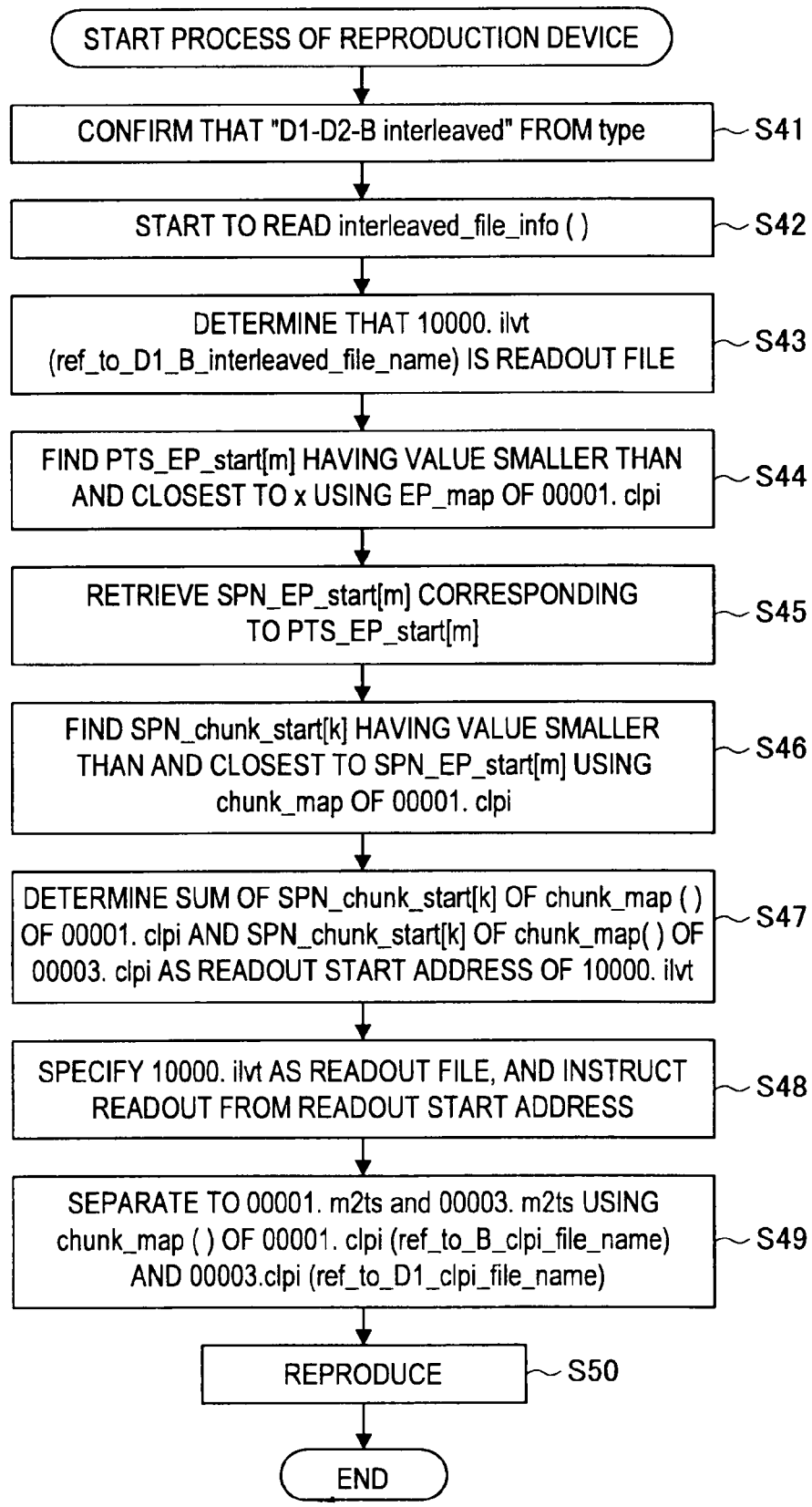
FIG. 53 is a flowchart describing the random access process of the reproduction device.

The process of the reproduction device 201 will now be described with reference to the flowchart of FIG. 53.

Here, a case in which the B-D1 reproduction is performed with reference to the 3D_PlayList of FIG. 36, and then the random access is performed will be described.

In step S41, the controller 251 confirms from the value of type that the Base view video, the D1 view video, and the D2 view video are all interleaved.

In this case, the controller 251 starts to read the interleaved_file_info( ) in step S42.

In step S43, the controller 251 determines that the "10000.ilvt" (ref_to_$D_1$-B_interleaved_file_name) described in the interleaved_file_info( ) is the readout file.

When starting the reproduction from time x of the 3D_PlayList file of "00000.mpls", the controller 251 finds the PTS_EP_start[m] having a value smaller than and closest to x using the EP_map of "00001.clpi" (ref_to_B_clpi_file_name) in step S44.

In step S45, the controller 251 retrieves the SPN_EP_start[m] corresponding to the PTS_EP_start[m]. As described with reference to FIG. 52, the PTS_EP_start[i] and the SPN_EP_start[i] are corresponded and registered in the EP_map.

Figure 54:
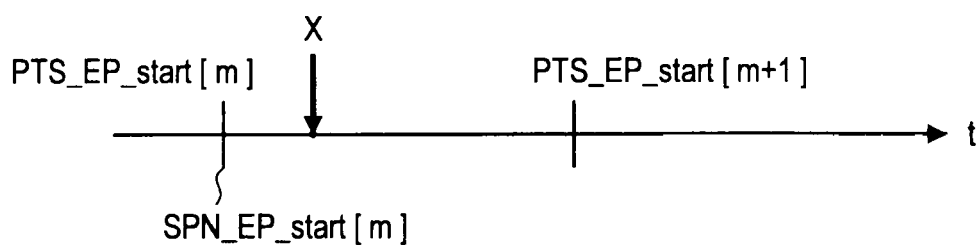
FIG. 54 is a view showing an example of a position specified by the processes of steps S44, S45.

FIG. 54 is a view showing an example of a position specified by the processes of steps S44, S45.

As shown in FIG. 54, when starting the reproduction from time x on the time axis, the PTS_EP_start[m] having a value smaller than and closest to x is specified in step S44. The SPN_EP_start[m] corresponding to the PTS_EP_start[m] is specified in step S45.

Figure 55:
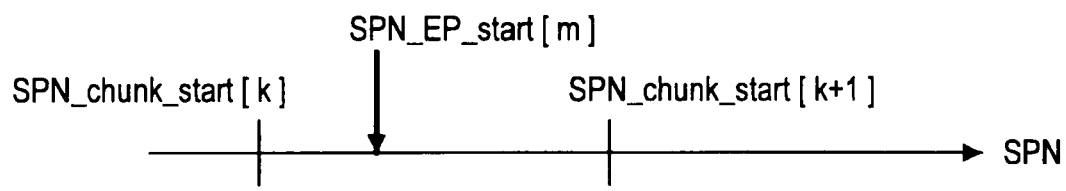
FIG. 55 is a view showing the SPN_chunk_start[k] specified by the process of step S46.

In step S46, the controller 251 finds the SPN_chunk_start [k] having a value smaller than and closest to the SPN_EP_start[m] using the chunk_map of "00001.clpi". The SPN_chunk_start[k] specified by the process of step S46 is shown in FIG. 55.

In step S47, the controller 251 determines the sum of the SPN_chunk_start[k] of the chunk_map( ) of "00001.clpi" and the SPN_chunk_start[k] of the chunk_map( ) of the "00003.clpi" (ref to D1_clpi_file_name) as the readout start address of "10000.ilvt".

The readout start address of "10000.ilvt" determined here is the start address of the chunk of D1[k] in "10000.ilvt".

In step S48, the controller 251 specifies the "10000.ilvt" (ref_to_D1-B_interleaved_file_name), and reads out the chunk of the Base view video and the chunk of the D1 view video from the address determined in step S47 through the UDF file system.

The chunk of the Base view video and the chunk of the D1 view video that are read out are provided to the separation unit 281 of the decoder unit 256.

In step S49, the separation unit 281 separates the provided data to the data of the m2ts file of "00001.m2ts" and the data of the m2ts file of "00003.m2ts" based on the chunk_map( ) of "00001.clpi" (ref_to_B_clpi_file_name) and the chunk_map( ) of "00003.clpi" (ref_to_D1_clpi_file_name). The separation unit 281 outputs the data of the m2ts file of "00001.m2ts" to the read buffer 282, and outputs the data of the m2ts file of "00003.m2ts" to the read buffer 285.

The data of the m2ts file of "00001.m2ts" stored in the read buffer 282 is provided to the decoder 290 through the PID filter 283, the ES buffer 284, and the switch 289. The data of the m2ts file of "00003.m2ts" stored in the read buffer 285 is provided to the decoder 290 through the PID filter 286, the switch 287, the ES buffer 288, and the switch 289.

In step S50, the decoder 290 decodes the packets sequentially provided from the switch 289.

The random access of the ilvt file is carried out as above.

[Regarding EP_Map]

The EP_map will now be described.

The EP_map of the Base view video will be described, but the EP_map is also similarly set for the D1/D2 view video. For instance, if the entry point is set to a certain picture of the Base view video, the entry point is also set to the corresponding picture of the D1/D2 view video.

The picture of the Base view video and the picture of the D1/D2 view video at the same position when the pictures of the respective streams are lined in the encoding order/decoding order or in the display order become the corresponding pictures.

Figure 56:
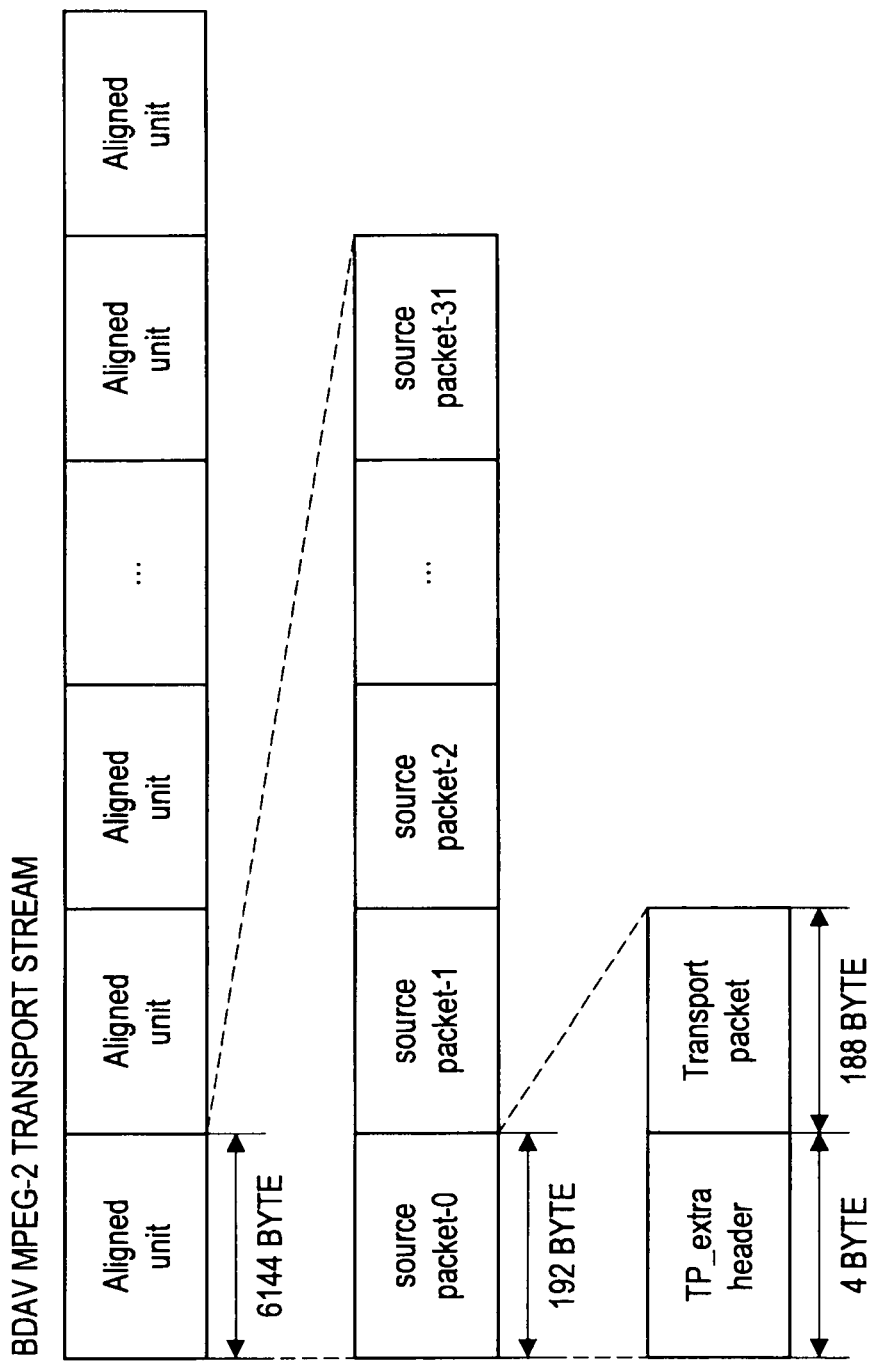
FIG. 56 is a view showing a structure of the AV stream recorded in the optical disk.

FIG. 56 is a view showing a structure of the AV stream recorded in the optical disk 202.

The TS including the Base view video stream is configured by an integer number of Aligned Units having a size of 6144 bytes.

The aligned unit includes 32 source packets (Source Packet). The source packet has 192 bytes. One source packet includes a transport packet extra header (TP_extra header) of four bytes and a transport packet (Transport packet) of 188 bytes.

The data of the Base view video is packetized to the MPEG2 PES packet. The PES packet header is added to the data portion of the PES packet to thereby form the PES packet. The PES packet header includes a stream ID for specifying the type of elementary stream transmitted by the PES packet.

The PES packet is further packetized to the transport packet. In other words, the PES packet is divided into the size of the payload of the transport packet, and the transport packet header is added to the payload to thereby form the transport packet. The transport packet header includes the PID, which is identification information of the data stored in the payload.

The source packet is given a source packet number that increases by one for every source packet with the head of the Clip AV stream as 0. The aligned unit starts from the first byte of the source packet.

The EP_map is used to search for the data address at which to start the readout of the data in the Clip AV stream file when the time stamp of the access point of the Clip is provided. The EP_map is a list of entry points extracted from the elementary stream and the transport stream.

The EP_map has address information for searching for the entry point at which to start decoding in the AV stream. One EP datum in the EP_map is configured by a pair of PTS and address in the AV stream of the Access Unite corresponding to the PTS. The data worth one picture is stored in one Access Unite in the AVC/H.264.

Figure 57:
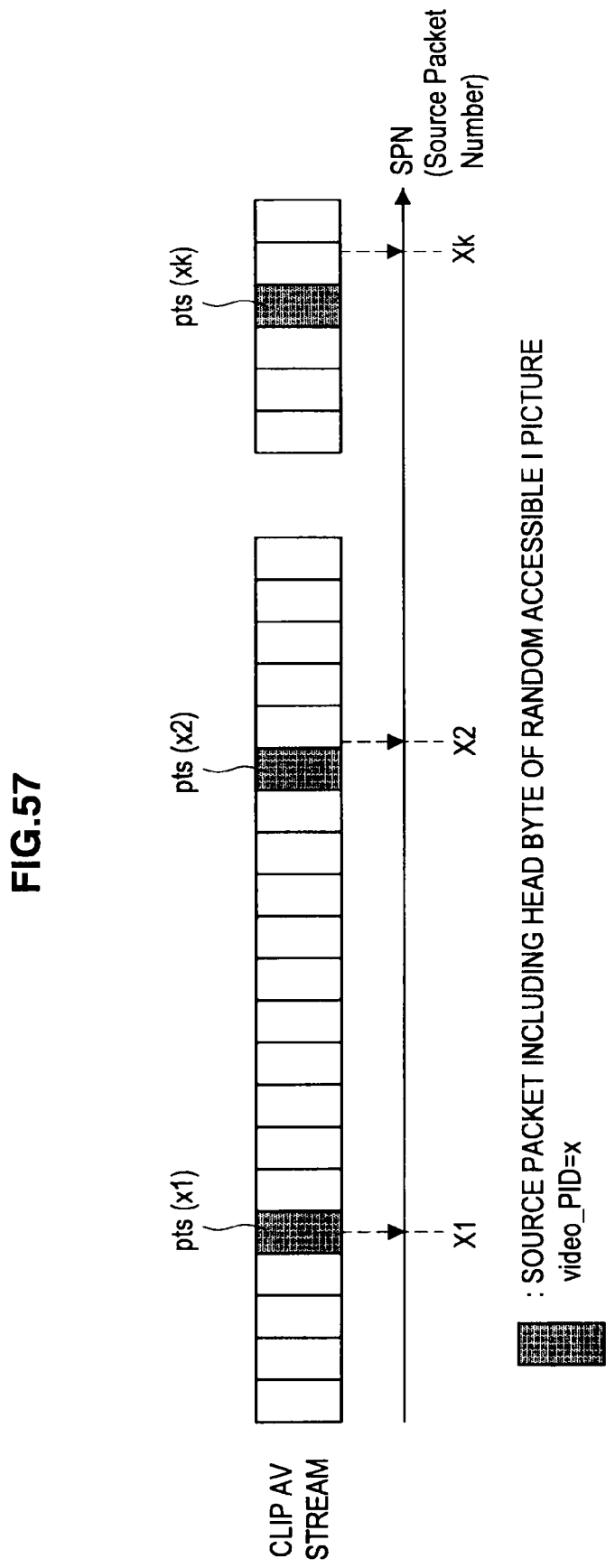
FIG. 57 is a view showing an example of the Clip AV stream.

FIG. 57 is a view showing an example of the Clip AV stream.

The clip AV stream of FIG. 57 is the video stream (Base view video stream) including the source packet identified with PID=x. The video stream is distinguished by the PID contained in the header of the transport packet in the source packet for every source packet.

In FIG. 57, the source packet including the head byte of the IDR (Instantaneous Decoding Refresh) picture of the source packets of the video stream is colored. The non-colored square indicates the source packet including the data that does not become the random access point, and the source packet including data of other streams.

The IDR picture is I picture, and is decoded first in the GOP including the IDR picture. When decoding the IDR picture, the state of the reference picture buffer, and all information related to decoding such as the frame number and the POC (Picture Order Count) managed up to this point are reset.

For instance, the source packet of source packet number X1 including the head byte of the random accessible IDR picture of the video stream distinguished by the PID=x is arranged at the position of the PTS=pts (x1) on the time axis of the Clip AV stream.

Similarly, the source packet including the head byte of the next random accessible IDR picture is the source packet of source packet number X2, and is arranged at the position of the PTS=pts (x2).

Figure 58:
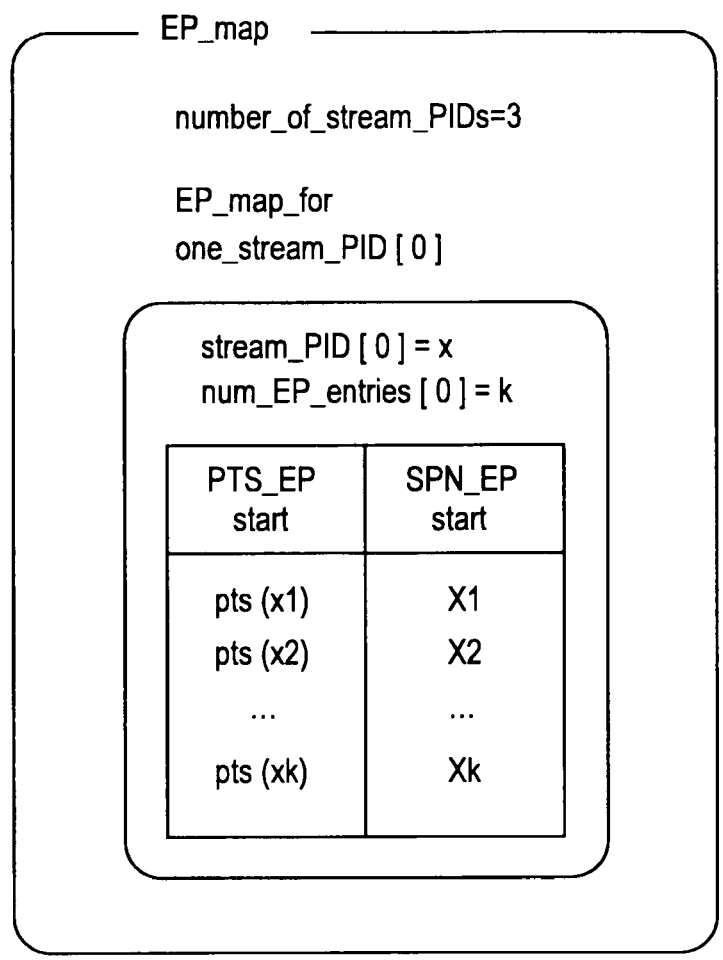
FIG. 58 is a view showing an example of the EP_map.

FIG. 58 is a view conceptually showing an example of the EP_map corresponding to the Clip AV stream of FIG. 57.

As shown in FIG. 58, the EP_map is configured by stream_PID, PTS_EP_start, and SPN_EP_start.

The stream_PID represents the PID of the transport packet for transmitting the video stream.

The PTS_EP_start represents the PTS of the Access Unite that starts from the random accessible IDR picture.

The SPN_EP_start represents the address of the source packet including the first byte of the Access Unite referenced by the value of the PTS_EP_start.

The PID of the video stream is stored in the stream_PID, and the EP_map_for_one_stream_PID( ), which is table information showing the correspondence relationship of the PTS_EP_start and the SPN_EP_start, is generated.

For instance, the PTS=pts(x1) and the source packet number X1, the PTS=pts(x2) and the source packet number X2, . . . , and the PTS=pts(xk) and the source packet number Xk are respectively described in correspondence with each other in the EP_map_for_one_stream_PID[0] of the video stream of PID=x.

Such table is also generated for the respective video streams multiplexed on the same Clip AV stream. The EP_map including the generated table is stored in the Clip Information file corresponding to the relevant Clip AV stream.

Figure 59:
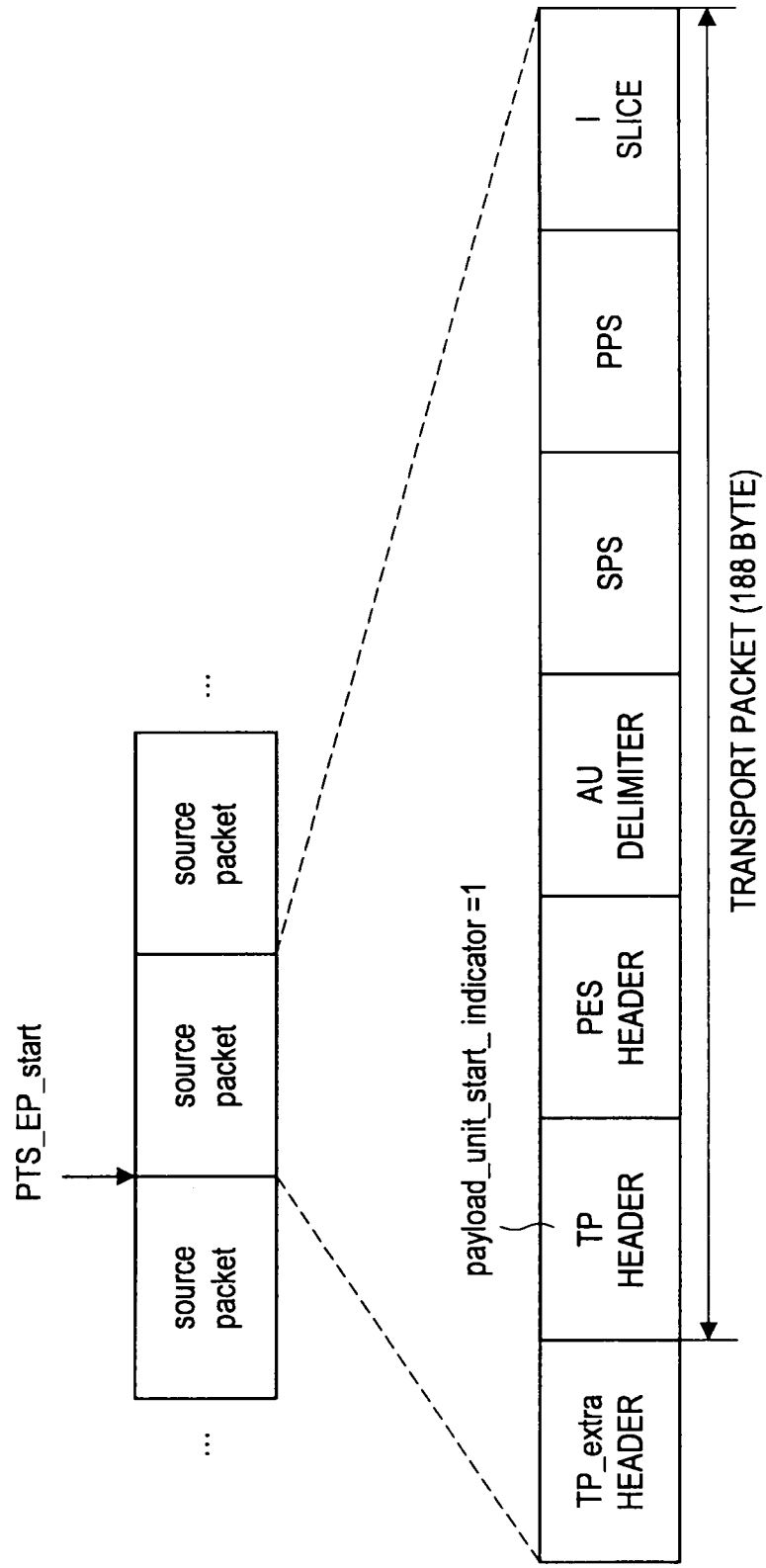
FIG. 59 is a view showing an example of a data structure of the source packet indicated by the SPN_EP_start.

FIG. 59 is a view showing an example of a data structure of the source packet indicated by the SPN_EP_start.

As described above, the source packet is configured in a form that the header of four bytes is added to the transport packet of 188 bytes. The transport packet portion includes the header portion (TP header) and the payload portion. The SPN_EP_start represents the source packet number of the source packet including the first byte of the Access Unite starting from the IDR picture.

In the AVC/H.264, the Access Unite, that is, the picture starts from the AU delimiter (Access Unit Delimiter). The SRS and the PPS follow the AU delimiter. Thereafter, the head portion of or the entire data of the slice of the IDR picture is stored.

When the value of the payload_unit_start_indicator at the TP header of the transport packet is 1, this means that a new PES packet starts from the payload of such transport packet. The Access Unite starts from such source packet.

Such EP_map is prepared for the Base view video stream and the Dependent view video stream, respectively.

<Third Embodiment>

The clpi file of the D1/D2 view video is referenced based on the description of the PlayList above, but reference can be made from the clpi file of the Base view video.

[Reference Example 1]

Figure 60:
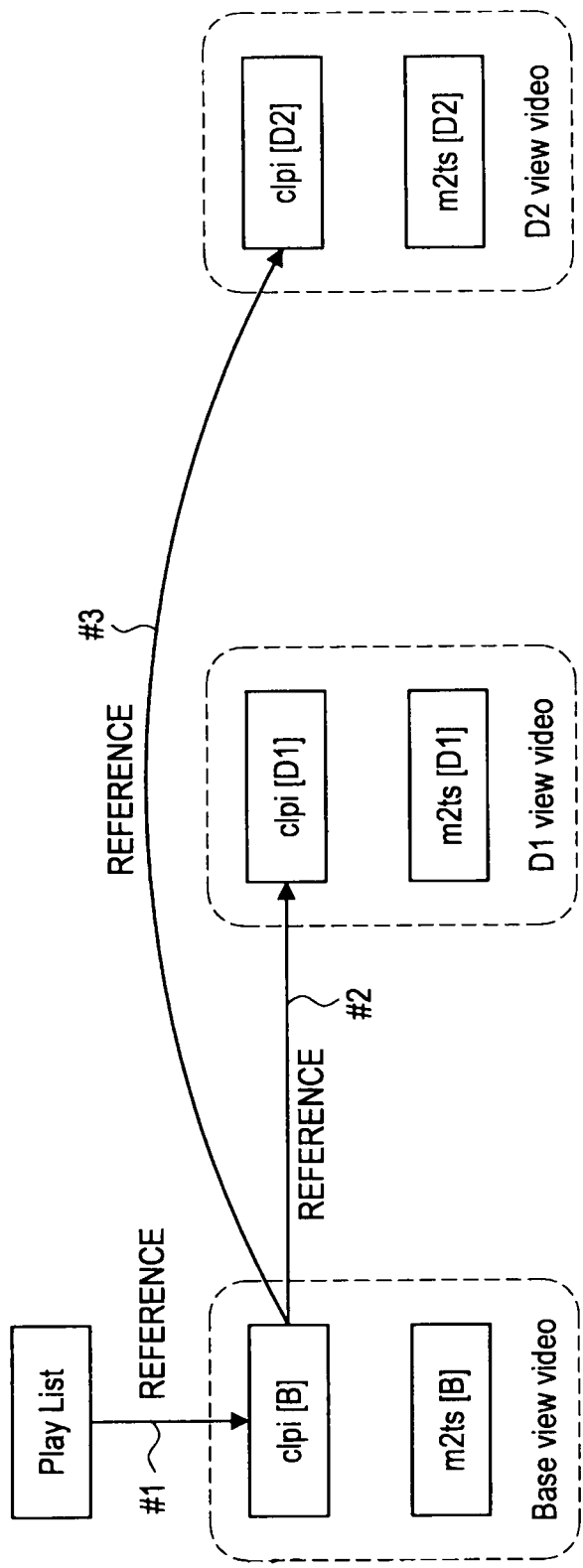
FIG. 60 is a view showing an example of file management by the reproduction device.

FIG. 60 is a view showing an example of file management by the reproduction device 201.

In FIG. 60, the clpi file that can be referenced from the PlayList is only the clpi file of the Base view video as shown with the arrow #1.

The clpi file of the Base view video includes at least one part of the file name of the clpi file of the D1/D2 view video. The clpi file of the D1 view video can be referenced as shown with the arrow #2 and the clpi file of the D2 view video can be referenced as shown with the arrow #3 using such file name.

The clpi[B] of FIG. 60 indicates the clpi file of the m2ts file (m2ts[B]) storing the Base view video. The clpi[D1] indicates the clpi file of the m2ts file (m2ts[D1]) storing the D1 view video. The clpi[D2] indicates the clpi file of the m2ts file (m2ts[D2]) storing the D2 view video.

Each clpi file is set with 3D_Clip_type of two bits and 3D_App_type of two bits.

FIG. 61 is a view showing the meaning of 3D_Clip_type.

The value 00 of the 3D_Clip_type represents that it is the Clip used for the 2D reproduction. This is to ensure the compatibility with the player that is only compatible to the 2D reproduction. The m2ts file corresponding to the clpi file including the 3D_Clip_type=00 is the file of the 2D reproduction video (e.g., file of the Base view video).

The value 01 of the 3D_Clip_type represents that it is the Clip of the Base view video.

The value 10 of the 3D_Clip_type represents that it is the Clip of the D1 view video.

The value 11 of the 3D_Clip_type represents that it is the Clip of the D2 view video.

FIG. 62 is a view showing the meaning of 3D_App_type.

The value 00 of the 3D_App_type represents that it is the Clip that can be referenced by the 2D reproducing application. The 2D reproducing application is an application for controlling the 2D reproduction.

The value 01 of the 3D_App_type represents that it is the Clip that can be referenced by the B-D1 reproducing application. The B-D1 reproducing application is an application for controlling the B-D1 reproduction.

The value 10 of the 3D_App_type represents that it is the Clip that can be referenced by the B-D2 reproducing application. The B-D2 reproducing application is an application for controlling the B-D2 reproduction.

The value 11 of the 3D_App_type represents that it is the Clip that can be referenced by both the B-D1 reproducing application and the B-D2 reproducing application.

Figure 63:
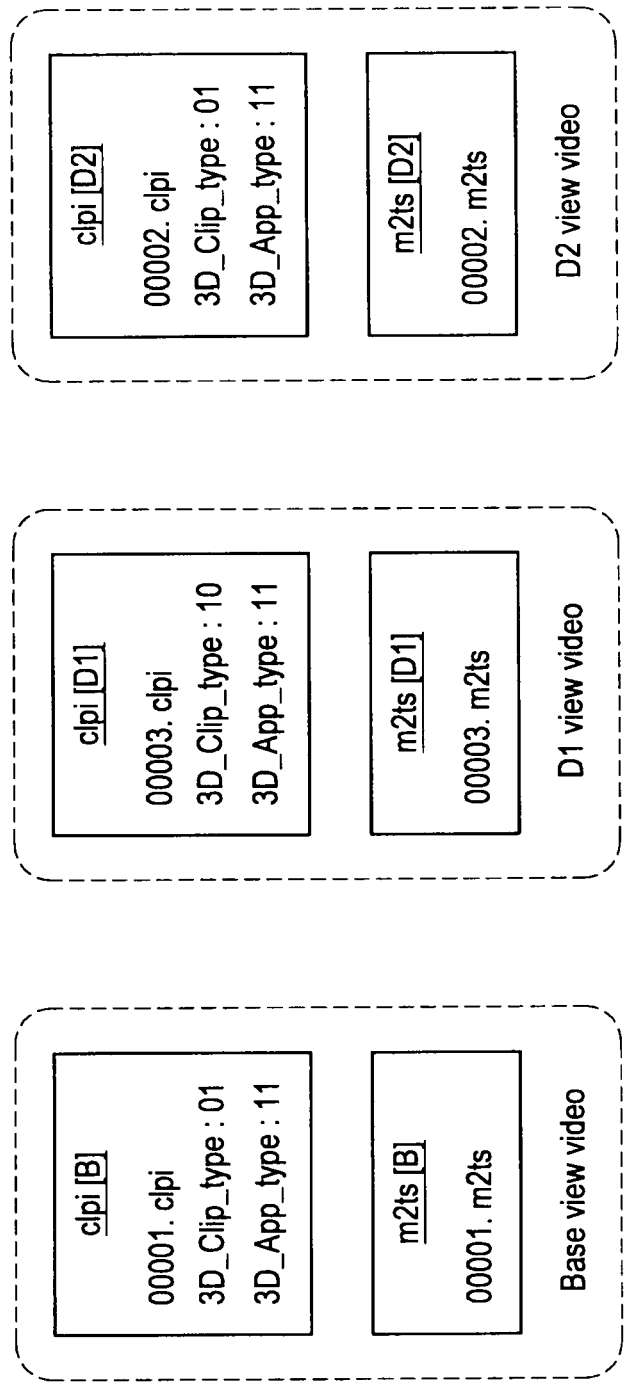
FIG. 63 is a view showing an example of the setting of 3D_Clip_type and 3D_App_type.

FIG. 63 is a view showing an example of the setting of 3D_Clip_type and 3D_App_type.

In the example of FIG. 63, 01 is set for the value of the 3D_Clip_type in the clpi file of the Base view video, and 11 is set for a value of the 3D_App_type. The file name of the clpi file of the Base view video is "00001.clpi".

The file name of the m2ts file of the Base view video is "00001.m2ts". Thus, the file names including the same five digit number and the respective extension are set for the corresponding clpi file and the m2ts file.

Furthermore, 10 is set for the value of the 3D_Clip_type in the clpi file of the D1 view video, and 11 is set for the 3D_App_type. The file name of the clpi file of the D1 view video is "00003.clpi", and the file name of the corresponding m2ts file is "00003.m2ts".

Furthermore, 01 is set for the value of the 3D_Clip_type in the clpi file of the D2 view video, and 11 is set for a value of the 3D_App_type. The file name of the clpi file of the D2 view video is "00002.clpi", and the file name of the corresponding m2ts file is "00002.m2ts".

The portion excluding the extension of the file name set to the clpi file of the D1/D2 view video is described in the clpi file of the Base view video for the information representing the clpi file of the D1/D2 view video used for the 3D reproduction with the Base view video.

FIG. 64 is a view showing the syntax of the clpi file.

As shown in FIG. 64, the values of 3D_Clip_type and 3D_App_type are respectively set in the clpi file.

Furthermore, if the clpi file is the clpi file of the Base view video, the information representing the clpi file of the D1/D2 view video used for the 3D reproduction with the Base view video is described in the ExtensionData( ).

FIG. 65 is a view showing a specific example of a description in the ExtensionData( ) of the clpi file.

As shown in FIG. 65, various types of information referenced at the time of the 3D reproduction are described for the 3DClipInfo( ).

"If(3D_Clip_type==01b)" means referencing the description of FIG. 65 when the value of 3D_Clip_type is 01.

"if(3D_App_type==01b||3D_App_type==11b)" means referencing the next D1_ClipInfo_file_name and B-D1_Interleave_Info_file_name when the value of 3D_App_type is 01 or 11. The D1 ClipInfo_file_name and the B-D1_Interleave_Info_file_name are descriptions referenced when performing the B-D1 reproduction.

The D1_ClipInfo_file_name represents the five digit number excluding the extension in the file name of the clpi file of the D1 view video. In the example of FIG. 63, "00003" is described. The entire file name including the extension may be described.

The B-D1_Interleave_Info_file_name represents the five digit number etc. excluding the extension in the file name of the file specified to the file system as the readout file when performing the B-D1 reproduction such as the ilvt file of "10000.ilvt".

"if(3D_App_type==10b||3D_App_type==11b)" means referencing the next D2_ClipInfo_file_name and B-D2_Interleave_Info_file_name when the value of 3D_App_type is 10 or 11. The D2_ClipInfo_file_name and the B-D2_Interleave_Info_file_name are descriptions referenced when performing the B-D2 reproduction.

The D2_ClipInfo_file_name represents the five digit number excluding the extension in the file name of the clpi file of the D2 view video. In the example of FIG. 63, "00002" is described.

The B-D2_Interleave_Info_file_name represents the five digit number etc. excluding the extension in the file name of the file specified to the file system as the readout file when performing the B-D2 reproduction such as the ilvt file of "20000.ilvt".

The num_of_Ext_file represents how many extents the m2ts file corresponding to the clpi file including the description of FIG. 65 includes.

The information of each extent is described after num_of_Ext_file.

The Ext_start_address represents the start address on the optical disk 202 of the extent.

The Ext_size represents the length of the extent. For example, the length of the extent is represented by the SPN, as described above.

For instance, if the clpi file including the description of FIG. 65 is the clpi file of the Base view video, the information related to the extent on the optical disk 202 of the Base view video is described after num_of_Ext_file.

If the clpi file including the description of FIG. 65 is the clpi file of the D1 view video, the information related to the extent on the optical disk 202 of the D1 view video is described after num_of_Ext_file.

If the clpi file including the description of FIG. 65 is the clpi file of the D2 view video, the information related to the extent on the optical disk 202 of the D2 view video is described after num_of_Ext_file.

The description from the "If(3D_Clip_type==01b)" of the second row up to one row above the num_of_Ext_file of the description shown in FIG. 65 is described only in the clpi file of the Base view video. The clpi file of the D1 view video and the clpi file of the D2 view video include description on the extent.

FIG. 66 is a view showing another specific example of a description in the ExtensionData( ) of the clpi file.

The description of FIG. 66 differs from the description of FIG. 65 in that "Ext_start_address", which is the description related to the extent, is not contained. If the address of each extent can be specified by referencing other information, and the like, each extent can be specified and extracted using the "Ext_size" without using the "Ext_start_address".

[Reference Example 2]

Figure 67:
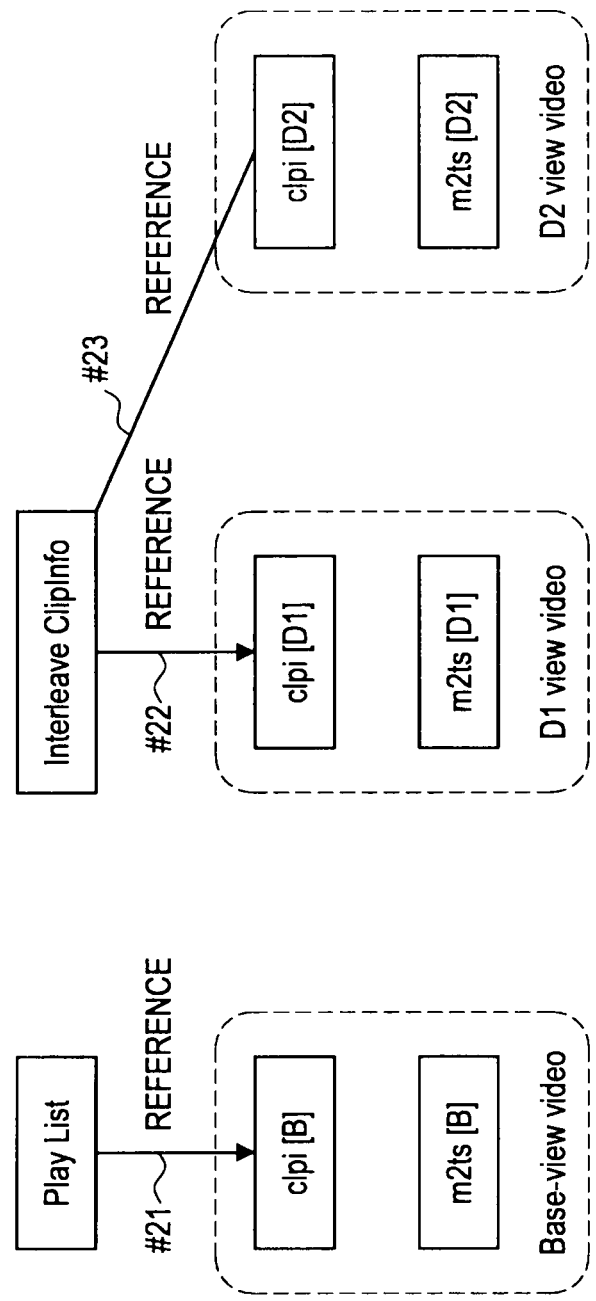
FIG. 67 is a view showing another example of file management by the reproduction device.

FIG. 67 is a view showing another example of file management by the reproduction device 201.

A file for referencing the clpi file of the D1/D2 view video instead of referencing the clpi file of the D1/D2 view video from the clpi file of the Base view video may be separately prepared and used.

In the example of FIG. 67, the clpi file that can be referenced from the PlayList is only the clpi file of the Base view video as shown with the arrow #21.

The clpi file of the D1 view video may be referenced as shown with the arrow #22 or the clpi file of the D2 view video may be referenced as shown with the arrow #23 from the Interleave ClipInfo arranged separate from the PlayList.

The Interleave ClipInfo includes at least one part of the file name of the clpi file of the D1/D2 view video.

Figure 68:
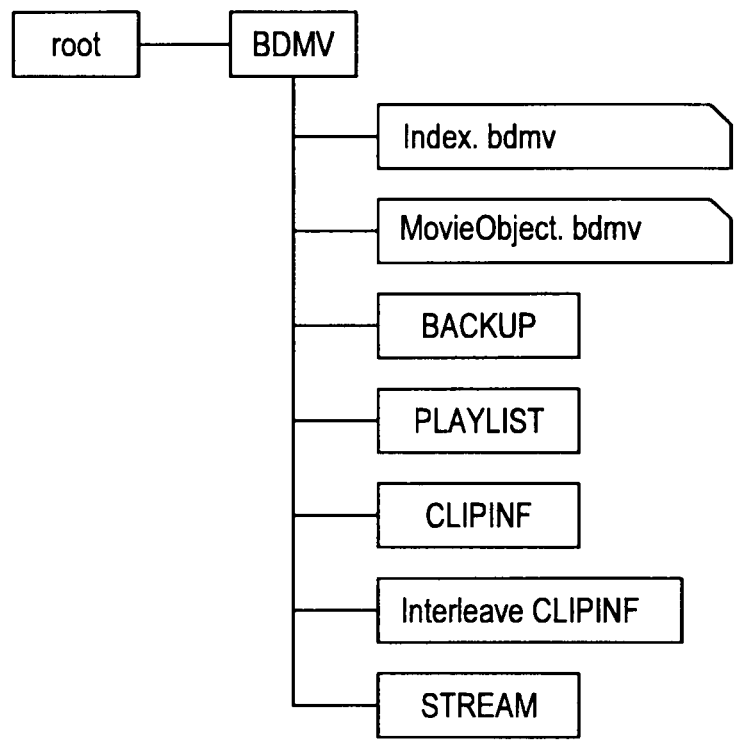
FIG. 68 is a view showing an example of a management structure of a file.

FIG. 68 is a view showing an example of a management structure of a file.

As shown in FIG. 68, for instance, a directory such as "Interleave CLIPINF" and the like is newly arranged at the hierarchically below the "BDMV" directory and after the "CLIPINF" directory. The "Interleave CLIPINF" directory stores the Interleave ClipInfo file that is the file for referencing the clpi file of the D1/D2 view video.

When performing the 3D reproduction, the reproduction device 201 references the Interleave ClipInfo file in the "Interleave CLIPINF" directory, and specifies the clpi file of the D1/D2 view video used for the 3D reproduction with the Base view video.

FIG. 69 is a view showing the syntax of the Interleave ClipInfo file.

The file name of the Interleave ClipInfo file of FIG. 69 is "zzzzz.ilvt".

One of the values described with reference to FIG. 62 is set for the 3D_App_type.

For instance, if 3D_App_type=01, the B-D1 reproducing application references such Interleave ClipInfo file. If 3D_App_type=10, the B-D2 reproducing application references such Interleave ClipInfo file. If 3D_App_type=11, both the B-D1 reproducing application and the B-D2 reproducing application reference such Interleave ClipInfo file.

"if(3D_App_type==01b||3D_App_type==11b)" means referencing the next D1_ClipInfo_file_name when the value of the 3D_App_type is 01 or 11. The D1_ClipInfo_file_name is the description referenced when performing the B-D1 reproduction.

The D1_ClipInfo_file_name represents the five digit number excluding the extension in the file name of the clpi file of the D1 view video. In the example of FIG. 63, "00003" is described.

"if(3D_App_type==10b||3D_App_type==11b)" means referencing the next D2_ClipInfo_file_name when the value of 3D_App_type is 10 or 11. The D2_ClipInfo_file_name is the description referenced when performing the B-D2 reproduction.

The D2_ClipInfo_file_name represents the five digit number excluding the extension in the file name of the clpi file of the D2 view video. In the example of FIG. 63, "00002" is described.

As described above, the file of the interleaved information may be newly defined, so that the clpi file of the D1/D2 view video corresponding to the Base view video can be specified.

[Configuration Example of Recording Device]

Figure 70:
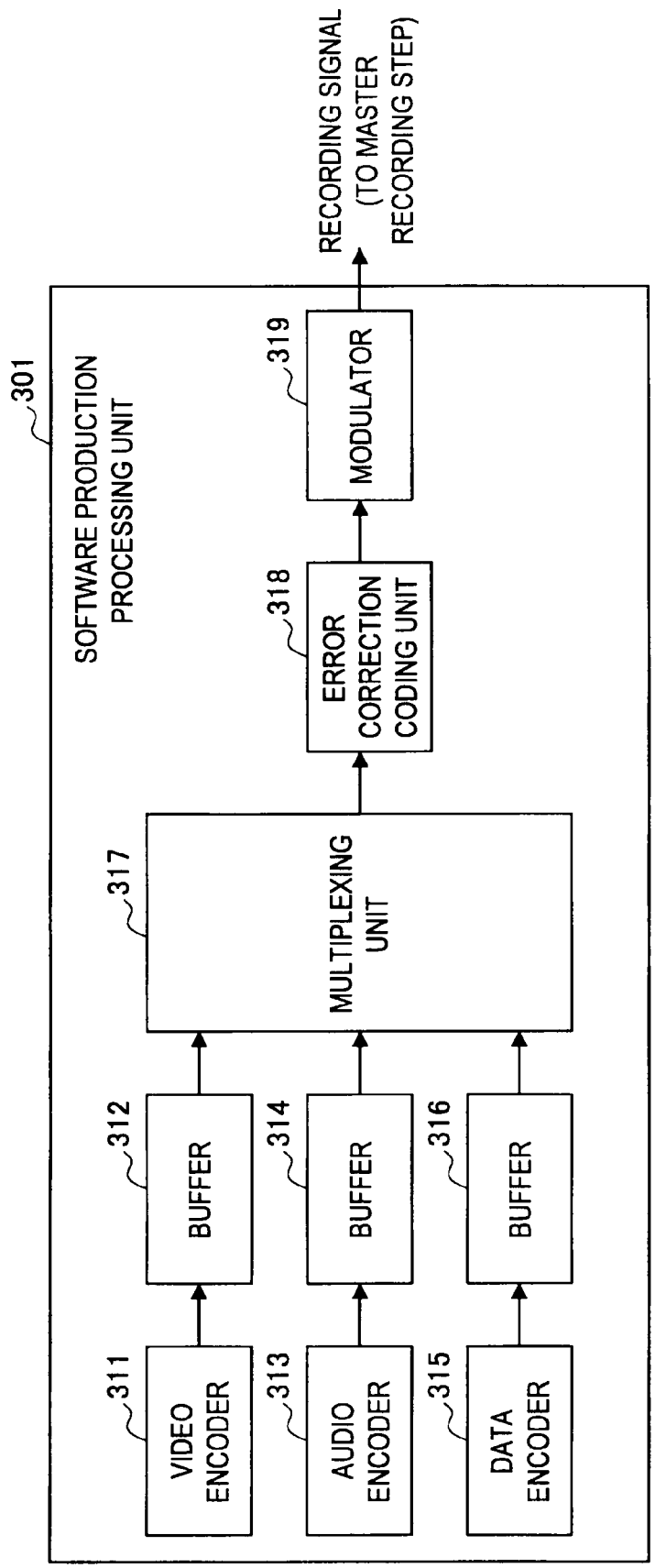
FIG. 70 is a block diagram showing a configuration example of a software production processing unit.

FIG. 70 is a block diagram showing a configuration example of a software production processing unit 301.

A video encoder 311 has a configuration similar to the MVC encoder 211 of FIG. 17. The video encoder 311 encodes plural video data with H.264 AVC/MVC to generate the Base view video stream and the Dependent view video stream, and outputs the same to a buffer 312.

An audio encoder 313 encodes the input audio stream, and outputs the obtained data to a buffer 314. The audio encoder 313 receives the audio stream to be recorded on the disk along with the Base view video and the Dependent view video streams.

A data encoder 315 encodes various types of data as described above other than the video and the audio such as the PlayList file, and outputs the data obtained through encoding to a buffer 316.

For instance, the data encoder 315 sets the type (FIG. 32) representing whether or not the data of the Base view video stream and the data of the D1/D2 view video stream are recorded on the optical disk in the interleaved state in units of extents to the PlayList file.

The data encoder 315 sets the ilvt file to the PlayList file when the data of the Base view video stream and the data of the D1/D2 view video stream are recorded on the optical disk in the interleaved state. The ilvt file functions as a virtual file for virtually and collectively managing the data of the Base view video stream and the data of the D1/D2 view video stream.

Furthermore, the data encoder 315 sets the file name of the Clip Information file of each clip to the PlayList file, and sets the EP_map and the chunk_map to the respective Clip Information file.

The data encoder 315 sets the 3D_Clip_type (FIG. 61) and the 3D_App_type (FIG. 62) to the Clip Information file. The data encoder 315 sets the information related to the extent such as the Ext_start_address and the Ext_size to the ExtensionData( ) that is the extension region of the Clip Information file.

A multiplexing unit 317 multiplexes the video data, the audio data, and the data other than streams stored in the respective buffers with a synchronization signal, and outputs the same to an error correction coding unit 318.

The error correction coding unit 318 adds an error correction code to the data multiplexed by the multiplexing unit 317.

A modulator 319 performs modulation on the data provided from the error correction coding unit 318, and outputs the same. The output of the modulator 319 becomes the software to be recorded on the optical disk 202 that can be reproduced by the reproduction device 201.

The software production processing unit 301 having such configuration is arranged in the recording device.

Figure 71:
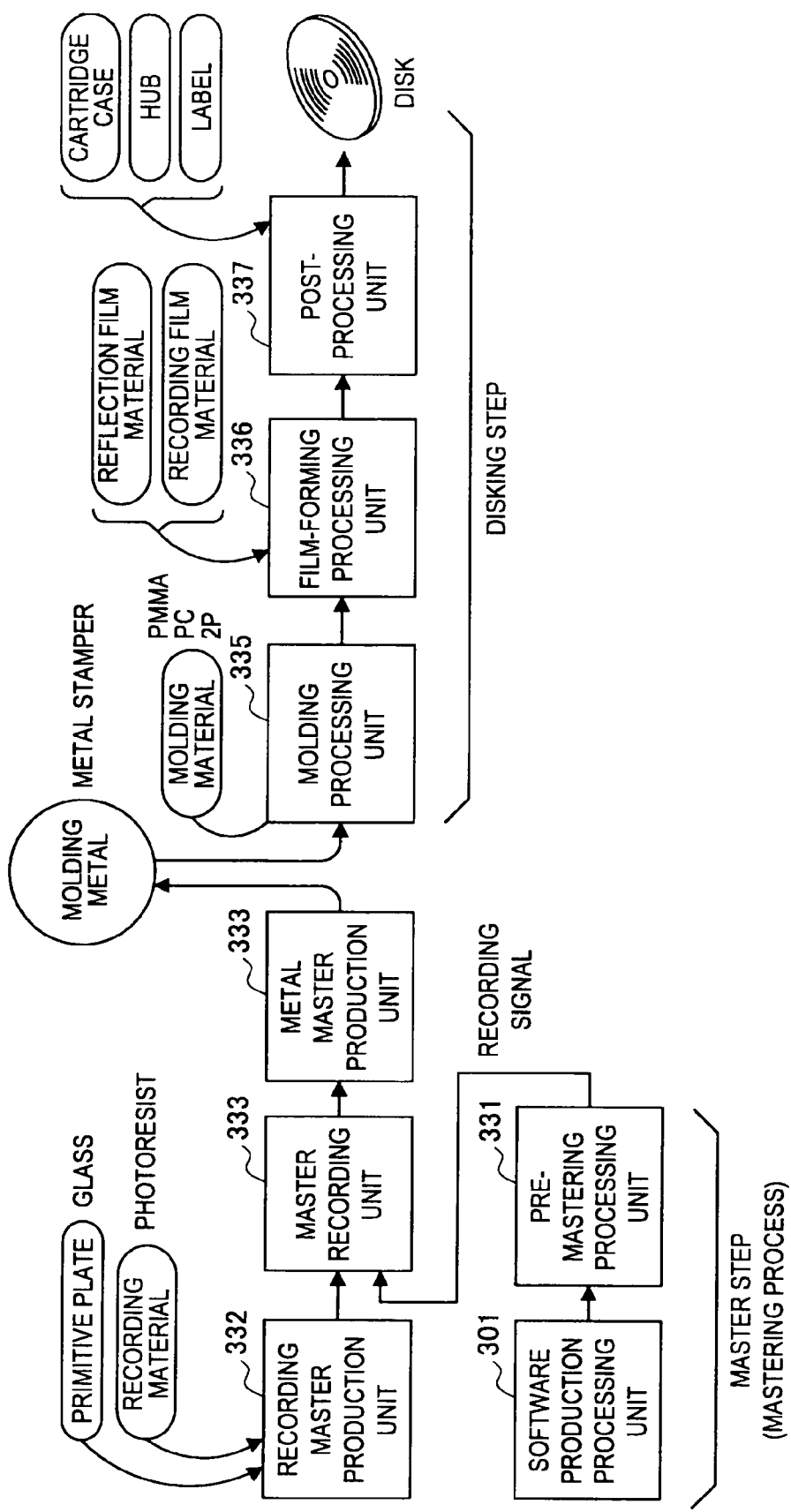
FIG. 71 is a view showing an example of a configuration including the software production processing unit.

FIG. 71 is a view showing an example of a configuration including the software production processing unit 301.

One part of the configuration shown in FIG. 71 may be arranged in the recording device.

The recording signal generated by the software production processing unit 301 is subjected to a mastering process in a pre-mastering processing unit 331 to thereby generate a signal of a format to be recorded on the optical disk 202. The generated signal is provided to a master recording unit 333.

In a recording master production unit 332, a master made of glass and the like is prepared, and a recording material made of photoresist and the like is applied thereon. The recording master is thereby produced.

In the master recording unit 333, a laser beam is modulated in correspondence to the recording signal provided from the pre-mastering processing unit 331 and irradiated on the photoresist on the master. The photoresist on the master is thereby exposed in correspondence to the recording signal. Thereafter, the master is developed, so that pits appear on the master.

In a metal master production unit 334, processes such as electroforming is performed on the master to produce a metal master transferred with the pits on the glass master. A metal stamper is further produced from the metal master, which then becomes a molding die.

In a molding processing unit 335, materials such as PMMA (acryl) or PC (polycarbonate) is injected to the molding die through injection and the like, and then immobilized. Alternatively, an ultraviolet ray may be irradiated after applying 2P (ultraviolet ray curable resin) and the like on the metal stamper to cure the 2P. The pits on the metal stamper then can be transferred to a replica made of resin.

In a film-forming processing unit 336, a reflection film is formed on the replica through vapor deposition, sputtering, or the like. Alternatively, the reflection film is formed on the replica by spin coating.

In a post-processing unit 337, the processing of inner and outer diameters is performed on the disk, and necessary processes such as laminating the two disks are performed. Furthermore, a label is attached or a hub is attached thereto, and then inserted to a cartridge. The optical disk 202 recorded with data reproducible by the reproduction device 201 is completed in such manner.

The series of processes described above may be executed by hardware or may be executed by software. When executing the series of processes by software, a program configuring such software is installed in a computer incorporated in a dedicated hardware, a general-purpose personal computer, or the like.

The program to be installed is provided by being recorded in the removable recording medium 111 of FIG. 14. The program may be provided through wired or wireless transmission medium such as local area network, Internet, and digital broadcasting.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-093161 filed in the Japan Patent Office on Apr. 7, 2009, the entire content of which is hereby incorporated by reference.

What is claimed is:

1. An information processing device, comprising:
reproduction controller configured to obtain a dividing position for dividing a virtual extent of a virtual extent file read out from a recording medium recorded with,
   interleaved data obtained by dividing each of a base stream and an enhanced stream recorded in the recording medium into an extent that is a segment of a stream, and arranging the extents of the base stream and the enhanced stream in an interleaved manner so that the extent of the base stream and the extent of the enhanced stream are adjacent to each other, and a file entry of
   a base file in which the extent of the base stream is stored in a reproducing order, and
   a virtual extent file in which the virtual extent is stored in a reproducing order, with a set of the extent of the base stream and the extent of the enhanced stream, which are adjacent to each other in the interleaved data, as the virtual extent;
into the extent of the base stream and the extent of the enhanced stream from the file entries of the base file and the virtual extent file, and dividing the virtual extent into the extent of the base stream and the extent of the enhanced stream by dividing at the dividing position, wherein
the base stream is a stream which may be used to display a 2D (Dimension) image,
the enhanced stream includes a first enhanced stream and a second enhanced stream, each of which may be used with the base stream to display a 3D image, and one of which is used with the base stream to display the 3D image,
positional information representing a position of the extent of the base stream on the recording medium is registered in the file entry of the base file,
positional information of the virtual extent is registered in the file entry of the virtual extent file,
the base stream and the first enhanced stream are streams that are capable of being used to display the 3D image in a first display method of displaying a left eye image and a right eye image, the left eye image being an image obtained from one of the base stream and the first enhanced stream observed with a left eye, and the right eye image being an image obtained from the other observed with a right eye, and
the base stream and the second enhanced stream are streams that provide a parallax obtained from the second enhanced stream to the image obtained from the base stream to generate the left eye image and the right eye image, and that are capable of being used to display the 3D image in a second display method of displaying the left eye image and the right eye image.

2. The information processing device according to claim 1, wherein
the recording medium is recorded with,
   interleaved data obtained by dividing each of the base stream, the first enhanced stream and the second enhanced stream into the extent, and arranging the extents of the base stream, the first enhanced stream and the second enhanced stream in an interleaved manner so that the extents of the first enhanced stream and the second enhanced stream are adjacent to the extent of the base stream, and a file entry of
   the base file,
   a first virtual extent file in which the first virtual extent is stored in a reproducing order, with a set of the extent of the base stream and the extent of the first enhanced stream, which are adjacent to each other in the interleaved data, as the first virtual extent, and a second virtual extent file in which the second virtual extent is stored in a reproducing order, with a set of the extent of the base stream and the extent of the second enhanced stream, which are adjacent to each other in the interleaved data, as the second virtual extent;

when the 3D image is displayed in the first display method, the reproduction controller, obtains a dividing position, of dividing the first virtual extent of the first virtual extent file read out from the recording medium into the extent of the base stream and the extent of the first enhanced stream, from the file entries of the base file and the first virtual extent file, and divides the first virtual extent into the extent of the base stream and the extent of the first enhanced stream by dividing at the dividing position; and when the 3D image is displayed in the second display method, the reproduction controller, obtains a dividing position, of dividing the second virtual extent of the second virtual extent file read out from the recording medium into the extent of the base stream and the extent of the second enhanced stream, from the file entries of the base file and the second virtual extent file, and divides the second virtual extent into the extent of the base stream and the extent of the second enhanced stream by dividing at the dividing position.

3. The information processing device according to claim 1, wherein kth positional information registered in the file entry of the base file represents a position of kth extent of the base file;

kth positional information registered in the file entry of the virtual extent file represents a position of kth virtual extent of the virtual extent file; and the reproduction controller specifies the kth positional information registered in the file entry of the base file as positional information used to obtain the dividing position for dividing kth virtual extent, which position is represented by the kth positional information registered in the file entry of the virtual extent file, and obtains the dividing position using the positional information.

4. The information processing device according to claim 1, wherein the kth positional information registered in the file entry of the virtual extent file includes a start address As on the recording medium of the kth virtual extent of the virtual extent file and a size S of the kth virtual extent; and the reproduction controller specifies positional information, which start address is a value in a range from the address As to an address As+S, of the positional information registered in the file entry of the base file as positional information used to obtain the dividing position for dividing kth virtual extent, which position is represented by the kth positional information registered in the file entry of the virtual extent file, and obtains the dividing position using the positional information.

5. The information processing device according to claim 1, wherein the recording medium is further recorded with a file entry of an enhanced stream file in which the extent of the first enhanced stream or the extent of the second enhanced stream is stored in a reproducing order; and the reproduction controller obtains the dividing position using the file entry of the enhanced stream file in place of the file entry of the base file.

6. An information processing method, comprising:

reproduction control step of obtaining a dividing position for dividing a virtual extent of a virtual extent file read out from a recording medium recorded with, interleaved data obtained by dividing each of a base stream and an enhanced stream recorded in the recording medium into an extent that is a segment of a stream, and arranging the extents of the base stream and the enhanced stream in an interleaved manner so that the extent of the base stream and the extent of the enhanced stream are adjacent to each other, and a file entry of a base file in which the extent of the base stream is stored in a reproducing order, and a virtual extent file in which the virtual extent is stored in a reproducing order, with a set of the extent of the base stream and the extent of the enhanced stream, which are adjacent to each other in the interleaved data, as the virtual extent;

into the extent of the base stream and the extent of the enhanced stream from the file entries of the base file and the virtual extent file, and dividing the virtual extent into the extent of the base stream and the extent of the enhanced stream by dividing at the dividing position, wherein the base stream is a stream which may be used to display a 2D (Dimension) image;

the enhanced stream includes a first enhanced stream and a second enhanced stream, each of which may be used with the base stream to display a 3D image, and one of which is used with the base stream to display the 3D image;

positional information representing a position of the extent of the base stream on the recording medium is registered in the file entry of the base file;

positional information of the virtual extent is registered in the file entry of the virtual extent file;

the base stream and the first enhanced stream are streams that are capable of being used to display the 3D image in a first display method of displaying a left eye image and a right eye image, the left eye image being an image obtained from one of the base stream and the first enhanced stream observed with a left eye, and the right eye image being an image obtained from the other observed with a right eye; and the base stream and the second enhanced stream are streams that provide a parallax obtained from the second enhanced stream to the image obtained from the base stream to generate the left eye image and the right eye image, and that are capable of being used to display the 3D image in a second display method of displaying the left eye image and the right eye image.

7. A non-transitory computer readable medium storing a program for causing a computer to function as reproduction controller configured to obtain a dividing position for dividing a virtual extent of a virtual extent file read out from a recording medium recorded with, interleaved data obtained by dividing each of a base stream and an enhanced stream recorded in the recording medium into an extent that is a segment of a stream, and arranging the extents of the base stream and the enhanced stream in an interleaved manner so that the extent of the base stream and the extent of the enhanced stream are adjacent to each other, and a file entry of a base file in which the extent of the base stream is stored in a reproducing order, and a virtual extent file in which the virtual extent is stored in a reproducing order, with a set of the extent of the base stream and the extent of the enhanced stream, which are adjacent to each other in the interleaved data, as the virtual extent;

into the extent of the base stream and the extent of the enhanced stream from the file entries of the base file and the virtual extent file, and dividing the virtual extent into the extent of the base stream and the extent of the enhanced stream by dividing at the dividing position, wherein the base stream is a stream which may be used to display a 2D (Dimension) image;

the enhanced stream includes a first enhanced stream and a second enhanced stream, each of which may be used with the base stream to display a 3D image, and one of which is used with the base stream to display the 3D image;

positional information representing a position of the extent of the base stream on the recording medium is registered in the file entry of the base file;

positional information of the virtual extent is registered in the file entry of the virtual extent file;

the base stream and the first enhanced stream are streams that are capable of being used to display the 3D image in a first display method of displaying a left eye image and a right eye image. the left eye image being an image obtained from one of the base stream and the first enhanced stream observed with a left eye, and the right eye image being an image obtained from the other observed with a right eye; and the base stream and the second enhanced stream are streams that provide a parallax obtained from the second enhanced stream to the image obtained from the base stream to generate the left eye image and the right eye image, and that are capable of being used to display the 3D image in a second display method of displaying the left eye image and the right eye image.

8. An information processing device, comprising:

interleaved data generator configured to generate interleaved data obtained by dividing each of a base stream and an enhanced stream recorded in a recording medium into an extent that is a segment of a stream, and arranging the extents of the base stream and the enhanced stream in an interleaved manner so that the extent of the base stream and the extent of the enhanced stream are adjacent to each other;

a file entry generator configured to generate a file entry of
 a base file in which the extent of the base stream is stored in a reproducing order, and
 a virtual extent file in which a virtual extent is stored in a reproducing order, with a set of the extent of the base stream and the extent of the enhanced stream, which are adjacent to each other in the interleaved data, as the virtual extent; and a recording controller configured to perform a recording control of recording the interleaved data, as well as, the file entries of the base file and the virtual extent file in the recording medium, wherein the base stream is a stream which may be used to display a 2D (Dimension) image;

the enhanced stream includes a first enhanced stream and a second enhanced stream, each of which may be used with the base stream to display a 3D image, and one of which is used with the base stream to display the 3D image;

positional information representing a position of the extent of the base stream on the recording medium is registered in the file entry of the base file;

positional information of the virtual extent is registered in the file entry of the virtual extent file;

the base stream and the first enhanced stream are streams that are capable of being used to display the 3D image in a first display method of displaying a left eye image and a right eye image, the left eye image being an image obtained from one of the base stream and the first enhanced stream observed with a left eye, and the right eye image being an image obtained from the other observed with a right eye; and the base stream and the second enhanced stream are streams that provide a parallax obtained from the second enhanced stream to the image obtained from the base stream to generate the left eye image and the right eye image, and that are capable of being used to display the 3D image in a second display method of displaying the left eye image and the right eyeimage.

9. An information processing method, comprising the steps of:

generating interleaved data obtained by dividing each of a base stream and an enhanced stream recorded in a recording medium into an extent that is a segment of a stream, and arranging the extents of the base stream and the enhanced stream in an interleaved manner so that the extent of the base stream and the extent of the enhanced stream are adjacent to each other;

generating a file entry of
 a base file in which the extent of the base stream is stored in a reproducing order, and
 a virtual extent file in which a virtual extent is stored in a reproducing order, with a set of the extent of the base stream and the extent of the enhanced stream, which are adjacent to each other in the interleaved data, as the virtual extent; and performing a recording control of recording the interleaved data, as well as, the file entries of the base file and the virtual extent file in the recording medium, wherein the base stream is a stream which may be used to display a 2D (Dimension) image, the enhanced stream includes a first enhanced stream and a second enhanced stream, each of which may be used with the base stream to display a 3D image, and one of which is used with the base stream to display the 3D image, positional information representing a position of the extent of the base stream on the recording medium is registered in the file entry of the base file, positional information of the virtual extent is registered in the file entry of the virtual extent file, the base stream and the first enhanced stream are streams that are capable of being used to display the 3D image in a first display method of displaying a left eye image and a right eye image, the left eye image being an image obtained from one of the base stream and the first enhanced stream observed with a left eye, and the right eye image being an image obtained from the other observed with a right eve, and the base stream and the second enhanced stream are streams that provide a parallax obtained from the second enhanced stream to the image obtained from the base stream to generate the left eyeimage and the right eye image, and that are capable of being used to display the 3D image in a second display method of displaying the left eye image and the right eye image.

10. A non-transitory computer readable medium storing a program for causing a computer to function as:
- interleaved data generator configured to generate interleaved data obtained by dividing each of a base stream and an enhanced stream recorded in a recording medium into an extent that is a segment of a stream, and arranging the extents of the base stream and the enhanced stream in an interleaved manner so that the extent of the base stream and the extent of the enhanced stream are adjacent to each other;
- a file entry generator configured to generate a file entry of
  - a base file in which the extent of the base stream is stored in a reproducing order, and
  - a virtual extent file in which a virtual extent is stored in a reproducing order, with a set of the extent of the base stream and the extent of the enhanced stream, which are adjacent to each other in the interleaved data, as the virtual extent; and
- a recording controller configured to perform a recording control of recording the interleaved data, as well as, the file entries of the base file and the virtual extent file in the recording medium, wherein
- the base stream is a stream which may be used to display a 2D (Dimension) image;
- the enhanced stream includes a first enhanced stream and a second enhanced stream, each of which may be used with the base stream to display a 3D image, and one of which is used with the base stream to display the 3D image;
- positional information representing a position of the extent of the base stream on the recording medium is registered in the file entry of the base file;
- positional information of the virtual extent is registered in the file entry of the virtual extent file;
- the base stream and the first enhanced stream are streams that are capable of being used to display the 3D image in a first display method of displaying a left eye image and a right eye image, the left eye image being an image obtained from one of the base stream and the first enhanced stream observed with a left eye, and the right eye image being an image obtained from the other observed with a right eye; and
- the base stream and the second enhanced stream are streams that provide a parallax obtained from the second enhanced stream to the image obtained from the base stream to generate the left eye image and the right eye image, and that are capable of being used to display the 3D image in a second display method of displaying the left eye image and the right eye image.

11. A non-transitory computer readable medium storing a data structure comprising:
- interleaved data obtained by dividing each of a base stream and an enhanced stream recorded in a recording medium into an extent that is a segment of a stream, and arranging the extents of the base stream and the enhanced stream in an interleaved manner so that the extent of the base stream and the extent of the enhanced stream are adjacent to each other; and
- a file entry of,
  - a base file in which the extent of the base stream is stored in a reproducing order, and
  - a virtual extent file in which a virtual extent is stored in a reproducing order, with a set of the extent of the base stream and the extent of the enhanced stream, which are adjacent to each other in the interleaved data, as the virtual extent, wherein
- the base stream is a stream which may be used to display a 2D (Dimension) image;
- the enhanced stream includes a first enhanced stream and a second enhanced stream, each of which may be used with the base stream to display a 3D image, and one of which is used with the base stream to display the 3D image;
- positional information representing a position of the extent of the base stream on the recording medium is registered in the file entry of the base file;
- positional information of the virtual extent is registered in the file entry of the virtual extent file;
- the base stream and the first enhanced stream are streams that are capable of being used to display the 3D image in a first display method of displaying a left eye image and a right eye image, the left eye image being an image obtained from one of the base stream and the first enhanced stream observed with a left eye, and the right eye image being an image obtained from the other observed with a right eye; and
- the base stream and the second enhanced stream are streams that provide a parallax obtained from the second enhanced stream to the image obtained from the base stream to generate the left eye image and the right eye image, and that are capable of being used to display the 3D image in a second display method of displaying the left eye image and the right eye image.

* * * * *